(12) United States Patent
Ono et al.

(10) Patent No.: US 8,788,171 B2
(45) Date of Patent: Jul. 22, 2014

(54) SENSOR DRIFT AMOUNT ESTIMATING DEVICE

(75) Inventors: Eiichi Ono, Toyota (JP); Yumiko Miura, Ashiya (JP); Katsuyuki Yamaguchi, Susono (JP); Taisuke Yasutomi, Atsugi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 164 days.

(21) Appl. No.: 12/988,914

(22) PCT Filed: Apr. 21, 2009

(86) PCT No.: PCT/JP2009/057926
§ 371 (c)(1),
(2), (4) Date: Oct. 21, 2010

(87) PCT Pub. No.: WO2009/131122
PCT Pub. Date: Oct. 29, 2009

(65) Prior Publication Data
US 2011/0040464 A1 Feb. 17, 2011

(30) Foreign Application Priority Data

Apr. 21, 2008 (JP) .................... 2008-110294
Aug. 20, 2008 (JP) .................... 2008-212145
Jan. 8, 2009 (JP) .................... 2009-002455

(51) Int. Cl.
| G06F 19/00 | (2011.01) |
| G06G 7/00 | (2006.01) |
| B60T 8/1755 | (2006.01) |
| B60T 8/172 | (2006.01) |
| G01C 21/30 | (2006.01) |
| G01C 7/04 | (2006.01) |

(52) U.S. Cl.
CPC .............. B60T 8/1755 (2013.01); B60T 8/172 (2013.01); G01C 21/30 (2013.01); G01C 7/04 (2013.01)
USPC ........ 701/70; 701/4; 701/36; 701/37; 701/38; 701/45; 340/995.25; 340/440; 702/150; 702/151

(58) Field of Classification Search
USPC .............. 701/70, 4, 36–38, 41–47, 110; 702/150–153; 340/429, 436, 446, 340/995.25
See application file for complete search history.

(56) References Cited

U.S. PATENT DOCUMENTS 6,292,759 B1 * 9/2001 Schiffmann .................. 702/151
6,374,172 B1 4/2002 Yamaguchi et al.
(Continued)

FOREIGN PATENT DOCUMENTS

| DE | 100 49 565 A1 | 5/2001 |
| JP | 7 40043 | 2/1995 |

(Continued)

OTHER PUBLICATIONS

International Search Report issued Jun. 2, 2009 in PCT/JP09/057926 filed Apr. 21, 2009.

(Continued)

Primary Examiner — Thomas Tarcza
Assistant Examiner — Tyler J Lee
(74) Attorney, Agent, or Firm — Oblon, Spivak, McClelland, Maier & Neustadt, L.L.P.

(57) ABSTRACT

An attitude angle estimating means computes a derivative amount of an attitude angle with respect to a vertical axis of a vehicle body, and integrates the computed derivative amount of the attitude angle, and estimates the attitude angle. On the basis of the sensor signal and the attitude angle estimated by the attitude angle estimating means, a computing means computes a derivative amount of the attitude angle obtained from equations of motion for vehicle motion. A drift amount estimating means estimates a sensor drift amount of the sensor signal by using a relationship that, when taking a sensor drift amount of the sensor signal into consideration, the derivative amount of the attitude angle computed by the attitude angle estimating means, and a value that considers a sensor drift amount in the derivative amount of the attitude angle computed by the computing means, are equal.

23 Claims, 40 Drawing Sheets

(56) References Cited

U.S. PATENT DOCUMENTS

| | | | |
|---|---|---|---|
| 7,216,055 B1 * | 5/2007 | Horton et al. | 702/153 |
| 7,747,367 B2 * | 6/2010 | Ono | 701/38 |
| 2007/0156316 A1 | 7/2007 | Ono | |

FOREIGN PATENT DOCUMENTS

| | | |
|---|---|---|
| JP | 2001 108701 | 4/2001 |
| JP | 3795498 | 7/2006 |
| JP | 2007 182209 | 7/2007 |
| WO | WO 01/81139 A1 | 11/2001 |

OTHER PUBLICATIONS

German Office Action issued Oct. 9, 2012, in German Patent Application No. 11 2009 000 955.7 (with English translation).

* cited by examiner

LONGITUDINAL
ACCELERATION
DRIFT AMOUNT
ESTIMATED VALUE

LATERAL
ACCELERATION
DRIFT AMOUNT
ESTIMATED VALUE

VERTICAL
ACCELERATION
DRIFT AMOUNT
ESTIMATED VALUE

ROLL ANGULAR
VELOCITY
DRIFT AMOUNT
ESTIMATED VALUE

YAW ANGULAR
VELOCITY
DRIFT AMOUNT
ESTIMATED VALUE

TIME [s]

MOUNTAINOUS CIRCUIT ROAD   LIMITED RUNNING
BROKEN LINE: NO DRIFT
SOLID LINE: DRIFT ADAPTED

TIME [s]

LONGITUDINAL
ACCELERATION
DRIFT AMOUNT
ESTIMATED VALUE

LATERAL
ACCELERATION
DRIFT AMOUNT
ESTIMATED VALUE

VERTICAL
ACCELERATION
DRIFT AMOUNT
ESTIMATED VALUE

ROLL ANGULAR
VELOCITY
DRIFT AMOUNT
ESTIMATED VALUE

YAW ANGULAR
VELOCITY
DRIFT AMOUNT
ESTIMATED VALUE

TIME [s]

MOUNTAINOUS CIRCUIT ROAD   LIMITED RUNNING
BROKEN LINE: NO DRIFT
SOLID LINE: DRIFT ADAPTED
THIN LINE: NO ADAPTATION

TIME [s]

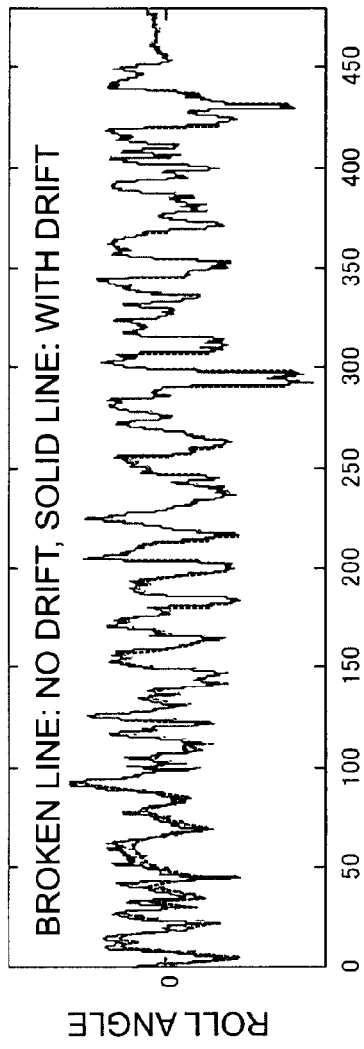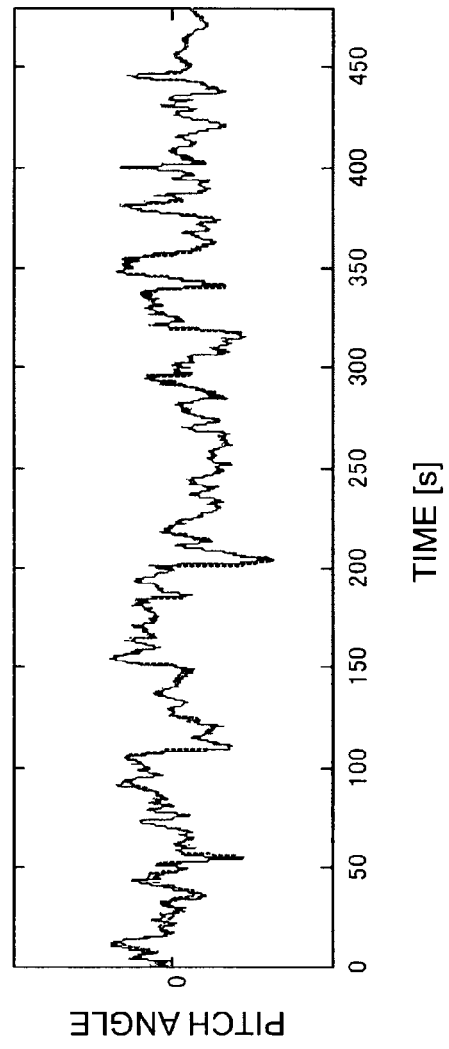
FIG.28A
FIG.28B

FIG.35
BROKEN LINE: TRUE VALUES,
SOLID LINE: ESTIMATED VALUES
LONGITUDINAL ACCELERATION
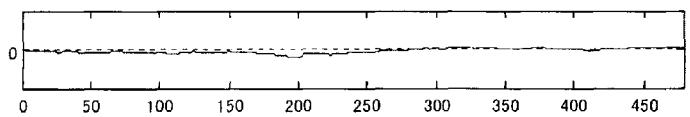
LATERAL ACCELERATION
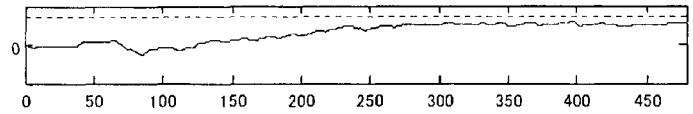
VERTICAL ACCELERATION
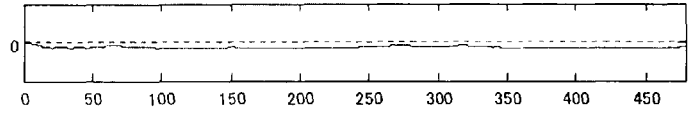
ROLL ANGULAR VELOCITY
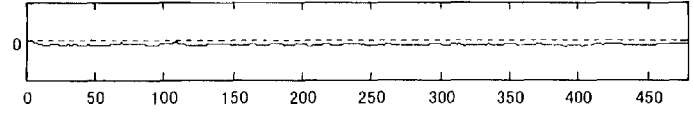
YAW ANGULAR VELOCITY
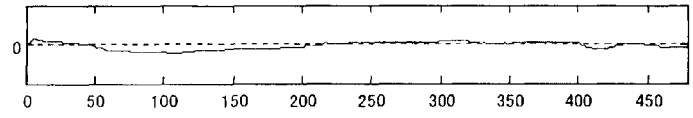
TIME [s]

SENSOR DRIFT AMOUNT ESTIMATING DEVICE

TECHNICAL FIELD

The present invention relates to a sensor drift amount estimating device, and in particular, relates to a sensor drift amount estimating device that estimates a sensor drift amount of a sensor signal corresponding to a detected value of a motion state amount of vehicle motion.

BACKGROUND TECHNOLOGY

Conventionally, in an attitude angle estimating device that estimates attitude angles of a vehicle by using in-vehicle angular velocity sensors and acceleration sensors, because the zero point drifts of the in-vehicle angular velocity sensors and acceleration sensors greatly affect the estimation of the attitude angles, there is the need to successively estimate and compensate the zero point drifts.

As conventional techniques that estimate the zero point drift of such a sensor, there are known a technique (for example, Patent Document 1) that, when the sensor output is within a threshold value for greater than or equal to a uniform time, judges that an object is stationary and makes the sensor output value at this time be the sensor drift amount, and a technique (for example, Patent Document 2) that, when the left-right difference of the wheel speeds is small, judges there to be a straight traveling state, and makes the lateral acceleration at this time be the lateral acceleration sensor drift amount, and the like.

PRIOR ART DOCUMENTS

Patent Documents

Patent Document 1: Japanese Patent No. 3795498
Patent Document 2: Japanese Patent Application Laid-Open No. 7-40043

SUMMARY OF THE INVENTION

Problems to be Solved by the Invention

However, in the techniques disclosed in above Patent Documents 1, 2, there is judged to be a stationary state or a straight traveling state, and the sensor output at this time is computed as the drift amount. Therefore, there is the problem that, if the object in which the sensor is installed is not stationary or if it is not moving at a uniform speed, the drift amount of the sensor cannot be estimated.

The present invention was made in order to overcome the above problematic point, and an object thereof is to provide a sensor drift amount estimating device that, regardless of the state of vehicle motion, can stably estimate the drift amount of a sensor.

Means for Solving the Problems

In order to achieve the above object, a sensor drift amount estimating device relating to a first invention is structured to include attitude angle estimating means for, on the basis of a sensor signal corresponding to a detected value of a motion state amount of vehicle motion, computing a derivative amount of an attitude angle with respect to a vertical axis of a vehicle body, and integrating the computed derivative amount of the attitude angle, and estimating the attitude angle; computing means for, on the basis of the sensor signal and the attitude angle estimated by the attitude angle estimating means, computing a derivative amount of the attitude angle obtained from equations of motion for vehicle motion; and drift amount estimating means for estimating a sensor drift amount of the sensor signal by using a relationship that, when taking a sensor drift amount of the sensor signal into consideration, a derivative amount of the attitude angle that is computed by the attitude angle estimating means, and a value that considers the sensor drift amount in the derivative amount of the attitude angle computed by the computing means, are equal.

In accordance with the sensor drift amount estimating device relating to the first invention, by the attitude angle estimating means, on the basis of a sensor signal corresponding to a detected value of a motion state amount of vehicle motion, a derivative amount of an attitude angle with respect to a vertical axis of a vehicle body is computed, and the computed derivative amount of the attitude angle is integrated, and the attitude angle is estimated. Further, by the computing means, on the basis of the sensor signal and the attitude angle estimated by the attitude angle estimating means, a derivative amount of the attitude angle obtained from equations of motion for vehicle motion is computed.

Further, by the drift amount estimating means, a sensor drift amount of the sensor signal is estimated by using a relationship that, when taking a sensor drift amount of the sensor signal into consideration, a derivative amount of the attitude angle that is computed by the attitude angle estimating means, and a value that considers the sensor drift amount in the derivative amount of the attitude angle computed by the computing means, are equal.

In this way, by estimating the sensor drift amount by using the relationship between the derivative amount of the attitude angle computed in order to estimate the attitude angle and the derivative amount of the attitude angle obtained from equations of motion for vehicle motion, the drift amount of the sensor can be estimated stably regardless of the state of vehicle motion.

The sensor drift amount estimating device relating to the first invention may further comprise correcting means for correcting the sensor signal on the basis of the sensor drift amount estimated by the drift amount estimating means, wherein the attitude angle estimating means may estimate the attitude angle on the basis of the sensor signal corrected by the correcting means. Due thereto, the attitude angle can be estimated accurately.

A sensor drift amount estimating device relating to a second invention is structured to include vehicle speed estimating means for, on the basis of a sensor signal corresponding to a detected value of a motion state amount of vehicle motion, computing a derivative amount of vehicle speed, and integrating the derivative amount of the vehicle speed, and estimating the vehicle speed; computing means for, on the basis of the sensor signal and the vehicle speed estimated by the vehicle speed estimating means, computing a derivative amount of the vehicle speed obtained from equations of motion for vehicle motion; and drift amount estimating means for estimating a sensor drift amount of the sensor signal by using a relationship that, when taking a sensor drift amount of the sensor signal into consideration, a derivative amount of the vehicle speed that is computed by the vehicle speed estimating means, and a value that considers the sensor drift amount in the derivative amount of the vehicle speed computed by the computing means, are equal.

In accordance with the sensor drift amount estimating device relating to the second invention, by the vehicle speed estimating means, on the basis of a sensor signal corresponding to a detected value of a motion state amount of vehicle motion, a derivative amount of vehicle speed is computed, and the derivative amount of the vehicle speed is integrated, and the vehicle speed is estimated. Further, by the computing means, on the basis of the sensor signal and the vehicle speed estimated by the vehicle speed estimating means, a derivative amount of the vehicle speed obtained from equations of motion for vehicle motion is computed.

Further, by the drift amount estimating means, a sensor drift amount of the sensor signal is estimated by using a relationship that, when taking a sensor drift amount of the sensor signal into consideration, a derivative amount of the vehicle speed that is computed by the vehicle speed estimating means, and a value that considers the sensor drift amount in the derivative amount of the vehicle speed computed by the computing means, are equal.

In this way, by estimating the sensor drift amount by using the relationship between the derivative amount of the vehicle speed computed in order to estimate the vehicle speed and the derivative amount of the vehicle speed obtained from equations of motion for vehicle motion, the drift amount of the sensor can be estimated stably regardless of the state of vehicle motion.

The sensor drift amount estimating device relating to the second invention may further comprise correcting means for correcting the sensor signal on the basis of the sensor drift amount estimated by the drift amount estimating means, wherein the vehicle speed estimating means may estimate the vehicle speed on the basis of the sensor signal corrected by the correcting means, and may estimate a slip angle on the basis of the estimated vehicle speed. Due thereto, the vehicle speed can be estimated accurately.

A sensor drift estimating device relating to a third invention is structured to include attitude angle estimating means for, on the basis of sensor signals corresponding to respective detected values of vertical acceleration, roll angular velocity, and yaw angular velocity of vehicle motion, computing respective derivative amounts of a roll angle and a pitch angle with respect to a vertical axis of a vehicle body, and integrating the respective computed derivative amounts of the roll angle and the pitch angle, and estimating the roll angle and the pitch angle; computing means for, on the basis of the sensor signals and the roll angle and the pitch angle estimated by the attitude angle estimating means, computing respective derivative amounts of the roll angle and the pitch angle obtained from equations of motion for vehicle motion; and drift amount estimating means for estimating respective sensor drift amounts of a sensor signal corresponding to a detected value of the vertical acceleration and a sensor signal corresponding to a detected value of the roll angular velocity, by using a relationship that, when taking sensor drift amounts of the sensor signals into consideration, respective derivative amounts of the roll angle and the pitch angle that are computed by the attitude angle estimating means, and values that consider the sensor drift amounts in the respective derivative amounts of the roll angle and the pitch angle computed by the computing means, are equal.

In accordance with the sensor drift estimating device relating to the third invention, by the attitude angle estimating means, on the basis of sensor signals corresponding to respective detected values of vertical acceleration, longitudinal acceleration, lateral acceleration, roll angular velocity, and yaw angular velocity of vehicle motion, respective derivative amounts of a roll angle and a pitch angle with respect to a vertical axis of a vehicle body are computed, and the respective computed derivative amounts of the roll angle and the pitch angle are integrated, and the roll angle and the pitch angle are estimated. Further, by the computing means, on the basis of the sensor signals and the roll angle and the pitch angle estimated by the attitude angle estimating means, respective derivative amounts of the roll angle and the pitch angle obtained from equations of motion for vehicle motion are computed.

Further, by the drift amount estimating means, respective sensor drift amounts of the sensor signal corresponding to the detected value of the vertical acceleration and the sensor signal corresponding to the detected value of the roll angular velocity are estimated by using a relationship that, when taking sensor drift amounts of the sensor signals into consideration, respective derivative amounts of the roll angle and the pitch angle that are computed by the attitude angle estimating means, and values that consider the sensor drift amounts in the respective derivative amounts of the roll angle and the pitch angle computed by the computing means, are equal.

In this way, by estimating the sensor drift amounts of the sensors that respectively detect the vertical acceleration and the roll angular velocity by using the relationship between the respective derivative amounts of the roll angle and the pitch angle computed in order to estimate the roll angle and the pitch angle and the respective derivative amounts of the roll angle and the pitch angle obtained from equations of motion for vehicle motion, the drift amounts of the sensors that respectively detect the vertical acceleration and the roll angular velocity can be estimated stably regardless of the state of vehicle motion.

The sensor drift amount estimating device relating to the third invention may further comprise correcting means for, on the basis of the sensor drift amounts estimated by the drift amount estimating means, respectively correcting the sensor signal corresponding to the detected value of the vertical acceleration and the sensor signal corresponding to the detected value of the roll angular velocity, wherein the attitude angle estimating means may estimate the roll angle and the pitch angle on the basis of the sensor signals corresponding to the respective detected values of the longitudinal acceleration, the lateral acceleration, and the yaw angular velocity, and the sensor signals corresponding to the respective detected values of the vertical acceleration and the roll angular velocity corrected by the correcting means. Due thereto, the roll angle and the pitch angle can be estimated accurately.

A sensor drift estimating device relating to a fourth invention is structured to include vehicle speed estimating means for, on the basis of sensor signals corresponding to respective detected values of longitudinal acceleration, lateral acceleration, and yaw angular velocity of vehicle motion, computing respective derivative amounts of longitudinal velocity and lateral velocity, and integrating the respective derivative amounts of the longitudinal velocity and the lateral velocity, and estimating the longitudinal velocity and the lateral velocity; computing means for, on the basis of the sensor signals and the longitudinal velocity and the lateral velocity estimated by the vehicle speed estimating means, computing respective derivative amounts of the longitudinal velocity and the lateral velocity obtained from equations of motion for vehicle motion; and drift amount estimating means for estimating sensor drift amounts of the sensor signals corresponding to the respective detected values of the longitudinal acceleration, the lateral acceleration, and the yaw angular velocity by using a relationship that, when taking sensor drift amounts of the sensor signals into consideration, respective derivative amounts of the longitudinal velocity and the lateral velocity that are computed by the vehicle speed estimating means, and values that consider the sensor drift amounts in the respective derivative amounts of the longitudinal velocity and the lateral velocity computed by the computing means, are equal.

In accordance with the sensor drift estimating device relating to the fourth invention, by the vehicle speed estimating means, on the basis of sensor signals corresponding to respective detected values of longitudinal acceleration, lateral acceleration, and yaw angular velocity of vehicle motion, respective derivative amounts of longitudinal velocity and lateral velocity are computed, and the respective derivative amounts of the longitudinal velocity and the lateral velocity are integrated, and the longitudinal velocity and the lateral velocity are estimated. Further, by the computing means, on the basis of the sensor signals and the longitudinal velocity and the lateral velocity estimated by the vehicle speed estimating means, respective derivative amounts of the longitudinal velocity and the lateral velocity obtained from equations of motion for vehicle motion are computed.

Further, by the drift amount estimating means, sensor drift amounts of the sensor signals corresponding to the respective detected values of the longitudinal acceleration, the lateral acceleration, and the yaw angular velocity are estimated by using a relationship that, when taking sensor drift amounts of the sensor signals into consideration, respective derivative amounts of the longitudinal velocity and the lateral velocity that are computed by the vehicle speed estimating means, and values that consider the sensor drift amounts in the respective derivative amounts of the longitudinal velocity and the lateral velocity computed by the computing means, are equal.

In this way, by estimating the sensor drift amounts of the sensors that respectively detect the longitudinal acceleration, the lateral acceleration, and the yaw angular velocity by using the relationship between the respective derivative amounts of the longitudinal velocity and the lateral velocity computed in order to estimate the longitudinal velocity and the lateral velocity and the respective derivative amounts of the longitudinal velocity and the lateral velocity obtained from equations of motion for vehicle motion, the drift amounts of the sensors that respectively detect the longitudinal acceleration, the lateral acceleration, and the yaw angular velocity can be estimated stably regardless of the state of vehicle motion.

The sensor drift estimating device relating to the fourth invention may further comprise correcting means for, on the basis of the sensor drift amounts estimated by the drift amount estimating means, correcting the sensor signals corresponding to the respective detected values of the longitudinal acceleration, the lateral acceleration, and the yaw angular velocity, wherein the vehicle speed estimating means may estimate the longitudinal velocity and the lateral velocity on the basis of the sensor signals corrected by the correcting means, and may estimate a slip angle on the basis of the estimated longitudinal velocity and lateral velocity. Due thereto, the slip angle can be estimated accurately.

A sensor drift amount estimating device relating to a fifth invention is structured to include attitude angle estimating means for, on the basis of sensor signals corresponding to respective detected values of longitudinal acceleration, lateral acceleration, vertical acceleration, roll angular velocity, and yaw angular velocity of vehicle motion, computing respective derivative amounts of a roll angle and a pitch angle with respect to a vertical axis of a vehicle body, and integrating the respective computed derivative amounts of the roll angle and the pitch angle, and estimating the roll angle and the pitch angle; vehicle speed estimating means for, on the basis of sensor signals corresponding to respective detected values, computing respective derivative amounts of longitudinal velocity and lateral velocity, and integrating the respective derivative amounts of the longitudinal velocity and the lateral velocity, and estimating the longitudinal velocity and the lateral velocity; computing means for, on the basis of the sensor signals and the roll angle and the pitch angle estimated by the attitude angle estimating means, computing respective derivative amounts of the roll angle and the pitch angle obtained from equations of motion for vehicle motion, and, on the basis of the sensor signals and the longitudinal velocity and the lateral velocity estimated by the vehicle speed estimating means, computing respective derivative amounts of the longitudinal velocity and the lateral velocity obtained from equations of motion for vehicle motion; and drift amount estimating means for estimating respective sensor drift amounts of the sensor signal corresponding to the detected value of the vertical acceleration and the sensor signal corresponding to the detected value of the roll angular velocity by using a relationship that, when taking sensor drift amounts of the sensor signals into consideration, respective derivative amounts of the roll angle and the pitch angle that are computed by the attitude angle estimating means, and values that consider the sensor drift amounts in the respective derivative amounts of the roll angle and the pitch angle computed by the computing means, are equal, and for estimating sensor drift amounts of the sensor signals corresponding to the respective detected values of the longitudinal acceleration, the lateral acceleration, and the yaw angular velocity by using a relationship that, when taking sensor drift amounts of the sensor signals into consideration, respective derivative amounts of the longitudinal velocity and the lateral velocity that are computed by the vehicle speed estimating means, and values that consider the sensor drift amounts in the respective derivative amounts of the longitudinal velocity and the lateral velocity computed by the computing means, are equal.

In accordance with the sensor drift amount estimating device relating to the fifth invention, by the attitude angle estimating means, on the basis of sensor signals corresponding to respective detected values of longitudinal acceleration, lateral acceleration, vertical acceleration, roll angular velocity, and yaw angular velocity of vehicle motion, respective derivative amounts of a roll angle and a pitch angle with respect to a vertical axis of a vehicle body are computed, and the respective computed derivative amounts of the roll angle and the pitch angle are integrated, and the roll angle and the pitch angle are estimated. Further, by the vehicle speed estimating means, on the basis of sensor signals corresponding to respective detected values, respective derivative amounts of longitudinal velocity and lateral velocity are computed, and the respective derivative amounts of the longitudinal velocity and the lateral velocity are integrated, and the longitudinal velocity and the lateral velocity are estimated. Further, by the computing means, on the basis of the sensor signals and the roll angle and the pitch angle estimated by the attitude angle estimating means, respective derivative amounts of the roll angle and the pitch angle obtained from equations of motion for vehicle motion are computed, and, on the basis of the sensor signals and the longitudinal velocity and the lateral velocity estimated by the vehicle speed estimating means, respective derivative amounts of the longitudinal velocity and the lateral velocity obtained from equations of motion for vehicle motion are computed.

Further, by the drift amount estimating means, respective sensor drift amounts of the sensor signal corresponding to the detected value of the vertical acceleration and the sensor signal corresponding to the detected value of the roll angular velocity are estimated by using a relationship that, when taking sensor drift amounts of the sensor signals into consideration, respective derivative amounts of the roll angle and the pitch angle that are computed by the attitude angle estimating means, and values that consider the sensor drift amounts in the respective derivative amounts of the roll angle and the pitch angle computed by the computing means, are equal, and sensor drift amounts of the sensor signals corresponding to the respective detected values of the longitudinal acceleration, the lateral acceleration, and the yaw angular velocity are estimated by using a relationship that, when taking sensor drift amounts of the sensor signals into consideration, respective derivative amounts of the longitudinal velocity and the lateral velocity that are computed by the vehicle speed estimating means, and values that consider the sensor drift amounts in the respective derivative amounts of the longitudinal velocity and the lateral velocity computed by the computing means, are equal.

In this way, by estimating sensor drift amounts of the sensors that respectively detect the vertical acceleration and the roll angular velocity by using the relationship between the respective derivative amounts of the roll angle and the pitch angle computed in order to estimate the roll angle and the pitch angle and the respective derivative amounts of the roll angle and the pitch angle obtained from equations of motion for vehicle motion, and by estimating sensor drift amounts of the sensors that respectively detect the longitudinal acceleration, the lateral acceleration, and the yaw angular velocity by using the relationship between the respective derivative amounts of the longitudinal velocity and the lateral velocity computed in order to estimate the longitudinal velocity and the lateral velocity and the respective derivative amounts of the longitudinal velocity and the lateral velocity obtained from equations of motion for vehicle motion, the drift amounts of the sensors that respectively detect the vertical acceleration, the roll angular velocity, the longitudinal acceleration, the lateral acceleration, and the yaw angular velocity can be estimated stably regardless of the state of vehicle motion.

The sensor drift estimating device relating to the fifth invention may further comprise correcting means for, on the basis of the sensor drift amounts estimated by the drift amount estimating means, correcting sensor signals corresponding to respective detected values, wherein the attitude angle estimating means may estimate the roll angle and the pitch angle on the basis of the sensor signals corresponding to the respective detected values corrected by the correcting means, and the vehicle speed estimating means may estimate the longitudinal velocity and the lateral velocity on the basis of the sensor signals corresponding to the respective detected values corrected by the correcting means, and may estimate a slip angle on the basis of the estimated longitudinal velocity and lateral velocity. Due thereto, the roll angle and the pitch angle can be estimated accurately, and the slip angle can be estimated accurately.

The attitude angle estimating means relating to the third invention and the fifth invention may compute the respective derivative amounts of the roll angle and the pitch angle that were corrected on the basis of a changed amount of the sensor drift amount estimated by the drift amount estimating means and a sensor drift amount estimated in the past for each of the sensor signal corresponding to the detected value of the roll angular velocity and the sensor signal corresponding to the detected value of the vertical acceleration, and may integrate the respective computed derivative amounts of the roll angle and the pitch angle, and may estimate the roll angle and the pitch angle. Due thereto, even when the learning speed of the sensor drift amounts is slow, the roll angle and the pitch angle can be estimated accurately by correcting the respective derivative amounts of the roll angle and the pitch angle in accordance with the changed amounts of the estimated sensor drift amounts.

The vehicle speed estimating means relating to the fourth invention and the fifth invention may compute the respective derivative amounts of the longitudinal velocity and the lateral velocity that were corrected on the basis of a changed amount of the sensor drift amount estimated by the drift amount estimating means and a sensor drift amount estimated in the past for each of the sensor signal corresponding to the detected value of the longitudinal acceleration and the sensor signal corresponding to the detected value of the lateral acceleration, and may integrate the respective computed derivative amounts of the longitudinal velocity and the lateral velocity, and may estimate the longitudinal velocity and the lateral velocity. Due thereto, even when the learning speed of the sensor drift amounts is slow, the longitudinal velocity and the lateral velocity can be estimated accurately by correcting the respective derivative amounts of the longitudinal velocity and the lateral velocity in accordance with the changed amounts of the estimated sensor drift amounts.

A sensor drift amount estimating device relating to a sixth invention is structured to include attitude angle estimating means for, on the basis of sensor signals corresponding to respective detected values of vertical acceleration, longitudinal acceleration, lateral acceleration, roll angular velocity, pitch angular velocity, and yaw angular velocity of vehicle motion, computing respective derivative amounts of a roll angle and a pitch angle with respect to a vertical axis of a vehicle body, and integrating the respective computed derivative amounts of the roll angle and the pitch angle, and estimating the roll angle and the pitch angle; computing means for, on the basis of the sensor signals and the roll angle and the pitch angle estimated by the attitude angle estimating means, computing respective derivative amounts of the roll angle and the pitch angle obtained from equations of motion for vehicle motion; and drift amount estimating means for estimating respective sensor drift amounts of the sensor signal corresponding to the detected value of the pitch angular velocity and the sensor signal corresponding to the detected value of the roll angular velocity, by using a relationship that, when taking sensor drift amounts of the sensor signals into consideration, respective derivative amounts of the roll angle and the pitch angle that are computed by the attitude angle estimating means, and values that consider the sensor drift amounts in the respective derivative amounts of the roll angle and the pitch angle computed by the computing means, are equal.

In accordance with the sensor drift amount estimating device relating to the sixth invention, by the attitude angle estimating means, on the basis of sensor signals corresponding to respective detected values of vertical acceleration, longitudinal acceleration, lateral acceleration, roll angular velocity, pitch angular velocity, and yaw angular velocity of vehicle motion, respective derivative amounts of a roll angle and a pitch angle with respect to a vertical axis of a vehicle body are computed, and the respective computed derivative amounts of the roll angle and the pitch angle are integrated, and the roll angle and the pitch angle are estimated. Further, by the computing means, on the basis of the sensor signals and the roll angle and the pitch angle estimated by the attitude angle estimating means, respective derivative amounts of the roll angle and the pitch angle obtained from equations of motion for vehicle motion are computed.

Further, by the drift amount estimating means, respective sensor drift amounts of the sensor signal corresponding to the detected value of the pitch angular velocity and the sensor signal corresponding to the detected value of the roll angular velocity are estimated by using a relationship that, when taking sensor drift amounts of the sensor signals into consideration, respective derivative amounts of the roll angle and the pitch angle that are computed by the attitude angle estimating means, and values that consider the sensor drift amounts in the respective derivative amounts of the roll angle and the pitch angle computed by the computing means, are equal.

In this way, by estimating the sensor drift amounts of the sensors that respectively detect the pitch angular velocity and the roll angular velocity by using the relationship between the respective derivative amounts of the roll angle and the pitch angle computed in order to estimate the roll angle and the pitch angle and the respective derivative amounts of the roll angle and the pitch angle obtained from equations of motion for vehicle motion, the drift amounts of the sensors that respectively detect the pitch angular velocity and the roll angular velocity can be estimated stably regardless of the state of vehicle motion.

The sensor drift amount estimating device relating to the sixth invention may further comprise correcting means for, on the basis of the sensor drift amounts estimated by the drift amount estimating means, respectively correcting the sensor signal corresponding to the detected value of the pitch angular velocity and the sensor signal corresponding to the detected value of the roll angular velocity, wherein the attitude angle estimating means may estimate the roll angle and the pitch angle on the basis of the sensor signals corresponding to the respective detected values of the vertical acceleration, the longitudinal acceleration, the lateral acceleration, and the yaw angular velocity, and the sensor signals corresponding to the respective detected values of the pitch angular velocity and the roll angular velocity corrected by the correcting means. Due thereto, the roll angle and the pitch angle can be estimated accurately.

A sensor drift estimating device relating to a seventh invention is structured to include attitude angle estimating means for, on the basis of sensor signals corresponding to respective detected values of longitudinal acceleration, lateral acceleration, vertical acceleration, roll angular velocity, pitch angular velocity, and yaw angular velocity of vehicle motion, computing respective derivative amounts of a roll angle and a pitch angle with respect to a vertical axis of a vehicle body, and integrating the respective computed derivative amounts of the roll angle and the pitch angle, and estimating the roll angle and the pitch angle; vehicle speed estimating means for, on the basis of sensor signals corresponding to respective detected values, computing respective derivative amounts of longitudinal velocity and lateral velocity, and integrating the respective derivative amounts of the longitudinal velocity and the lateral velocity, and estimating the longitudinal velocity and the lateral velocity; computing means for, on the basis of the sensor signals and the roll angle and the pitch angle estimated by the attitude angle estimating means, computing respective derivative amounts of the roll angle and the pitch angle obtained from equations of motion for vehicle motion, and, on the basis of the sensor signals and the longitudinal velocity and the lateral velocity estimated by the vehicle speed estimating means, computing respective derivative amounts of the longitudinal velocity and the lateral velocity obtained from equations of motion for vehicle motion; and drift amount estimating means for estimating respective sensor drift amounts of the sensor signal corresponding to the detected value of the pitch angular velocity and the sensor signal corresponding to the detected value of the roll angular velocity by using a relationship that, when taking sensor drift amounts of the sensor signals into consideration, respective derivative amounts of the roll angle and the pitch angle that are computed by the attitude angle estimating means, and values that consider the sensor drift amounts in the respective derivative amounts of the roll angle and the pitch angle computed by the computing means, are equal, and for estimating sensor drift amounts of the sensor signals corresponding to the respective detected values of the longitudinal acceleration, the lateral acceleration, and the yaw angular velocity by using a relationship that, when taking sensor drift amounts of the sensor signals into consideration, respective derivative amounts of the longitudinal velocity and the lateral velocity that are computed by the vehicle speed estimating means, and values that consider the sensor drift amounts in the respective derivative amounts of the longitudinal velocity and the lateral velocity computed by the computing means, are equal.

In accordance with the sensor drift amount estimating device relating to the seventh invention, by the attitude angle estimating means, on the basis of sensor signals corresponding to respective detected values of longitudinal acceleration, lateral acceleration, vertical acceleration, roll angular velocity, pitch angular velocity, and yaw angular velocity of vehicle motion, respective derivative amounts of a roll angle and a pitch angle with respect to a vertical axis of a vehicle body are computed, and the respective computed derivative amounts of the roll angle and the pitch angle are integrated, and the roll angle and the pitch angle are estimated. By the vehicle speed estimating means, on the basis of sensor signals corresponding to respective detected values, respective derivative amounts of longitudinal velocity and lateral velocity are computed, and the respective derivative amounts of the longitudinal velocity and the lateral velocity are integrated, and the longitudinal velocity and the lateral velocity are estimated. Further, by the computing means, on the basis of the sensor signals and the roll angle and the pitch angle estimated by the attitude angle estimating means, respective derivative amounts of the roll angle and the pitch angle obtained from equations of motion for vehicle motion are computed, and, on the basis of the sensor signals and the longitudinal velocity and the lateral velocity estimated by the vehicle speed estimating means, respective derivative amounts of the longitudinal velocity and the lateral velocity obtained from equations of motion for vehicle motion are computed.

Further, by the drift amount estimating means, respective sensor drift amounts of the sensor signal corresponding to the detected value of the pitch angular velocity and the sensor signal corresponding to the detected value of the roll angular velocity are estimated by using a relationship that, when taking sensor drift amounts of the sensor signals into consideration, respective derivative amounts of the roll angle and the pitch angle that are computed by the attitude angle estimating means, and values that consider the sensor drift amounts in the respective derivative amounts of the roll angle and the pitch angle computed by the computing means, are equal, and sensor drift amounts of the sensor signals corresponding to the respective detected values of the longitudinal acceleration, the lateral acceleration, and the yaw angular velocity are estimated by using a relationship that, when taking sensor drift amounts of the sensor signals into consideration, respective derivative amounts of the longitudinal velocity and the lateral velocity that are computed by the vehicle speed estimating means, and values that consider the sensor drift amounts in the respective derivative amounts of the longitudinal velocity and the lateral velocity computed by the computing means, are equal.

In this way, by estimating the sensor drift amounts of the sensors that respectively detect the pitch angular velocity and the roll angular velocity by using the relationship between the respective derivative amounts of the roll angle and the pitch angle computed in order to estimate the roll angle and the pitch angle and the respective derivative amounts of the roll angle and the pitch angle obtained from equations of motion for vehicle motion, and by estimating the sensor drift amounts of the sensors that respectively detect the longitudinal acceleration, the lateral acceleration, and the yaw angular velocity by using the relationship between the respective derivative amounts of the longitudinal velocity and the lateral velocity computed in order to estimate the longitudinal velocity and the lateral velocity and the respective derivative amounts of the longitudinal velocity and the lateral velocity obtained from equations of motion for vehicle motion, the drift amounts of the sensors that respectively detect the pitch angular velocity, the roll angular velocity, the longitudinal acceleration, the lateral acceleration, and the yaw angular velocity can be estimated stably regardless of the state of vehicle motion.

The sensor drift amount estimating device relating to the seventh invention may further comprise correcting means for, on the basis of the sensor drift amounts estimated by the drift amount estimating means, correcting sensor signals corresponding to respective detected values, wherein the attitude angle estimating means may estimate the roll angle and the pitch angle on the basis of the sensor signals corresponding to the respective detected values corrected by the correcting means, and the vehicle speed estimating means may estimate the longitudinal velocity and the lateral velocity on the basis of the sensor signals corresponding to the respective detected values corrected by the correcting means, and may estimate a slip angle on the basis of the estimated longitudinal velocity and lateral velocity. Due thereto, the roll angle and the pitch angle can be estimated accurately, and the slip angle can be estimated accurately.

The attitude angle estimating means relating to the sixth invention and the seventh invention may compute the respective derivative amounts of the roll angle and the pitch angle that were corrected on the basis of a changed amount of the sensor drift amount estimated by the drift amount estimating means and a sensor drift amount estimated in the past for each of the sensor signal corresponding to the detected value of the roll angular velocity and the sensor signal corresponding to the detected value of the pitch angular velocity, and may integrate the respective computed derivative amounts of the roll angle and the pitch angle, and may estimate the roll angle and the pitch angle. Due thereto, even when the learning speed of the sensor drift amounts is slow, the roll angle and the pitch angle can be estimated accurately by correcting the respective derivative amounts of the roll angle and the pitch angle in accordance with the changed amounts of the estimated sensor drift amounts.

The vehicle speed estimating means relating to the seventh invention may compute the respective derivative amounts of the longitudinal velocity and the lateral velocity that were corrected on the basis of a changed amount of the sensor drift amount estimated by the drift amount estimating means and a sensor drift amount estimated in the past for each of the sensor signal corresponding to the detected value of the longitudinal acceleration and the sensor signal corresponding to the detected value of the lateral acceleration, and may integrate the respective computed derivative amounts of the longitudinal velocity and the lateral velocity, and may estimate the longitudinal velocity and the lateral velocity. Due thereto, even when the learning speed of the sensor drift amounts is slow, the longitudinal velocity and the lateral velocity may be estimated accurately by correcting the respective derivative amounts of the longitudinal velocity and the lateral velocity in accordance with the changed amounts of the estimated sensor drift amounts.

The drift amount estimating means relating to the above fifth invention and seventh invention may estimate sensor drift amounts of the sensor signals corresponding to the respective detected values of the longitudinal acceleration, the lateral acceleration and the yaw angular velocity, and, on the basis of the estimated sensor drift amounts and the sensor drift amounts that were estimated the preceding time, may update the sensor drift amounts. Due thereto, the estimated sensor drift amounts can be smoothed.

The drift amount estimating means that updates the above sensor drift amounts may update the sensor drift amount of the sensor signal corresponding to the lateral acceleration on the basis of the estimated sensor drift amount of the sensor signal corresponding to the lateral acceleration and the sensor drift amount, estimated the preceding time, of the sensor signal corresponding to the lateral acceleration, only when an absolute value of the roll angle estimated by the attitude angle estimating means becomes small, by updating the sensor drift amount by using the estimated sensor drift amount of the sensor signal corresponding to the lateral acceleration. Due thereto, by updating the sensor drift amount such that the absolute value of the estimated value of the roll angle becomes small, an increase in the absolute value of the estimated value of the roll angle can be suppressed, and the attitude angles can be estimated more accurately.

The drift amount estimating means that updates the above sensor drift amounts may update the sensor drift amount of the sensor signal corresponding to the yaw angular velocity on the basis of the estimated sensor drift amount of the sensor signal corresponding to the yaw angular velocity and the sensor drift amount, estimated the preceding time, of the sensor signal corresponding to the yaw angular velocity, only when an absolute value of the roll angle estimated by the attitude angle estimating means becomes small, by updating the sensor drift amount by using the estimated sensor drift amount of the sensor signal corresponding to the yaw angular velocity. Due thereto, by updating the sensor drift amount such that the absolute value of the estimated value of the roll angle becomes small, an increase in the absolute value of the estimated value of the roll angle can be suppressed, and the attitude angles can be estimated more accurately.

The drift amount estimating means that updates the above sensor drift amounts may update the sensor drift amount of the sensor signal corresponding to the longitudinal acceleration on the basis of the estimated sensor drift amount of the sensor signal corresponding to the longitudinal acceleration and the sensor drift amount, estimated the preceding time, of the sensor signal corresponding to the longitudinal acceleration, only when an absolute value of the pitch angle estimated by the attitude angle estimating means becomes small, by updating the sensor drift amount by using the estimated sensor drift amount of the sensor signal corresponding to the longitudinal acceleration. Due thereto, by updating the sensor drift amount such that the absolute value of the estimated value of the pitch angle becomes small, an increase in the absolute value of the estimated value of the pitch angle can be suppressed, and the attitude angles can be estimated more accurately.

The drift amount estimating means that updates the above sensor drift amounts may update the sensor drift amount of the sensor signal corresponding to the lateral acceleration on the basis of the estimated sensor drift amount of the sensor signal corresponding to the lateral acceleration and the sensor drift amount, estimated the preceding time, of the sensor signal corresponding to the lateral acceleration, when an absolute value of the roll angle estimated by the attitude angle estimating means becomes small, by updating the sensor drift amount by using the estimated sensor drift amount of the sensor signal corresponding to the lateral acceleration, and when an absolute value of the roll angle estimated by the attitude angle estimating means becomes large, by updating the sensor drift amount by using the estimated sensor drift amount of the sensor signal corresponding to the lateral acceleration, the drift amount estimating means may make an extent of effect of the estimated sensor drift amount of the sensor signal corresponding to the lateral acceleration, in the updating of the sensor drift amount, small as compared with a case in which the absolute value of the roll angle becomes small by updating, and may update the sensor drift amount of the sensor signal corresponding to the lateral acceleration. Due thereto, an increase in the absolute value of the estimated value of the roll angle can be suppressed, and the attitude angles can be estimated more accurately.

The drift amount estimating means that updates the above sensor drift amounts may update the sensor drift amount of the sensor signal corresponding to the yaw angular velocity on the basis of the estimated sensor drift amount of the sensor signal corresponding to the yaw angular velocity and the sensor drift amount, estimated the preceding time, of the sensor signal corresponding to the yaw angular velocity, when an absolute value of the roll angle estimated by the attitude angle estimating means becomes small, by updating the sensor drift amount by using the estimated sensor drift amount of the sensor signal corresponding to the yaw angular velocity, and when an absolute value of the roll angle estimated by the attitude angle estimating means becomes large, by updating the sensor drift amount by using the estimated sensor drift amount of the sensor signal corresponding to the yaw angular velocity, the drift amount estimating means may make an extent of effect of the estimated sensor drift amount of the sensor signal corresponding to the yaw angular velocity, in the updating of the sensor drift amount, small as compared with a case in which the absolute value of the roll angle becomes small by updating, and may update the sensor drift amount of the sensor signal corresponding to the yaw angular velocity. Due thereto, an increase in the absolute value of the estimated value of the roll angle can be suppressed, and the attitude angles can be estimated more accurately.

The drift amount estimating means that updates the above sensor drift amounts may update the sensor drift amount of the sensor signal corresponding to the longitudinal acceleration on the basis of the estimated sensor drift amount of the sensor signal corresponding to the longitudinal acceleration and the sensor drift amount, estimated the preceding time, of the sensor signal corresponding to the longitudinal acceleration, when an absolute value of the pitch angle estimated by the attitude angle estimating means becomes small, by updating the sensor drift amount by using the estimated sensor drift amount of the sensor signal corresponding to the longitudinal acceleration, and when an absolute value of the pitch angle estimated by the attitude angle estimating means becomes large, by updating the sensor drift amount by using the estimated sensor drift amount of the sensor signal corresponding to the longitudinal acceleration, the drift amount estimating means may make an extent of effect of the estimated sensor drift amount of the sensor signal corresponding to the longitudinal acceleration, in the updating of the sensor drift amount, small as compared with a case in which the absolute value of the pitch angle becomes small by updating, and may update the sensor drift amount of the sensor signal corresponding to the longitudinal acceleration. Due thereto, an increase in the absolute value of the estimated value of the pitch angle can be suppressed, and the attitude angles can be estimated more accurately.

A sensor drift amount estimating device relating to an eighth invention is structured to include lateral velocity estimating means for, on the basis of sensor signals corresponding to respective detected values of lateral acceleration and yaw angular velocity of vehicle motion, and either a sensor signal corresponding to a detected value of vehicle speed or an estimated value by a vehicle speed estimating means that estimates the vehicle speed, computing a derivative amount of lateral velocity, and integrating the derivative amount of the lateral velocity, and estimating the lateral velocity; computing means for, on the basis of the sensor signals corresponding to the respective detected values of the lateral acceleration and the yaw angular velocity, and either the sensor signal corresponding to the detected value of the vehicle speed or the estimated value, computing a derivative amount of the lateral velocity obtained from equations of motion for vehicle motion; and drift amount estimating means for estimating sensor drift amounts of the sensor signals corresponding to the respective detected values of the lateral acceleration and the yaw angular velocity, by using a relationship that, when taking into consideration sensor drift amounts of the sensor signals corresponding to the respective detected values of the lateral acceleration and the yaw angular velocity, a derivative amount of the lateral velocity computed by the lateral velocity estimating means, and a value that considers the sensor drift amounts in the derivative amount of the lateral velocity computed by the computing means, are equal.

In accordance with the sensor drift amount estimating device relating to the eighth invention, by the lateral velocity estimating means, on the basis of sensor signals corresponding to respective detected values of lateral acceleration and yaw angular velocity of vehicle motion, and either a sensor signal corresponding to a detected value of vehicle speed or an estimated value by a vehicle speed estimating means that estimates the vehicle speed, a derivative amount of lateral velocity is computed, and the derivative amount of the lateral velocity is integrated, and the lateral velocity is estimated. Further, by the computing means, on the basis of the sensor signals corresponding to the respective detected values of the lateral acceleration and the yaw angular velocity, and either the sensor signal corresponding to the detected value of the vehicle speed or the estimated value, a derivative amount of the lateral velocity obtained from equations of motion for vehicle motion is computed.

Further, by the drift amount estimating means, sensor drift amounts of the sensor signals corresponding to the respective detected values of the lateral acceleration and the yaw angular velocity are estimated by using a relationship that, when taking into consideration sensor drift amounts of the sensor signals corresponding to the respective detected values of the lateral acceleration and the yaw angular velocity, a derivative amount of the lateral velocity computed by the lateral velocity estimating means, and a value that considers the sensor drift amounts in the derivative amount of the lateral velocity computed by the computing means, are equal.

In this way, by estimating the sensor drift amounts of the sensors that respectively detect the lateral acceleration and the yaw angular velocity by using the relationship between the derivative amount of the lateral velocity computed in order to estimate the lateral velocity and the derivative amount of the lateral velocity obtained from equations of motion for vehicle motion, the drift amounts of the sensors that respectively detect the lateral acceleration and the yaw angular velocity can be estimated stably regardless of the state of vehicle motion.

The sensor drift amount estimating device relating to the eight invention may further comprise correcting means for correcting the sensor signals corresponding to the respective detected values of the lateral acceleration and the yaw angular velocity, on the basis of the sensor drift amounts estimated by the drift amount estimating means, wherein the lateral velocity estimating means may estimate the lateral velocity on the basis of the sensor signals corrected by the correcting means. Due thereto, the lateral velocity can be estimated accurately.

The drift amount estimating means relating to the eight invention may derive, for each of a plurality of vehicle speed regions obtained by dividing a predetermined vehicle speed range, a relational expression that is weighted and that expresses a relationship between a deviation between the derivative amount of the lateral velocity computed by the lateral velocity estimating means and the derivative amount of the lateral velocity computed by the computing means, and the vehicle speed, and the sensor drift amounts, and, on the basis of the derived relational expression of each of the plurality of vehicle speed regions, may estimate the sensor drift amounts of the sensor signals corresponding to the respective detected values of the lateral acceleration and the yaw angular velocity. Due thereto, by using a relational expression that expresses the relationship of the deviation of the derivative amounts of the lateral velocity, the vehicle speed, and the sensor drift amounts and that is weighted for each of plural vehicle speed regions, the sensor drift amounts of the sensors that respectively detect the lateral acceleration and the yaw angular velocity can be estimated accurately.

A sensor drift amount estimating device relating to a ninth invention is structured to include slip angle estimating means for, on the basis of sensor signals corresponding to respective detected values of lateral acceleration and yaw angular velocity of vehicle motion, and either a sensor signal corresponding to a detected value of vehicle speed or an estimated value by a vehicle speed estimating means that estimates the vehicle speed, computing a derivative amount of a slip angle, and integrating the derivative amount of the slip angle, and estimating the slip angle; computing means for, on the basis of the sensor signals corresponding to the respective detected values of the lateral acceleration and the yaw angular velocity, and either the sensor signal corresponding to the detected value of the vehicle speed or the estimated value, computing a derivative amount of the slip angle obtained from equations of motion for vehicle motion; and drift amount estimating means for estimating sensor drift amounts of the sensor signals corresponding to the respective detected values of the lateral acceleration and the yaw angular velocity by using a relationship that, when taking into consideration the sensor drift amounts of the sensor signals corresponding to the respective detected values of the lateral acceleration and the yaw angular velocity, a derivative amount of the slip angle computed by the slip angle estimating means, and a value that considers the sensor drift amounts in the derivative amount of the slip angle computed by the computing means, are equal.

In accordance with the sensor drift amount estimating device relating to the ninth invention, by the slip angle estimating means, on the basis of sensor signals corresponding to respective detected values of lateral acceleration and yaw angular velocity of vehicle motion, and either a sensor signal corresponding to a detected value of vehicle speed or an estimated value by a vehicle speed estimating means that estimates the vehicle speed, a derivative amount of a slip angle is computed, and the derivative amount of the slip angle is integrated, and the slip angle is estimated. Further, by the computing means, on the basis of the sensor signals corresponding to the respective detected values of the lateral acceleration and the yaw angular velocity, and either the sensor signal corresponding to the detected value of the vehicle speed or the estimated value, a derivative amount of the slip angle obtained from equations of motion for vehicle motion is computed.

Further, by the drift amount estimating means, sensor drift amounts of the sensor signals corresponding to the respective detected values of the lateral acceleration and the yaw angular velocity are estimated by using a relationship that, when taking into consideration sensor drift amounts of the sensor signals corresponding to the respective detected values of the lateral acceleration and the yaw angular velocity, a derivative amount of the slip angle computed by the slip angle estimating means, and a value that considers the sensor drift amounts in the derivative amount of the slip angle computed by the computing means, are equal.

In this way, by estimating the sensor drift amounts of the sensors that respectively detect the lateral acceleration and the yaw angular velocity by using the relationship between the derivative amount of the slip angle computed in order to estimate the slip angle and the derivative amount of the slip angle obtained from equations of motion for vehicle motion, the drift amounts of the sensors that respectively detect the lateral acceleration and the yaw angular velocity can be estimated stably regardless of the state of vehicle motion.

The sensor drift amount estimating device relating to the ninth invention may further comprise correcting means for correcting the sensor signals corresponding to the respective detected values of the lateral acceleration and the yaw angular velocity, on the basis of the sensor drift amounts estimated by the drift amount estimating means, wherein the slip angle estimating means may estimate the slip angle on the basis of the sensor signals corrected by the correcting means. Due thereto, the slip angle can be estimated accurately.

The drift amount estimating means relating to the ninth invention may derive, for each of a plurality of vehicle speed regions obtained by dividing a predetermined vehicle speed range, a relational expression that is weighted and that expresses a relationship between a deviation between the derivative amount of the slip angle computed by the slip angle estimating means and the derivative amount of the slip angle computed by the computing means, and the vehicle speed, and the sensor drift amounts, and, on the basis of the derived relational expression of each of the plurality of vehicle speed regions, may estimate the sensor drift amounts of the sensor signals corresponding to the respective detected values of the lateral acceleration and the yaw angular velocity. Due thereto, by using a relational expression that expresses the relationship of the deviation of the derivative amounts of the slip angle, the vehicle speed, and the sensor drift amounts and that is weighted for each of plural vehicle speed regions, the sensor drift amounts of the sensors that respectively detect the lateral acceleration and the yaw angular velocity can be estimated accurately.

The greater a number of times that either the detected value or the estimated value of the vehicle speed is included in a corresponding vehicle speed region, the greater the weighting of the relational expression may be made to be, and, the greater a number of times that either the detected value or the estimated value of the vehicle speed is not included in a corresponding vehicle speed region, the smaller a weighting of the relational expression may be made to be. Due thereto, the sensor drift amounts of the sensors that respectively detect the lateral acceleration and the yaw angular velocity can be estimated accurately.

The present invention may be structured by programs that cause a computer to function as follows.

A first program is a program for causing a computer to function as attitude angle estimating means for, on the basis of a sensor signal corresponding to a detected value of a motion state amount of vehicle motion, computing a derivative amount of an attitude angle with respect to a vertical axis of a vehicle body, and integrating the computed derivative amount of the attitude angle, and estimating the attitude angle; computing means for, on the basis of the sensor signal and the attitude angle estimated by the attitude angle estimating means, computing a derivative amount of the attitude angle obtained from equations of motion for vehicle motion; and drift amount estimating means for estimating a sensor drift amount of the sensor signal by using a relationship that, when taking a sensor drift amount of the sensor signal into consideration, a derivative amount of the attitude angle that is computed by the attitude angle estimating means, and a value that considers the sensor drift amount in the derivative amount of the attitude angle computed by the computing means, are equal.

A second program is a program for causing a computer to function as vehicle speed estimating means for, on the basis of a sensor signal corresponding to a detected value of a motion state amount of vehicle motion, computing a derivative amount of vehicle speed, and integrating the derivative amount of the vehicle speed, and estimating the vehicle speed; computing means for, on the basis of the sensor signal and the vehicle speed estimated by the vehicle speed estimating means, computing a derivative amount of the vehicle speed obtained from equations of motion for vehicle motion; and drift amount estimating means for estimating a sensor drift amount of the sensor signal by using a relationship that, when taking a sensor drift amount of the sensor signal into consideration, a derivative amount of the vehicle speed that is computed by the vehicle speed estimating means, and a value that considers the sensor drift amount in the derivative amount of the vehicle speed computed by the computing means, are equal.

A third program is a program for causing a computer to function as attitude angle estimating means for, on the basis of sensor signals corresponding to respective detected values of vertical acceleration, longitudinal acceleration, lateral acceleration, roll angular velocity, and yaw angular velocity of vehicle motion, computing respective derivative amounts of a roll angle and a pitch angle with respect to a vertical axis of a vehicle body, and integrating the respective computed derivative amounts of the roll angle and the pitch angle, and estimating the roll angle and the pitch angle; computing means for, on the basis of the sensor signals and the roll angle and the pitch angle estimated by the attitude angle estimating means, computing respective derivative amounts of the roll angle and the pitch angle obtained from equations of motion for vehicle motion; and drift amount estimating means for estimating respective sensor drift amounts of the sensor signal corresponding to the detected value of the vertical acceleration and the sensor signal corresponding to the detected value of the roll angular velocity, by using a relationship that, when taking sensor drift amounts of the sensor signals into consideration, respective derivative amounts of the roll angle and the pitch angle that are computed by the attitude angle estimating means, and values that consider the sensor drift amounts in the respective derivative amounts of the roll angle and the pitch angle computed by the computing means, are equal.

A fourth program is a program for causing a computer to function as vehicle speed estimating means for, on the basis of sensor signals corresponding to respective detected values of longitudinal acceleration, lateral acceleration, and yaw angular velocity of vehicle motion, computing respective derivative amounts of longitudinal velocity and lateral velocity, and integrating the respective derivative amounts of the longitudinal velocity and the lateral velocity, and estimating the longitudinal velocity and the lateral velocity; computing means for, on the basis of the sensor signals and the longitudinal velocity and the lateral velocity estimated by the vehicle speed estimating means, computing respective derivative amounts of the longitudinal velocity and the lateral velocity obtained from equations of motion for vehicle motion; and drift amount estimating means for estimating sensor drift amounts of the sensor signals corresponding to the respective detected values of the longitudinal acceleration, the lateral acceleration, and the yaw angular velocity by using a relationship that, when taking sensor drift amounts of the sensor signals into consideration, respective derivative amounts of the longitudinal velocity and the lateral velocity that are computed by the vehicle speed estimating means, and values that consider the sensor drift amounts in the respective derivative amounts of the longitudinal velocity and the lateral velocity computed by the computing means, are equal.

A fifth program is a program for causing a computer to function as attitude angle estimating means for, on the basis of sensor signals corresponding to respective detected values of longitudinal acceleration, lateral acceleration, vertical acceleration, roll angular velocity, and yaw angular velocity of vehicle motion, computing respective derivative amounts of a roll angle and a pitch angle with respect to a vertical axis of a vehicle body, and integrating the respective computed derivative amounts of the roll angle and the pitch angle, and estimating the roll angle and the pitch angle; vehicle speed estimating means for, on the basis of sensor signals corresponding to respective detected values, computing respective derivative amounts of longitudinal velocity and lateral velocity, and integrating the respective derivative amounts of the longitudinal velocity and the lateral velocity, and estimating the longitudinal velocity and the lateral velocity; computing means for, on the basis of the sensor signals and the roll angle and the pitch angle estimated by the attitude angle estimating means, computing respective derivative amounts of the roll angle and the pitch angle obtained from equations of motion for vehicle motion, and, on the basis of the sensor signals and the roll angle, the pitch angle, the longitudinal velocity, and the lateral velocity estimated by the attitude angle estimating means, computing respective derivative amounts of the longitudinal velocity and the lateral velocity obtained from equations of motion for vehicle motion; and drift amount estimating means for estimating respective sensor drift amounts of the sensor signal corresponding to the detected value of the vertical acceleration and the sensor signal corresponding to the detected value of the roll angular velocity by using a relationship that, when taking sensor drift amounts of the sensor signals into consideration, respective derivative amounts of the roll angle and the pitch angle that are computed by the attitude angle estimating means, and values that consider the sensor drift amounts in the respective derivative amounts of the roll angle and the pitch angle computed by the computing means, are equal, and for estimating sensor drift amounts of the sensor signals corresponding to the respective detected values of the longitudinal acceleration, the lateral acceleration, and the yaw angular velocity by using a relationship that, when taking sensor drift amounts of the sensor signals into consideration, respective derivative amounts of the longitudinal velocity and the lateral velocity that are computed by the attitude angle estimating means, and values that consider the sensor drift amounts in the respective derivative amounts of the longitudinal velocity and the lateral velocity computed by the computing means, are equal.

A sixth program is a program for causing a computer to function as attitude angle estimating means for, on the basis of sensor signals corresponding to respective detected values of vertical acceleration, longitudinal acceleration, lateral acceleration, roll angular velocity, pitch angular velocity, and yaw angular velocity of vehicle motion, computing respective derivative amounts of a roll angle and a pitch angle with respect to a vertical axis of a vehicle body, and integrating the respective computed derivative amounts of the roll angle and the pitch angle, and estimating the roll angle and the pitch angle; computing means for, on the basis of the sensor signals and the roll angle and the pitch angle estimated by the attitude angle estimating means, computing respective derivative amounts of the roll angle and the pitch angle obtained from equations of motion for vehicle motion; and drift amount estimating means for estimating respective sensor drift amounts of the sensor signal corresponding to the detected value of the pitch angular velocity and the sensor signal corresponding to the detected value of the roll angular velocity, by using a relationship that, when taking sensor drift amounts of the sensor signals into consideration, respective derivative amounts of the roll angle and the pitch angle that are computed by the attitude angle estimating means, and values that consider the sensor drift amounts in the respective derivative amounts of the roll angle and the pitch angle computed by the computing means, are equal.

A seventh program is a program for causing a computer to function as attitude angle estimating means for, on the basis of sensor signals corresponding to respective detected values of longitudinal acceleration, lateral acceleration, vertical acceleration, roll angular velocity, pitch angular velocity, and yaw angular velocity of vehicle motion, computing respective derivative amounts of a roll angle and a pitch angle with respect to a vertical axis of a vehicle body, and integrating the respective computed derivative amounts of the roll angle and the pitch angle, and estimating the roll angle and the pitch angle; vehicle speed estimating means for, on the basis of sensor signals corresponding to respective detected values, computing respective derivative amounts of longitudinal velocity and lateral velocity, and integrating the respective derivative amounts of the longitudinal velocity and the lateral velocity, and estimating the longitudinal velocity and the lateral velocity; computing means for, on the basis of the sensor signals and the roll angle and the pitch angle estimated by the attitude angle estimating means, computing respective derivative amounts of the roll angle and the pitch angle obtained from equations of motion for vehicle motion, and, on the basis of the sensor signals and the longitudinal velocity and the lateral velocity estimated by the vehicle speed estimating means, computing respective derivative amounts of the longitudinal velocity and the lateral velocity obtained from equations of motion for vehicle motion; and drift amount estimating means for estimating respective sensor drift amounts of the sensor signal corresponding to the detected value of the pitch angular velocity and the sensor signal corresponding to the detected value of the roll angular velocity by using a relationship that, when taking sensor drift amounts of the sensor signals into consideration, respective derivative amounts of the roll angle and the pitch angle that are computed by the attitude angle estimating means, and values that consider the sensor drift amounts in the respective derivative amounts of the roll angle and the pitch angle computed by the computing means, are equal, and for estimating sensor drift amounts of the sensor signals corresponding to the respective detected values of the longitudinal acceleration, the lateral acceleration, and the yaw angular velocity by using a relationship that, when taking sensor drift amounts of the sensor signals into consideration, respective derivative amounts of the longitudinal velocity and the lateral velocity that are computed by the vehicle speed estimating means, and values that consider the sensor drift amounts in the respective derivative amounts of the longitudinal velocity and the lateral velocity computed by the computing means, are equal.

An eighth program is a program for causing a computer to function as lateral velocity estimating means for, on the basis of sensor signals corresponding to respective detected values of lateral acceleration and yaw angular velocity of vehicle motion, and either a sensor signal corresponding to a detected value of vehicle speed or an estimated value by a vehicle speed estimating means that estimates the vehicle speed, computing a derivative amount of lateral velocity, and integrating the derivative amount of the lateral velocity, and estimating the lateral velocity; computing means for, on the basis of the sensor signals corresponding to the respective detected values of the lateral acceleration and the yaw angular velocity, and either the sensor signal corresponding to the detected value of the vehicle speed or the estimated value, computing a derivative amount of the lateral velocity obtained from equations of motion for vehicle motion; and drift amount estimating means for estimating sensor drift amounts of the sensor signals corresponding to the respective detected values of the lateral acceleration and the yaw angular velocity, by using a relationship that, when taking into consideration sensor drift amounts of the sensor signals corresponding to the respective detected values of the lateral acceleration and the yaw angular velocity, a derivative amount of the lateral velocity computed by the lateral velocity estimating means, and a value that considers the sensor drift amounts in the derivative amount of the lateral velocity computed by the computing means, are equal.

A ninth program is a program for causing a computer to function as slip angle estimating means for, on the basis of sensor signals corresponding to respective detected values of lateral acceleration and yaw angular velocity of vehicle motion, and either a sensor signal corresponding to a detected value of vehicle speed or an estimated value by a vehicle speed estimating means that estimates the vehicle speed, computing a derivative amount of a slip angle, and integrating the derivative amount of the slip angle, and estimating the slip angle; computing means for, on the basis of the sensor signals corresponding to the respective detected values of the lateral acceleration and the yaw angular velocity, and either the sensor signal corresponding to the detected value of the vehicle speed or the estimated value, computing a derivative amount of the slip angle obtained from equations of motion for vehicle motion; and drift amount estimating means for estimating sensor drift amounts of the sensor signals corresponding to the respective detected values of the lateral acceleration and the yaw angular velocity by using a relationship that, when taking into consideration the sensor drift amounts of the sensor signals corresponding to the respective detected values of the lateral acceleration and the yaw angular velocity, a derivative amount of the slip angle computed by the slip angle estimating means, and a value that considers the sensor drift amounts in the derivative amount of the slip angle computed by the computing means, are equal.

Further, the present invention may be structured as a recording medium that stores at least one of the above programs.

Effects of the Invention

As described above, in accordance with the sensor drift amount estimating device of the present invention, there is the effect that, by estimating a sensor drift amount by using the relationship between the derivative amount of an attitude angle that is computed in order to estimate the attitude angle, and the derivative amount of the attitude angle that is obtained from equations of motion for vehicle motion, the drift amount of the sensor can be estimated stably regardless of the state of vehicle motion.

Further, in accordance with the sensor drift amount estimating device of the present invention, there is the effect that, by estimating a sensor drift amount by using the relationship between the derivative amount of vehicle speed that is computed in order to estimate the vehicle speed, and the derivative amount of vehicle speed that is obtained from equations of motion for vehicle motion, the drift amount of the sensor can be estimated stably regardless of the state of vehicle motion.

Further, in accordance with the sensor drift amount estimating device of the present invention, there is the effect that, by estimating a sensor drift amount by using the relationship between the derivative amount of a slip angle that is computed in order to estimate the slip angle, and the derivative amount of the slip angle that is obtained from equations of motion for vehicle motion, the drift amount of the sensor can be estimated stably regardless of the state of vehicle motion.

BRIEF DESCRIPTION OF THE DRAWINGS

FIG. 28A is a graph showing estimation results of a roll angle when an estimated value of a sensor drift amount is used, in a state in which a positive drift error is applied to a sensor signal of lateral acceleration.

FIG. 28B is a graph showing estimation results of a pitch angle when an estimated value of a sensor drift amount is used, in a state in which a positive drift error is applied to a sensor signal of lateral acceleration.

FIG. 35 is a graph showing estimation results of sensor drift amounts of respective sensors in a state in which a drift error is applied to lateral acceleration.

FORMS FOR IMPLEMENTING THE INVENTION

Embodiments of the present invention are described in detail below with reference to the drawings. The present embodiment is an application of the present invention to an attitude angle-slip angle estimating device that estimates a pitch angle and a roll angle that are attitude angles of a vehicle with respect to a vertical axis, and estimates a slip angle of the vehicle.

Figure 2:
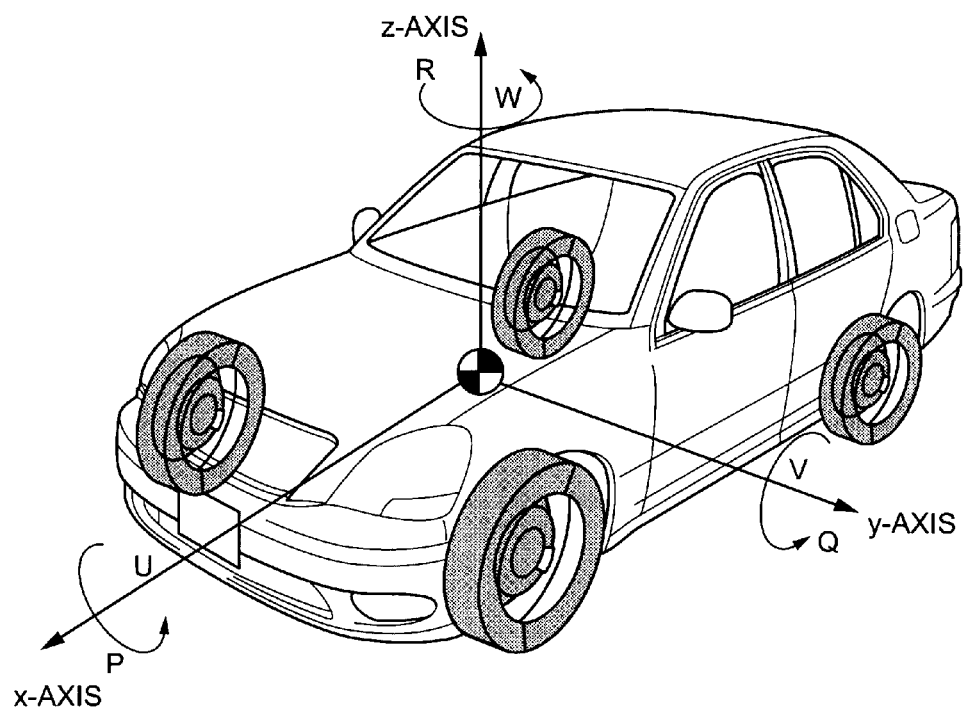
FIG. 2 is a drawing showing directions of respective axes that describe vehicle motion.

First, as shown in FIG. 2, rotation angular velocities around respective axes when the axes of vehicle motion are the x-axis from the center of gravity toward the vehicle front direction, and the y-axis from the center of gravity toward the vehicle left direction, and the z-axis vertically upward from the center of gravity, are defined as roll angular velocity, pitch angular velocity, and yaw angular velocity, respectively.

Figure 1:
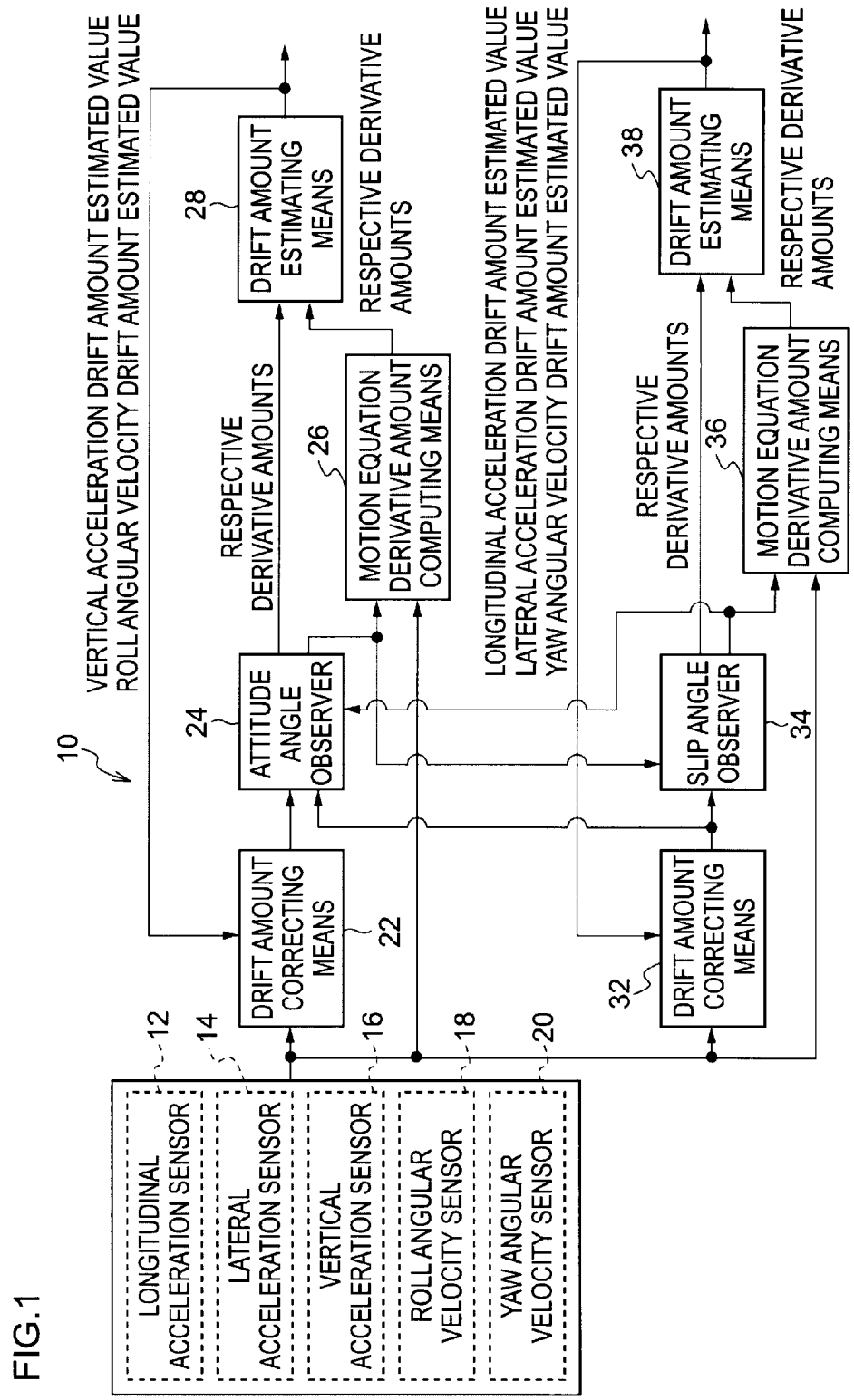
FIG. 1 is a schematic drawing showing the structure of an attitude angle-slip angle estimating device relating to a first embodiment of the present invention.

As shown in FIG. 1, an attitude angle-slip angle estimating device 10 relating to a first embodiment has a longitudinal acceleration sensor 12, a lateral acceleration sensor 14 and a vertical acceleration sensor 16 that respectively detect longitudinal acceleration $G_x$, lateral acceleration $G_y$ and vertical acceleration $G_z$ that are accelerations of the three axes of xyz of vehicle motion, and that output sensor signals corresponding to the detected values, and a roll angular velocity sensor 18 that detects a roll angular velocity P and outputs a sensor signal corresponding to the detected value, and a yaw angular velocity sensor 20 that detects a yaw angular velocity R and outputs a sensor signal corresponding to the detected value.

The vertical acceleration sensor 16 and the roll angular velocity sensor 18 are connected to a drift amount correcting means 22 that corrects the sensor signals from the respective sensors on the basis of sensor drift amounts estimated by a drift amount estimating means 28 that is described below. The drift amount correcting means 22 is connected to the drift amount estimating means 28.

The drift amount correcting means 22 is connected to an attitude angle observer 24 that estimates roll angle φ and pitch angle θ that are attitude angles with respect to the vertical axis of the vehicle body.

Further, the longitudinal acceleration sensor 12, the lateral acceleration sensor 14 and the yaw angular velocity sensor 20 are connected to a drift amount correcting means 32 that corrects the respective sensor signals from the longitudinal acceleration sensor 12, the lateral acceleration sensor 14 and the yaw angular velocity sensor 20, on the basis of respective sensor drift amounts of the longitudinal acceleration sensor 12, the lateral acceleration sensor 14 and the yaw angular velocity sensor 20 that are estimated by a drift amount estimating means 38 that is described below. The drift amount correcting means 32 is connected to the drift amount estimating means 38.

The vertical acceleration sensor 16, the roll angular velocity sensor 18, the drift amount correcting means 32 and the attitude angle observer 24 are connected to a motion equation derivative amount computing means 26 that computes respective derivative amounts of the roll angle and the pitch angle that are obtained from equations of motion for vehicle motion. Note that the yaw angular velocity whose drift amount is corrected is inputted from the drift amount correcting means 32 to the motion equation derivative amount computing means 26.

The attitude angle observer 24 and the motion equation derivative amount computing means 26 are connected to the drift amount estimating means 28 that estimates respective sensor drift amounts of the longitudinal acceleration sensor 16 and the roll angular velocity sensor 18.

The drift amount correcting means 32 is connected to a slip angle observer 34 that estimates a vehicle body slip angle.

The longitudinal acceleration sensor 12, the lateral acceleration sensor 14, the yaw angular velocity sensor 20, the attitude angle observer 24, and the slip angle observer 34 are connected to a motion equation derivative amount computing means 36 that computes the respective derivative amounts of the longitudinal vehicle body velocity and the lateral vehicle body velocity that are obtained from equations of motion for vehicle motion.

The slip angle observer 34 and the motion equation derivative amount computing means 36 are connected to the drift amount estimating means 38 that estimates respective sensor drift amounts of the longitudinal acceleration sensor 12, the lateral acceleration sensor 14, and the yaw angular velocity sensor 20.

The drift amount correcting means 22, the attitude angle observer 24, the motion equation derivative amount computing means 26, the drift amount estimating means 28, the drift amount correcting means 32, the slip angle observer 34, the motion equation derivative amount computing means 36, and the drift amount estimating means 38 can be structured by one or plural computers or by one or plural electronic circuits that realize the functions of the respective means.

The attitude angle observer 24 estimates pitch angular velocity Q on the basis of an estimated value of lateral vehicle body velocity V, an estimated value of longitudinal vehicle body velocity U that were estimated at the slip angle observer 34, and a corrected signal corresponding to the detected value of the vertical acceleration $G_z$ and a corrected signal corresponding to the detected value of the roll angular velocity P that were corrected at the drift amount correcting means 22. The attitude angle observer 24 estimates the roll angle φ and the pitch angle θ that are attitude angles with respect to the vertical axis of the vehicle body, on the basis of corrected signals corresponding to the respective detected values of the longitudinal acceleration $G_x$, the lateral acceleration $G_y$, the vertical acceleration $G_z$, the yaw angular velocity R, and the roll angular velocity P of vehicle motion that were corrected at the drift amount correcting means 22 and the drift amount correcting means 32, and an estimated value $V_{so}$ of the longitudinal vehicle body velocity U, and an estimated value of the pitch angular velocity Q.

Next, estimation of the pitch angular velocity is described. Equations of motion of a rigid body, that express the relationships between vehicle motion amounts and sensor signals, that are outputted from tri-axial sensors that are fixed to the rigid body and detect tri-axial accelerations and tri-axial angular velocities, can be described as follows.

[Formula 1]

$$\dot{U}+QW-RV=g\sin\theta+G_x \quad (1)$$

$$\dot{V}+RU-PW=-g\cos\theta\sin\phi+G_y \quad (2)$$

$$\dot{W}+PV-QU=-g\cos\theta\cos\phi+G_z \quad (3)$$

$$\dot{\phi}=P+Q\sin\theta\tan\theta+R\cos\phi\tan\theta \quad (4)$$

$$\dot{\theta}=Q\cos\phi-R\sin\phi \quad (5)$$

Wherein $G_x$: longitudinal acceleration, $G_y$: lateral acceleration, $G_z$: vertical acceleration, P: roll angular velocity, Q: pitch angular velocity, R: yaw angular velocity, U: longitudinal vehicle body velocity, V: lateral vehicle body velocity, W: vertical vehicle body velocity, φ: roll angle, θ: pitch angle, g: gravitational acceleration.

In the present embodiment, if a vehicle is considered to be a rigid body, the tri-axial velocities that are the longitudinal acceleration $G_x$, the lateral acceleration $G_y$, and the vertical acceleration $G_z$, and the bi-axial angular velocities that are the roll angular velocity P and the yaw angular velocity R, respectively are signals in which the drift amounts of the sensor signals, that are detected by the longitudinal acceleration sensor 12, the lateral acceleration sensor 14, the vertical acceleration sensor 16, the roll angular velocity sensor 18, and the yaw angular velocity sensor 20, have been corrected by the drift amount correcting means 22 or the drift amount correcting means 32. The lateral vehicle body velocity V can be estimated by the slip angle observer 34 that is described below. The longitudinal vehicle body velocity U can be estimated on the basis of the wheel speeds of the respective wheels.

In the present embodiment, in above equation (3), it is assumed that the change in the vertical vehicle body velocity W can be ignored (W=0), and estimated value Q tilde of the pitch angular velocity Q can be determined from following equation (6) by using the respective preceding estimated values φ tilde, θ tilde of the roll angle φ and the pitch angle θ, the preceding estimated value V tilde of the lateral vehicle body velocity V, and, as the longitudinal vehicle body velocity U, the estimated value $V_{so}$ of the longitudinal vehicle body velocity. The attitude angle observer 24 determines the estimated value Q tilde of the pitch angular velocity Q by implementing computation of following equation (6).

[Formula 2]

$$\tilde{Q} = \frac{(P - P_{dr})\tilde{V} + g\cos\tilde{\theta}\cos\tilde{\phi} - (G_z - G_{zdr})}{V_{so}} \qquad (6)$$

Note that, in above equation (6), $P-P_{dr}$ expresses a signal in which drift amount $P_{dr}$ of the sensor signal P of the roll angular velocity sensor 20 is corrected, $G_z-G_{zdr}$ expresses a signal in which drift amount $G_{zdr}$ of the sensor signal $G_z$ of the vertical acceleration sensor 16 is corrected.

When the pitch angular velocity is estimated as described above, the pitch angle also can be estimated by the attitude angle observer 24 simultaneously with the roll angle. The constraining conditions of motion that are particular to an automobile when using the attitude angle observer 24 are described. When using the above equations of motion and structuring the attitude angle observer 24, feedback of physical amounts that can be measured is needed so that the state amounts of the velocities and angles that are estimated by integration operation do not diverge. In the present embodiment, characteristics that are particular to automobile motion are used as follows as physical amounts that are fed-back. Note that, in the following equations, the respective preceding estimated values φ tilde, θ tilde are used as the roll angle φ and the pitch angle θ, the estimated value V tilde of the lateral vehicle body velocity V is used as the lateral vehicle body velocity, and the estimated value $V_{so}$ of the longitudinal vehicle body velocity is used as the longitudinal vehicle body velocity U, respectively.

When the estimated value $V_{so}$ of the longitudinal vehicle body velocity is differentiated and substituted into above equation (1), and the property that "wheel slip does not continue to increase over a long time period" with regard to the longitudinal direction of the vehicle body is used as a characteristic particular to automobile motion, the condition that is shown by following equation (7), that is used in feedback and in which changes in the vertical vehicle body velocity are ignored, is obtained from above equation (1).

[Formula 3]

$$\dot{V}_{so} - R\tilde{V}(G_x - G_{xdr}) = g\sin\tilde{\theta} \qquad (7)$$

Note that, in above equation (7), $G_x-G_{xdr}$ expresses a signal in which drift amount $G_{xdr}$ of the sensor signal $G_x$ of the longitudinal acceleration sensor 12 is corrected.

Above equation (7) describes the relationship between the pitch angle θ, and the difference between acceleration estimated from wheel speed (the derivative value of the estimated value $V_{so}$ of the longitudinal vehicle body velocity) and the longitudinal acceleration $G_x$.

Further, with regard to the lateral direction of the vehicle body, because the roll angular velocity and lateral acceleration can be ignored from the property that "the slip angle does not continue to increase over a long time period", the condition that is shown by following equation (8), that is obtained from above equation (2) and is for use in feedback, is obtained.

[Formula 4]

$$RV_{so} - (G_y - G_{ydr}) = -g\cos\tilde{\theta}\sin\tilde{\phi} \qquad (8)$$

Note that, in equation (8), $G_y-G_{ydr}$ expresses a signal in which drift amount $G_{ydr}$ of the sensor signal $G_y$ of the lateral acceleration sensor 14 is corrected.

Further, when a general road slope is taken into consideration, it can be considered that "acceleration in the vertical direction substantially coincides with gravitational acceleration". This condition can be described by the following algebraic equation by using the longitudinal acceleration $G_a$, the lateral acceleration $G_y$, the vertical acceleration $G_z$, the pitch angle θ, and the roll angle φ.

[Formula 5]

$$g = \frac{-(G_x-G_{xdr})\sin\tilde{\theta}+(G_y-G_{ydr})\sin\tilde{\phi}\cos\tilde{\theta}+(G_z-G_{zdr})}{\cos\tilde{\phi}\cos\tilde{\theta}} \qquad (9)$$

The relationships of above equations (7) through (9) are all conditions that are satisfied when considering a time period that is long to a certain extent. Therefore, values, in which both sides of above equations (7) through (9) are low-pass filter processed as described below, are used in the feedback of the observer measured amounts.

Next, the structure of a basic non-linear observer is described. Here, a value u, that includes a corrected signal in which the drift amount is corrected and the estimated value of the pitch angular velocity, is expressed by following equation (10).

[Formula 6]

$$u = [G_x-G_{xdr}, G_y-G_{ydr}, G_z-G_{zdr}, P-P_{dr}, \tilde{Q}R-R_{dr}]^T \qquad (10)$$

Further, when the vehicle motion that is the object is expressed by following equation (11) and a physical amount that can be measured in order to structure the observer is expressed by equation (12), the non-linear observer can be described by the non-linear equations of motion of following equation (13) and equation (14).

[Formula 7]

$$\dot{x} = f(x,u) \qquad (11)$$

$$y = g(x,u) \qquad (12)$$

$$\dot{\tilde{x}} = f(\tilde{x},u) + k(\tilde{x},u)\cdot(y-\tilde{y}) \qquad (13)$$

$$\tilde{y} = g(\tilde{x},u) \qquad (14)$$

Wherein x tilde, y tilde respectively express the estimated values of x, y, and k(x tilde, u) expresses the designed observer gain.

Above equation (7) through equation (9) are all conditions that are satisfied when considering a time period that is long to a certain extent. Therefore, values, that are expressed by following equations (15) through (17) and in which both sides of above equation (7) through equation (9) are low-pass filter processed by a low-pass filter, are used in the feedback of the measured amounts of the observer.

[Formula 8]

$$\dot{\tilde{g}}_{xdf} = -\frac{\tilde{g}_{xdf}}{\tau_x} + \frac{g\sin\tilde{\theta}}{\tau_x} \quad (15)$$

$$\dot{\tilde{g}}_{ydf} = -\frac{\tilde{g}_{ydf}}{\tau_y} - \frac{g\cos\tilde{\theta}\sin\tilde{\phi}}{\tau_y} \quad (16)$$

$$\dot{\tilde{g}}_f = -\frac{\tilde{g}_f}{\tau_g} + \frac{-(G_x - G_{xdr})\sin\tilde{\theta} + (G_y - G_{ydr})\sin\tilde{\phi}\cos\tilde{\theta} + (G_z - G_{zdr})\cos\tilde{\phi}\cos\tilde{\theta}}{\tau_g} \quad (17)$$

Wherein $\tau_x$, $\tau_y$, $\tau_g$ respectively express time constants of from several seconds to greater than or equal to several tens of seconds of the low-pass filter considered in above equation (7) through equation (9).

Next, the attitude angle observer 24 of the present embodiment, that estimates the roll angle $\phi$ and the pitch angle $\theta$ by using the above basic non-linear observer, is described. Because state amounts of velocity are not included in the state equations relating to the angles of above equation (4), equation (5), the roll angle $\phi$ and the pitch angle $\theta$ can be estimated as angles, separately from the estimation of the velocities.

Therefore, first, an observer for estimating the roll angle and the pitch angle, as well as the state amounts that arise due to the aforementioned low-pass filter, is structured. In the present embodiment, state amount x tilde of the observer is expressed by following equation (18).

[Formula 9]

$$\tilde{x} = [\tilde{\phi}\tilde{\theta}\tilde{g}_{xdf}\tilde{g}_{ydf}\tilde{g}_f]^T \quad (18)$$

Further, the observer output that is used in feedback is expressed by following equation (19).

[Formula 10]

$$\tilde{y} = [\tilde{g}_{xdf}\tilde{g}_{ydf}\tilde{g}_f]^T \quad (19)$$

Moreover, by expressing the vehicle output, that is computed from the sensor signals and the like, by following equation (20) and setting the appropriate observer gain k(x tilde, u), the attitude angle observer 24 that estimates the roll angle and the pitch angle is structured.

[Formula 11]

$$y = [g_{xdf}g_{ydf}g]^T \quad (20)$$

wherein

[Formula 12]

$$\dot{g}_{xdf} = -\frac{g_{xdf}}{\tau_x} + \frac{\dot{V}_{s0} - R\tilde{V} - (G_x - G_{xdr})}{\tau_x} \quad (21)$$

$$\dot{g}_{ydf} = -\frac{g_{ydf}}{\tau_y} + \frac{RV_{s0} - (G_y - G_{ydr})}{\tau_y} \quad (22)$$

Note that the numerator of the second term of the right side of above equation (21) is the deviation of the longitudinal acceleration state amount in which the sum of the product, of the yaw angular velocity value $R-R_{dr}$ in which the drift amount is corrected and the estimated value of the lateral vehicle body velocity, and the longitudinal acceleration value $G-G_{xdr}$ in which the drift amount is corrected, is subtracted from the derivative value of the estimated value $V_{s0}$ of the longitudinal vehicle body velocity. Further, the numerator of the second term of the right side of above equation (22) is the deviation of the lateral acceleration state amount in which the lateral acceleration value $G_y-G_{ydr}$, in which the drift amount is corrected, is subtracted from the product of the yaw angular velocity value $R-R_{dr}$ in which the drift amount is corrected and the estimated value $V_{s0}$ of the longitudinal vehicle body velocity.

An example of the observer gain is expressed by following equation (23) such that the diagonal components when carrying out linearization have negative coefficients, in order to ensure the stability of the observer in the present embodiment.

[Formula 13]

$$k(\tilde{x}, u) = \begin{bmatrix} 0 & -K_{\phi y} & K_{\phi g}(G_y - H_{ydr}) \\ K_{\theta x} & 0 & -K_{\theta g}(G_x - G_{xdr}) \\ K_x & 0 & 0 \\ 0 & K_y & 0 \\ 0 & 0 & K_g \end{bmatrix} \quad (23)$$

Wherein $K_{\phi y}$, $K_{\phi g}$, $K_{\theta x}$, $K_{\theta g}$, $K_x$, $K_y$, $K_g$ are appropriate positive constants. Accordingly, the non-linear observer of the present embodiment, that estimates the roll angle and the pitch angle, is described by the equation of motion expressed by following equation (24).

[Formula 14]

$$\frac{d}{dt}\tilde{X} = \begin{bmatrix} P - P_{dr} + \tilde{Q}\sin\tilde{\phi}\tan\tilde{\theta} + (R - R_{dr})\cos\tilde{\phi}\tan\tilde{\theta} \\ \tilde{Q}\cos\tilde{\phi} - (R - R_{dr})\sin\tilde{\phi} \\ -\frac{\tilde{g}_{xdf}}{\tau_x} + \frac{g\sin\tilde{\theta}}{\tau_x} \\ -\frac{\tilde{g}_{ydf}}{\tau_y} - \frac{g\cos\tilde{\theta}\sin\tilde{\phi}}{\tau_y} \\ -\frac{\tilde{g}_f}{\tau_g} + \frac{-(G_x - G_{xdr})\sin\tilde{\theta} + (G_y - G_{ydr})\sin\tilde{\phi}\cos\tilde{\theta} + (G_z - G_{zdr})\cos\tilde{\phi}\cos\tilde{\theta}}{\tau_g} \end{bmatrix} + \begin{bmatrix} 0 & -K_{\phi y} & K_{\phi g}(G_y - H_{ydr}) \\ K_{\theta x} & 0 & -K_{\theta g}(G_x - G_{xdr}) \\ K_x & 0 & 0 \\ 0 & K_y & 0 \\ 0 & 0 & K_g \end{bmatrix} \cdot \begin{bmatrix} g_{xdf} - \tilde{g}_{xdf} \\ g_{ydf} - \tilde{g}_{ydf} \\ g - \tilde{g}_f \end{bmatrix} \quad (24)$$

Wherein x tilde is expressed by following equation (25).

[Formula 15]

$$\tilde{x} = [\tilde{\phi}\tilde{\theta}\tilde{g}_{xdf}\tilde{g}_{ydf}\tilde{g}_f]^T \quad (25)$$

By using above equation (24), the attitude angle observer 24 computes derivative amount $d\tilde{\phi}$ of the roll angle $\phi$ tilde and derivative amount $d\tilde{\theta}$ of the pitch angle $\theta$ tilde, that are attitude angles with respect to the vehicle body vertical direction. The attitude angle observer 24 can compute the roll angle $\phi$ tilde and the pitch angle $\theta$ tilde by integrating, respectively, the computed derivative amount dφ tilde of the roll angle φ tilde and derivative amount dθ tilde of the pitch angle θ tilde.

The slip angle observer 34 estimates the lateral vehicle body velocity V that is the vehicle body velocity in the vehicle lateral direction, and, on the basis of the wheel speeds of the respective wheels, estimates the longitudinal vehicle body velocity U that is the vehicle body velocity in the vehicle longitudinal direction. The slip angle observer 34 estimates the longitudinal vehicle body velocity U and the lateral vehicle body velocity V on the basis of the estimated value of the lateral vehicle body velocity V, the estimated value of the longitudinal vehicle body velocity U, a corrected signal corresponding to the detected value of the longitudinal acceleration $G_x$, a corrected signal corresponding to the detected value of the lateral acceleration $G_y$, and a corrected signal corresponding to the detected value of the yaw angular velocity R. Further, the slip angle observer 34 estimates vehicle body slip angle β on the basis of the estimated value of the longitudinal vehicle body velocity U and the estimated value of the lateral vehicle body velocity V.

Next, estimation of the longitudinal vehicle body velocity and the lateral vehicle body velocity is described.

Conventionally, the term of the lateral vehicle body velocity V is included in above equation (1) that ignores the dynamic characteristic, and the observer can be structured by using this lateral vehicle body velocity. Here, the yaw angular velocity is considered to be an independent parameter, and above equation (1) and equation (2) are arranged as follows. Note that the vertical vehicle body velocity W is assumed to be 0 in the same way as in the first embodiment.

[Formula 16]

$$\frac{d}{dt}\begin{bmatrix} U \\ V \end{bmatrix} = \begin{bmatrix} 0 & (R - R_{dr}) \\ -(R - R_{dr}) & 0 \end{bmatrix} \cdot \begin{bmatrix} U \\ V \end{bmatrix} + \begin{bmatrix} g\sin\theta + G_x - G_{xdr} \\ -g\cos\theta\sin\phi + G_y - G_{ydr} \end{bmatrix} \quad (26)$$

Further, when it is thought that the output of the system is expressed by the longitudinal vehicle body velocity U, i.e., following equation (27), equation (26) and equation (27) become an observable system.

[Formula 17]

$$y = \begin{bmatrix} 1 & 0 \end{bmatrix} \cdot \begin{bmatrix} U \\ V \end{bmatrix} \quad (27)$$

Note that, as described above, the longitudinal vehicle body velocity U is estimated on the basis of the wheel speeds of the respective wheels. For example, observer gain K is expressed by following equation (28) that includes a value obtained from the absolute value of the yaw angular velocity.

[Formula 18]

$$K = \begin{bmatrix} 1.4|R - R_{dr}| \\ 0 \end{bmatrix} \quad (28)$$

When the observer gain is expressed by above equation (28), the observer is described by the equations of motion expressed by following equation (29-1) through equation (29-5).

[Formula 19]

$$\frac{d}{dt}\tilde{x} = \begin{bmatrix} 0 & R - R_{dr} \\ -(R - R_{dr}) & 0 \end{bmatrix} \cdot \tilde{x} + \quad (29-1)$$
$$\begin{bmatrix} g\sin\theta + G_x - G_{xdr} \\ -g\cos\tilde\theta\sin\tilde\phi + G_y - G_{ydr} \end{bmatrix} + K \cdot (y - \tilde{y})$$

$$= \left(\begin{bmatrix} 0 & R - R_{dr} \\ -(R - R_{dr}) & 0 \end{bmatrix} - K \cdot \begin{bmatrix} 1 & 0 \end{bmatrix}\right) \cdot \tilde{x} + \quad (29-2)$$
$$\begin{bmatrix} g\sin\theta + G_x - G_{xdr} \\ -g\cos\tilde\theta\sin\tilde\phi + G_y - G_{ydr} \end{bmatrix} + K \cdot y$$

$$= \left(\begin{bmatrix} 0 & R - R_{dr} \\ -(R - R_{dr}) & 0 \end{bmatrix} - \begin{bmatrix} 1.4|R - R_{dr}| \\ 0 \end{bmatrix} \cdot \begin{bmatrix} 1 & 0 \end{bmatrix}\right) \cdot \quad (29-3)$$
$$\tilde{x} + \begin{bmatrix} g\sin\theta + G_x - G_{xdr} \\ -g\cos\tilde\theta\sin\tilde\phi + G_y - G_{ydr} \end{bmatrix} + \begin{bmatrix} 1.4|R - R_{dr}| \\ 0 \end{bmatrix} \cdot y$$

$$= \begin{bmatrix} -1.4|R - R_{dr}| & R - R_{dr} \\ -(R - R_{dr}) & 0 \end{bmatrix} \cdot \tilde{x} + \quad (29-4)$$
$$\begin{bmatrix} g\sin\theta + G_x - G_{xdr} \\ -g\cos\tilde\theta\sin\tilde\phi + G_y - G_{ydr} \end{bmatrix} + \begin{bmatrix} 1.4|R - R_{dr}| \\ 0 \end{bmatrix} \cdot V_{so}$$

$$= \begin{bmatrix} -1.4|R - R_{dr}| & R - R_{dr} \\ -(R - R_{dr}) & 0 \end{bmatrix} \cdot \begin{bmatrix} \tilde{U} \\ \tilde{V} \end{bmatrix} + \quad (29-5)$$
$$\begin{bmatrix} g\sin\theta + G_x - G_{xdr} \\ -g\cos\tilde\theta\sin\tilde\phi + G_y - G_{ydr} \end{bmatrix} + \begin{bmatrix} 1.4|R - R_{dr}| \\ 0 \end{bmatrix} \cdot V_{so}$$

Wherein x tilde is the state amount of the observer, and is expressed by following equation (30).

[Formula 20]

$$\tilde{x} = [\tilde{U}\ \tilde{V}]^T \quad (30)$$

A stable observer (that has a second-order Butterworth pole of ω=|R−Rdr|rad/s), that uses, as a feedback amount, the product of multiplication of the deviation, of the computed value U of the longitudinal vehicle body velocity and the estimated value U tilde of the longitudinal vehicle body velocity, and the observer gain obtained from the absolute value of the yaw angular velocity R, can be structured as per above equation (29-5).

The slip angle observer 34 of the present embodiment estimates the longitudinal vehicle body velocity and the lateral vehicle body velocity by using above equation (29-5). In the present embodiment, under the assumption that the attitude angles of the vehicle body, i.e., the roll angle φ and the pitch angle θ of the vehicle body with respect to the vertical axis, are already known (e.g., the roll angle, the pitch angle are 0), the longitudinal vehicle body velocity U tilde and the lateral vehicle body velocity V tilde are made to be observer state amounts, and the derivative amount dU tilde of the longitudinal vehicle body velocity U tilde and the derivative amount dV tilde of the lateral vehicle body velocity V tilde are computed by using the deviation in which the estimated value U tilde (the observer output) of the longitudinal vehicle body velocity is subtracted from the computed value U of the longitudinal vehicle body velocity, and the already-known roll angle φ and pitch angle θ, and the longitudinal acceleration $G_x-G_{xdr}$, the lateral acceleration $G_y-G_{ydr}$, and the yaw angular velocity $R-R_{dr}$ that were corrected at the drift amount correcting means 32. Further, the slip angle observer 34 integrates the derivative amounts of the longitudinal vehicle body velocity and the lateral vehicle body velocity, and estimates the longitudinal vehicle body velocity and the lateral vehicle body velocity.

Further, the slip angle observer 34 estimates the vehicle body slip angle β on the basis of following equation (31) from the relationship of the longitudinal vehicle body velocity U and the lateral vehicle body velocity V.

[Formula 21]

$$\tilde{\beta} = \tan^{-1}\frac{\tilde{V}}{\tilde{U}} \quad (31)$$

Next, the method of computing derivative amount $d\phi_m$ of the roll angle φ and derivative amount $d\theta_m$ of the pitch angle θ respectively, that are obtained from equations of motion for vehicle motion, is described.

With regard to above equation (1) through equation (5), it is assumed that the vertical vehicle body velocity is 0, and, when substituting above equation (6), following equation (32) through equation (35) are obtained.

[Formula 22]

$$\dot{U} = (R - R_{dr})\tilde{V} + g\sin\tilde{\theta} + G_x - G_{xdr} \quad (32)$$

$$\dot{V} = -(R - R_{dr})V_{so} - g\sin\tilde{\theta}\sin\tilde{\phi} + G_y - G_{ydr} \quad (33)$$

$$\dot{\phi} = -\frac{G_z - G_{zdr}}{V_{so}}\sin\tilde{\phi}\tan\tilde{\theta} + \left(1 + \frac{\tilde{V}}{V_{so}}\sin\tilde{\phi}\tan\tilde{\theta}\right)(P - P_{dr}) + \quad (34)$$
$$(R - R_{dr})\cos\tilde{\phi}\tan\tilde{\theta} + \frac{g}{V_{so}}\sin\tilde{\phi}\cos\tilde{\phi}\sin\tilde{\theta}$$

$$\dot{\theta} = -\frac{G_z - G_{zdr}}{V_{SO}}\cos\tilde{\phi} + \quad (35)$$
$$\frac{\tilde{V}}{V_{SO}}(P - P_{dr})\cos\tilde{\phi} - (R - R_{dr})\sin\tilde{\phi} + \frac{g}{V_{SO}}\cos^2\tilde{\phi}\cos\tilde{\theta}$$

Wherein the estimated values of the roll angle φ and the pitch angle θ, that were estimated by the attitude angle observer 24, are used for the roll angle φ and the pitch angle θ. Further, the tri-axial velocities that are longitudinal acceleration $G_x-G_{xdr}$, lateral acceleration $G_y-G_{zdr}$, and vertical acceleration $G_z-G_{zdr}$, and the bi-axial angular velocities that are the roll angular velocity $P-P_{dr}$ and the yaw angular velocity $R-R_{dr}$, respectively, are signals in which the sensor signals, that were detected by the longitudinal acceleration sensor 12, the lateral acceleration sensor 14, the vertical acceleration sensor 16, the roll angular velocity sensor 18, and the yaw angular velocity sensor 20, have been corrected at the drift amount correcting means 22, 32. Further, the lateral vehicle body velocity V can be estimated by using a Kalman filter or the like or can be estimated from the detected value of the lateral acceleration sensor, and the longitudinal vehicle body velocity U can be estimated on the basis of the wheel speeds of the respective wheels.

The derivative amount $d\phi_m$ of the roll angle φ and derivative amount $d\theta_m$ of the pitch angle θ, that are obtained from equations of motion for vehicle motion, are computed by following equation (36), equation (37) that ignore the drift amounts of above equation (34), equation (35).

[Formula 23]

$$d\phi_m = \frac{G_z}{V_{s0}}\sin\tilde{\phi}\tan\tilde{\theta} + \left(1 + \frac{\tilde{V}}{V_{s0}}\sin\tilde{\phi}\tan\tilde{\theta}\right)P + R\cos\tilde{\phi}\tan\tilde{\theta} + \frac{g}{V_{s0}}\sin\tilde{\phi}\cos\tilde{\phi}\sin\tilde{\theta} \quad (36)$$

$$d\theta_m = -\frac{G_z}{V_{s0}}\cos\tilde{\phi} + \frac{\tilde{V}}{V_{s0}}P\cos\tilde{\phi} - R\sin\tilde{\phi} + \frac{g}{V_{s0}}\cos^2\tilde{\phi}\cos\tilde{\theta} \quad (37)$$

Further, the relationships, that are expressed by following equation (38), equation (39), exist between φ dot of above equation (34), θ dot of above equation (35) and $d\theta_m$ of above equation (36), $d\theta_m$ of above equation (37).

[Formula 24]

$$\dot{\phi} = d\phi_m + \frac{G_{zdr}}{V_{s0}}\sin\tilde{\phi}\tan\tilde{\theta} - \left(1 + \frac{\tilde{V}}{V_{s0}}\sin\tilde{\phi}\tan\tilde{\theta}\right)P_{dr} - R_{dr}\cos\tilde{\phi}\tan\tilde{\theta} \quad (38)$$

$$\dot{\theta} = d\theta_m + \frac{G_{zdr}}{V_{s0}}\cos\tilde{\phi} - \frac{\tilde{V}}{V_{s0}}P_{dr}\cos\tilde{\phi} + R_{dr}\sin\tilde{\phi} \quad (39)$$

In accordance with above equation (36), equation (37), the motion equation derivative amount computing means 26 computes the derivative amounts of the roll angle φ and the pitch angle θ that are obtained from equations of motion for vehicle motion.

Next, the method of computing derivative amount $dU_m$ of the longitudinal vehicle body velocity U and derivative amount $dV_m$ of the lateral vehicle body velocity V respectively, that are obtained from equations of motion for vehicle motion, is described.

The derivative amount $d\phi_m$ of the roll angle φ and the derivative amount $d\theta_m$ of the pitch angle θ, that are obtained from equations of motion for vehicle motion, are computed by following equation (40), equation (41) that ignore the drift amounts of above equation (32), equation (33).

[Formula 25]

$$dU_m = R\tilde{V} + g\sin\tilde{\theta} + G_x \quad (40)$$

$$dV_m = -RV_{so} - g\cos\tilde{\theta}\sin\tilde{\phi} + G_y \quad (41)$$

Further, the relationships, that are expressed by following equation (42), equation (43), exist between U dot of above equation (32), V dot of above equation (33) and $dU_m$ of above equation (40), $dV_m$, of above equation (41).

[Formula 26]

$$\dot{U} = dU_m - R_{dr}\tilde{V}_x - G_{xdr} \quad (42)$$

$$\dot{V} = dV_m + R_{dr}V_{so} - G_{ydr} \quad (43)$$

In accordance with above equation (40), equation (41), the motion equation derivative amount computing means 36 computes the derivative amounts of the longitudinal vehicle body velocity U and the lateral vehicle body velocity V that are obtained from equations of motion for vehicle motion.

Next, the principles of the present embodiment are described. The observer that estimates the attitude angles from the motion state amounts of the vehicle has the effect of reducing the effects of drift errors of the sensor signals.

Accordingly, as compared with computed values of attitude angles that are determined merely by integrating motion state amounts that are obtained from equations of motion, the estimated values of the attitude angles that are obtained from the attitude angle observer 24 have the quality that it is difficult for them to be affected by the drift errors that are included in the outputs of the sensors that detect the motion state amounts of the vehicle. This means that the drift errors can be estimated by comparing the estimated values and the computed values of the attitude angles.

Thus, in the present embodiment, this quality is focused upon, and sensor drift amounts are estimated by the drift amount estimating means 28, from a comparison of derivative amounts of the attitude angles that are computed at the attitude angle observer 24 and derivative amounts of the attitude angles that are computed at the motion equation derivative amount computing means 26. The comparison of these derivative amounts of the attitude angles is always effective and not limited to a straight traveling state, and therefore, has the feature that sensor drift amounts can be estimated even in a non straight traveling state. Due thereto, the sensor drift amounts can always be estimated successively, even in traveling patterns in which there is little of a straight traveling state.

Next, the estimating method of the sensor drift amounts is described.

The relationships expressed by following equation (44) through equation (47) are established when it is assumed that predetermined drift errors $G_{xdr}$, $G_{ydr}$, $G_{zdr}$, $P_{dr}$, $R_{dr}$ are superposed on the sensor signals $G_x$, $G_y$, $G_z$, P, R, and further, it is assumed, with regard to the derivative amounts expressed by the right sides of above equation (32) through equation (35), that true values are already known by the attitude angle observer 24.

[Formula 27]

$$dU = dU_m - R_{dr}\tilde{V}_x - G_{xdr} \qquad (44)$$

$$dV = dV_m + R_{dr}V_{so} - G_{ydr} \qquad (45)$$

$$d\phi = d\phi_m + \frac{G_{zdr}}{V_{s0}}\sin\tilde{\phi}\tan\tilde{\theta} - \left(1 + \frac{\tilde{V}}{V_{s0}}\sin\tilde{\phi}\tan\tilde{\theta}\right)P_{dr} - R_{dr}\cos\tilde{\phi}\tan\tilde{\theta} \qquad (46)$$

$$d\theta = d\theta_m + \frac{G_{zdr}}{V_{s0}}\cos\tilde{\phi} - \frac{\tilde{V}}{V_{s0}}P_{dr}\cos\tilde{\phi} + R_{dr}\sin\tilde{\phi} \qquad (47)$$

Wherein dU, dV are the derivative amount of the longitudinal vehicle body velocity, the derivative amount of the lateral vehicle body velocity that serve as observer internally-computed values obtained from above equation (29-1) through equation (29-5), and dφ, dθ are the derivative amount of the roll angle, the derivative amount of the pitch angle that serve as observer internally-computed values obtained from above equation (24).

Above equation (46), equation (47) express the relationship that, when the sensor drift amounts of the sensor signals are taken into consideration, the derivative amounts of the roll angle and the pitch angle that are computed by the attitude angle observer 24, and values that consider the sensor drift amounts in the derivative amounts of the roll angle and the pitch angle obtained from equations of motion, are equal. Further, above equation (44), equation (45) express the relationship that the derivative amounts of the longitudinal vehicle body velocity and the lateral vehicle body velocity that are computed by the slip angle observer 34, and values that consider the sensor drift amounts in the derivative amounts of the longitudinal vehicle body velocity and the lateral vehicle body velocity obtained from the equations of motion, are equal.

Here, $G_z$, P are not included in above equation (44), equation (45), and $G_x$, $G_y$ are not included in above equation (46), equation (47), and the coefficient of R as well is relatively small (it is assumed that the attitude angle is small). Therefore, the estimation of the sensor drift amounts relating to the vertical acceleration $G_z$ and the roll angular velocity P, and the estimation of the sensor drift amounts relating to the longitudinal acceleration $G_x$, the lateral acceleration $G_y$, and the yaw angular velocity R, can be carried out separately.

By the way, with respect to the lateral acceleration, the relationship expressed by following equation (48) can be used from the condition that "the slip angle does not stay in a non-linear region over a long time period".

[Formula 28]

$$G_{ydr} = \frac{1}{1+\tau_y s}\left(G_y - \frac{1}{1 - \frac{m}{l^2}\cdot\frac{c_f l_f - c_r l_r}{c_f c_r}}\cdot\frac{V_{so}^2 \cdot \delta_f}{l} + g\cos\tilde{\theta}\sin\tilde{\phi}\right) \equiv E_{gyf} \qquad (48)$$

Wherein $\tau_y$ is a filter time constant for considering only motion of a long time period, $c_f$, $c_r$ are the cornering powers of the front and rear wheels, and $l_f$, $l_r$ are the distances between the longitudinal axis and the center of gravity. Further, l is the wheel base, m is the vehicle mass, and $\delta_f$ is the front wheel actual steering angle.

Further, with respect to the vertical acceleration, the relationship expressed by following equation (49) can be used from the condition that "the acceleration in the vertical direction is gravitational acceleration".

[Formula 29]

$$g = \frac{1}{1+\tau_s s}\left\{\begin{array}{l}-(G_x - G_{xdr})\sin\tilde{\theta} + \\ (G_y - G_{ydr})\sin\tilde{\phi}\cos\tilde{\theta} + \\ (G_z - G_{zdr})\cos\tilde{\phi}\cos\tilde{\theta}\end{array}\right\} - Dgf \cdot G_{zdr} = g - Egf \qquad (49)$$

Wherein Dgf, Egf are expressed by the following equations. Further, $\tau_f$ is a filter time constant for considering only motion of a long time period.

[Formula 30]

$$Dgf = \frac{1}{1+\tau_f s}\{\cos\tilde{\phi}\cos\tilde{\theta}\}$$

$$Egf = \frac{1}{1+\tau_f s}\left\{\begin{array}{l}-(G_x - G_{xdr})\sin\tilde{\theta}(G_y - G_{ydr})\sin\tilde{\phi}\cos\tilde{\theta} + \\ G_z\cos\tilde{\phi}\cos\tilde{\theta}\end{array}\right\}$$

Here, from above equation (46), equation (47), equation (49), it can be described by following equation (50).

[Formula 31]

$$dD1 \cdot \begin{bmatrix} G_{zdr} \\ P_{dr} \end{bmatrix} = \begin{bmatrix} dE1 \\ dE2 \\ dE3 \end{bmatrix} \qquad (50)$$

Wherein dD1, dE1, dE2, dE3 are expressed by following equation (51) through equation (54).

[Formula 32]

$$dD1 = \begin{bmatrix} -Dgf & 0 \\ \dfrac{\sin\tilde{\phi}\tan\tilde{\theta}}{V_{so}} & -1 - \dfrac{\tilde{V}\sin\tilde{\phi}\tan\tilde{\theta}}{V_{so}} \\ \dfrac{\cos\tilde{\phi}}{V_{so}} & -\dfrac{\tilde{V}\cos\tilde{\phi}}{V_{so}} \end{bmatrix} \quad (51)$$

$$dE1 = g - Egf \quad (52)$$

$$dE2 = d\phi - d\phi_m \quad (53)$$
$$= d\phi + \dfrac{G_2}{V_{so}}\sin\tilde{\phi}\tan\tilde{\theta} - \left(1 + \dfrac{\tilde{V}}{V_{so}}\sin\tilde{\phi}\tan\tilde{\theta}\right)P -$$
$$(R - R_{dr})\cos\tilde{\phi}\tan\tilde{\theta} - \dfrac{g}{V_{so}}\sin\tilde{\phi}\cos\tilde{\phi}\sin\tilde{\theta}$$

$$dE3 = d\theta - d\theta_m \quad (54)$$
$$= d\theta + \dfrac{G_2}{V_{so}}\cos\tilde{\phi} - \dfrac{\tilde{V}P}{V_{so}}\cos\tilde{\phi} +$$
$$(R - R_{dr})\sin\tilde{\phi} - \dfrac{g}{V_{so}}\cos^s\tilde{\phi}\cos\tilde{\theta}$$

Further, when the coefficient matrix of the left side and the vector of the right side of above equation (50) are integrated over a uniform time period, following equation (55) is obtained.

[Formula 33]

$$D1 \cdot \begin{bmatrix} G_{zdr} \\ P_{dr} \end{bmatrix} = \begin{bmatrix} E1 \\ E2 \\ E3 \end{bmatrix} \quad (55)$$

Wherein D1, E1, E2, E3 are expressed by following equation (56) through equation (59).

[Formula 34]

$$D1 = \int_t^{t+\Delta t} dD1\, dt \quad (56)$$

$$E1 = \int_t^{t+\Delta t} dE1\, dt \quad (57)$$

$$E2 = \int_t^{t+\Delta t} dE2\, dt \quad (58)$$

$$E3 = \int_t^{t+\Delta t} dE3\, dt \quad (59)$$

By solving above equation (55), following equation (60) can be derived.

[Formula 35]

$$\begin{bmatrix} G_{zdr} \\ P_{dr} \end{bmatrix} = D1^+ \cdot \begin{bmatrix} E1 \\ E2 \\ E3 \end{bmatrix} \quad (60)$$

Wherein $D^+$ is the pseudo inverse matrix of D.

In accordance with above equation (60), the drift amount estimating means 28 can estimate the sensor drift amount of the vertical acceleration sensor 16 and the sensor drift amount of the roll angular velocity sensor 18, on the basis of the respective derivative amounts of the roll angle and the pitch angle that are computed at the attitude angle observer 24, and the respective derivative amounts of the roll angle and the pitch angle that are computed at the motion equation derivative amount computing means 26.

Further, at the drift amount estimating means 28 relating to the present embodiment, in order to aim for stabilization of computation, the estimated values of the sensor drift amounts obtained by the results of computation of above equation (60) are smoothed in accordance with following equation (61), equation (62) by using the estimated values of the preceding time.

[Formula 36]

$$\tilde{G}_{zdr}(i+1) = \lambda_1 \cdot \tilde{G}_{zdr}(i) + (1-\lambda_1) \cdot G_{dzr} \quad (61)$$

$$\tilde{P}_{dr}(i+1) = \lambda_1 \cdot \tilde{P}_{dr}(i) + (1-\lambda_1) \cdot P_{dr} \quad (62)$$

Wherein $G_{zdr}$ tilde, $P_{dr}$ tilde are the estimated values of the sensor drift amounts after smoothing, and $\lambda 1$ is a forgetting factor.

Further, following equation (63) is obtained from above equation (30), equation (31), equation (34).

[Formula 37]

$$dD2 \cdot \begin{bmatrix} G_{xdr} \\ G_{ydr} \\ R_{dr} \end{bmatrix} = \begin{bmatrix} dE4 \\ dE5 \\ dE6 \end{bmatrix} \quad (63)$$

Wherein dD2, dE4, dE5, dE6 are expressed by following equation (64) through equation (67).

[Formula 38]

$$dD2 = \begin{bmatrix} -1 & 0 & -\tilde{V} \\ 0 & -1 & V_{SO} \\ 0 & 1 & 0 \end{bmatrix} \quad (64)$$

$$dE4 = dU - R \cdot \tilde{V} - g\sin\tilde{\theta} - G_x \quad (65)$$

$$dE5 = dV + R \cdot V_{SO} + g\cos\tilde{\theta}\sin\tilde{\phi} - G_y \quad (66)$$

$$dE6 = E_{gyf} \quad (67)$$

Further, when the coefficient matrix of the left side and the vector of the right side of above equation (63) are integrated over a uniform time period, following equation (68) is obtained.

[Formula 39]

$$D2 \cdot \begin{bmatrix} G_{xdr} \\ G_{ydr} \\ R_{dr} \end{bmatrix} = \begin{bmatrix} E4 \\ E5 \\ E6 \end{bmatrix} \quad (68)$$

Wherein D2, E4, E5, E6 are expressed by following equation (69) through equation (72).

[Formula 40]

$$D2 = \int_{t}^{t+\Delta t} dD2 \, dt \quad (69)$$

$$E4 = \int_{t}^{t+\Delta t} dE4 \, dt \quad (70)$$

$$E5 = \int_{t}^{t+\Delta t} dE5 \, dt \quad (71\,1)$$

$$E6 = \int_{t}^{t+\Delta t} dE6 \, dt \quad (72)$$

By solving above equation (68), following equation (73) is derived.

[Formula 41]

$$\begin{bmatrix} G_{xdr} \\ G_{ydr} \\ R_{dr} \end{bmatrix} = D2^{-1} \cdot \begin{bmatrix} E4 \\ E5 \\ E6 \end{bmatrix} \quad (73)$$

In accordance with above equation (73), the drift amount estimating means 38 can estimate the sensor drift amount of the longitudinal acceleration sensor 12, the sensor drift amount of the lateral acceleration sensor 14, and the sensor drift amount of the yaw angular velocity sensor 20, on the basis of the respective derivative amounts of the longitudinal vehicle body velocity and the lateral vehicle body velocity that are computed at the slip angle observer 34, and the respective derivative amounts of the longitudinal vehicle body velocity and the lateral vehicle body velocity that are computed at the motion equation derivative amount computing means 36.

Further, at the drift amount estimating means 38 relating to the present embodiment, in order to aim for stabilization of computation, the estimated values of the sensor drift amounts obtained by the results of computation of above equation (73) are smoothed in accordance with following equation (74) through equation (76) by using the estimated values of the preceding time.

[Formula 42]

$$\tilde{G}_{xdr}(i+1) = \lambda_2 \cdot \tilde{G}_{xdr}(i) + (1-\lambda_2) \cdot G_{xdr} \quad (74)$$

$$\tilde{G}_{ydr}(i+1) = \lambda_2 \cdot \tilde{G}_{ydr}(i) + (1-\lambda_2) \cdot G_{ydr} \quad (75)$$

$$\tilde{R}_{dr}(i+1) = \lambda_2 \cdot \tilde{R}_{dr}(i) + (1-\lambda_2) \cdot R_{dr} \quad (76)$$

Wherein $G_{xdr}$ tilde, $G_{ydr}$ tilde, $R_{dr}$ tilde are the estimated values of the sensor drift amounts after smoothing, and $\lambda 2$ is a forgetting factor.

Figure 3:
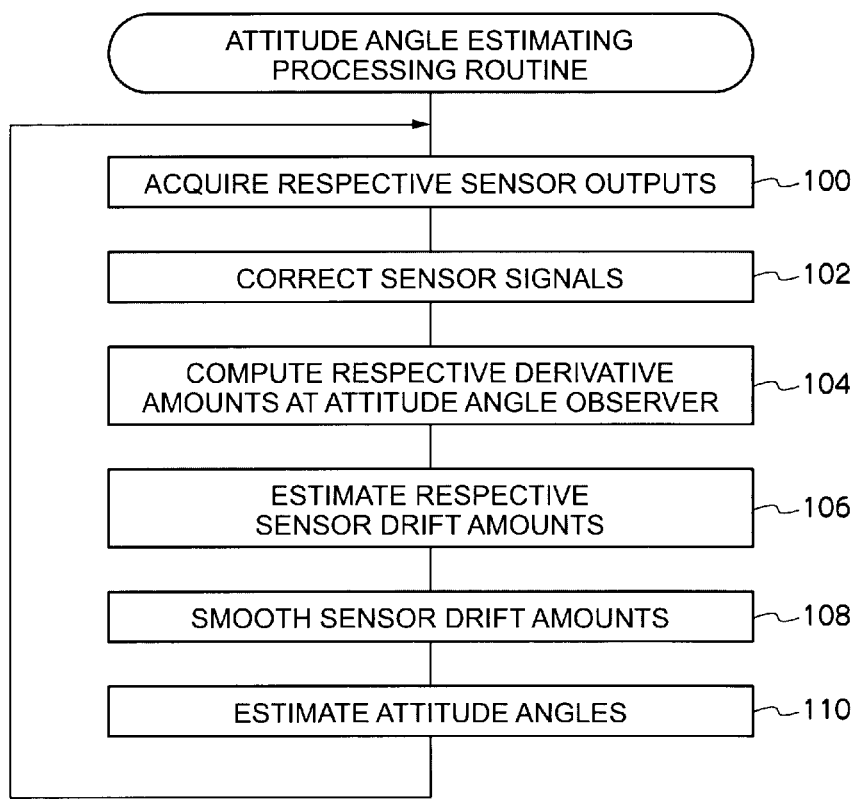
FIG. 3 is a flowchart showing the contents of an attitude angle estimating processing routine in the attitude angle-slip angle estimating device relating to the first embodiment of the present invention.

In the above first embodiment, information processing by a program, that causes a computer to function as the respective means that are the drift amount correcting means 22, the attitude angle observer 24, the motion equation derivative amount computing means 26, and the drift amount estimating means 28, can be realized by the attitude angle estimating processing routine that is shown in the flowchart of FIG. 3. The computer is structured by a CPU, a ROM, and a RAM that are connected to one another by a bus, and an HDD that is connected as needed. These programs are recorded on a recording medium such as a ROM or an HDD or the like that is connected to the CPU of the computer.

To describe this attitude angle estimating processing routine, in step 100, sensor signals corresponding to respective detected values are acquired from the longitudinal acceleration sensor 12, the lateral acceleration sensor 14, the vertical acceleration sensor 16, the roll angular velocity sensor 18, and the yaw angular velocity sensor 20.

Then, in step 102, the sensor signals, that were outputted from the vertical acceleration sensor 16 and the roll angular velocity sensor 18 and that were acquired in above step 100, are corrected by using the sensor drift amount of the vertical acceleration sensor 16 and the sensor drift amount of the roll angular velocity sensor 18 that were obtained one computation cycle before in step 108 that is described below.

Then, in step 104, the respective derivative amounts of the roll angle and the pitch angle, that are computed by the attitude angle observer 24 in order to estimate the roll angle and the pitch angle, are computed as described above by using the attitude angle estimated values that were obtained one computation cycle before in step 110 that is described below, and the vehicle body velocity estimated values that were obtained one computation cycle before in step 160 that is described below.

Then, in step 106, the sensor drift amount of the vertical acceleration sensor 16 and the sensor drift amount of the roll angular velocity sensor 18 are estimated as described above by using the relationship that the respective derivative amounts of the roll angle and the pitch angle computed in above step 104, and values that consider the sensor drift amounts in the respective derivative amounts of the roll angle and the pitch angle obtained from equations of motion for vehicle motion, are equal, by using the attitude angle estimated values that were obtained one computation cycle before in step 110 that is described below, and the vehicle body velocity estimated values that were obtained one computation cycle before in step 160 that is described below.

In next step 108, the sensor drift amount of the vertical acceleration sensor 16 and the sensor drift amount of the roll angular velocity sensor 18, that were estimated in above step 106, are smoothed by using the estimated values of the sensor drift amounts of the preceding time.

In next step 110, by integrating the respective derivative amounts of the roll angle and the pitch angle that were computed in above step 104, the roll angle and the pitch angle are estimated and outputted, and the routine returns to above step 100.

Figure 4:
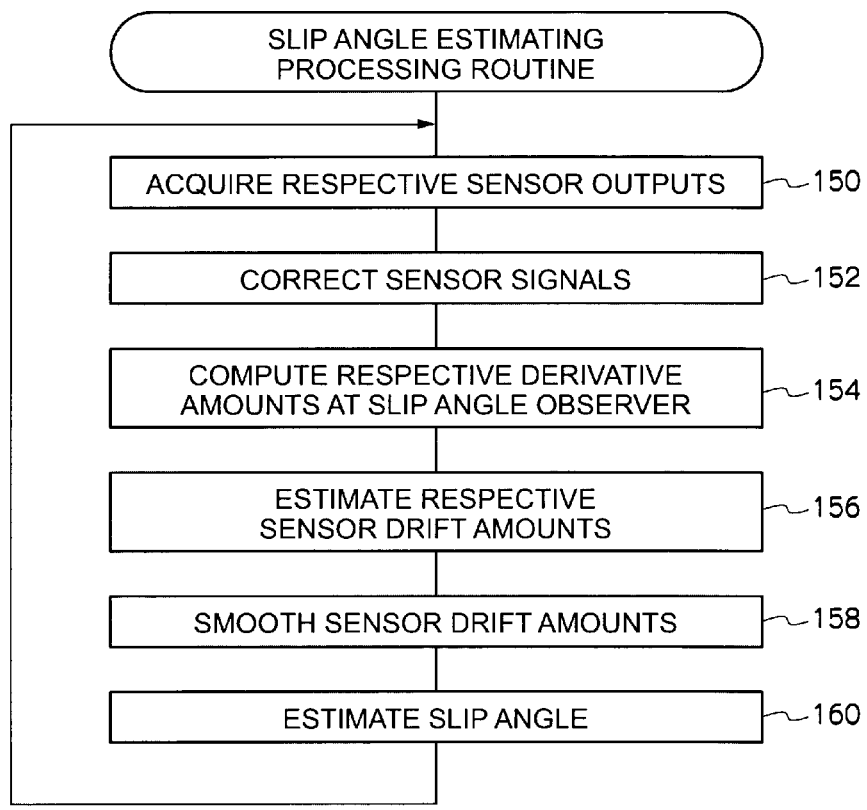
FIG. 4 is a flowchart showing the contents of a slip angle estimating processing routine in the attitude angle-slip angle estimating device relating to the first embodiment of the present invention.
Figure 5A:
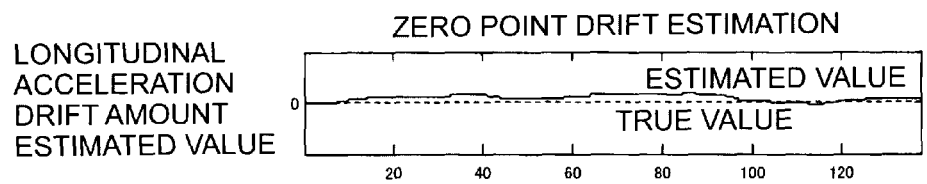
FIG. 5A is a graph showing estimation results of a sensor drift amount of a longitudinal acceleration sensor in a state in which drift is not applied.
Figure 5B:
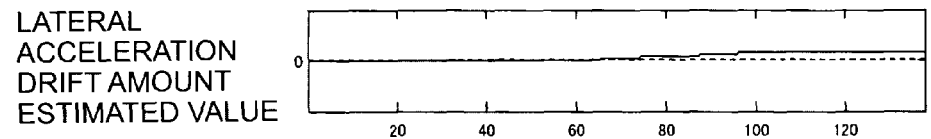
FIG. 5B is a graph showing estimation results of a sensor drift amount of a lateral acceleration sensor in a state in which drift is not applied.
Figure 5C:
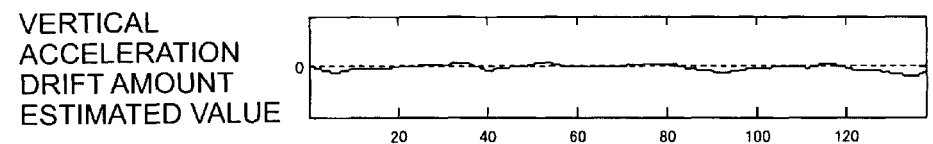
FIG. 5C is a graph showing estimation results of a sensor drift amount of a vertical acceleration sensor in a state in which drift is not applied.
Figure 5D:
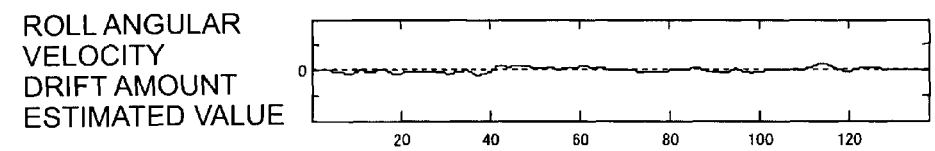
FIG. 5D is a graph showing estimation results of a sensor drift amount of a roll angular velocity sensor in a state in which drift is not applied.
Figure 5E:
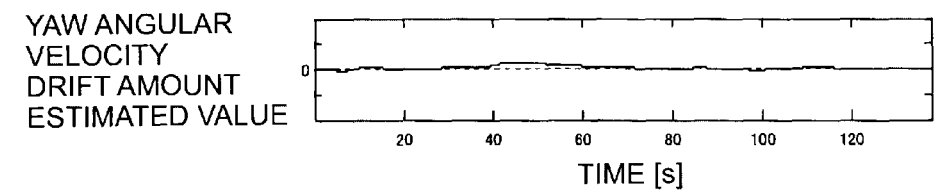
FIG. 5E is a graph showing estimation results of a sensor drift amount of a yaw angular velocity sensor in a state in which drift is not applied.

Further, information processing by a program, that causes a computer to function as the respective means that are the drift amount correcting means 32, the slip angle observer 34, the motion equation derivative amount computing means 36, and the drift amount estimating means 38, can be realized by the slip angle estimating processing routine shown in the flowchart of FIG. 4.

To describe this slip angle estimating processing routine, in step 150, sensor signals corresponding to respective detected values are acquired from the longitudinal acceleration sensor 12, the lateral acceleration sensor 14, and the yaw angular velocity sensor 20.

Then, in step 152, the sensor signals, that were outputted respectively from the longitudinal acceleration sensor 12, the lateral acceleration sensor 14, and the yaw angular velocity sensor 20 and that were acquired in above step 150, are corrected by using the sensor drift amount of the longitudinal acceleration sensor 12, the sensor drift amount of the lateral acceleration sensor 14, and the sensor drift amount of the yaw angular velocity sensor 20 that were obtained one computation cycle before in step 158 that is described below.

Then, in step 154, the respective derivative amounts of the longitudinal vehicle body velocity and the lateral vehicle body velocity, that are computed in order to estimate the longitudinal vehicle body velocity and the lateral vehicle body velocity, are computed as described above by using the attitude angle estimated values that were obtained one computation cycle before in above step 110 and the vehicle body velocity estimated values that were obtained one computation cycle before in step 160 that is described below.

Then, in step 156, the sensor drift amount of the longitudinal acceleration sensor 12, the sensor drift amount of the lateral acceleration sensor 14, and the sensor drift amount of the yaw angular velocity sensor 20 are estimated as described above by using the relationship that the respective derivative amounts of the longitudinal vehicle body velocity and the lateral vehicle body velocity computed in above step 154, and values that consider the sensor drift amounts in the respective derivative amounts of the longitudinal vehicle body velocity and the lateral vehicle body velocity that are obtained from equations of motion for vehicle motion, are equal, by using the attitude angle estimated values that were obtained one computation cycle before in above step 110 and the vehicle body velocity estimated values that were obtained one computation cycle before in step 160 that is described below.

In next step 158, the sensor drift amount of the longitudinal acceleration sensor 12, the sensor drift amount of the lateral acceleration sensor 14, and the sensor drift amount of the yaw angular velocity sensor 20, that were estimated in above step 156, are smoothed by using the estimated values of the preceding time.

In next step 160, by integrating the respective derivative amounts of the longitudinal vehicle body velocity and the lateral vehicle body velocity that were computed in above step 154, the longitudinal vehicle body velocity and the lateral vehicle body velocity are estimated, and, on the basis of the estimated longitudinal vehicle body velocity and lateral vehicle body velocity, the vehicle body slip angle is estimated and outputted, and the routine returns to above step 150.

Next, estimation results by the sensor drift amount estimating method of the present embodiment are described. Note that, in order to confirm the effects of the sensor drift amount estimating method, a drift disturbance that increased with time was applied to the sensor signals of limit traveling data of a long time period, and estimation of the sensor drift amounts, and estimation of the attitude angles using these estimated values, were carried out.

First, for operation confirmation of the algorithms, estimation of the sensor drift amounts was carried out in a state in which drift was not applied. In this case, estimation results such as shown in FIG. 5A through FIG. 5E were obtained. It was understood that, in the state in which there were no sensor drift amounts, the estimation results of the respective sensor drift amounts also showed values in a vicinity of 0.

Figure 6A:
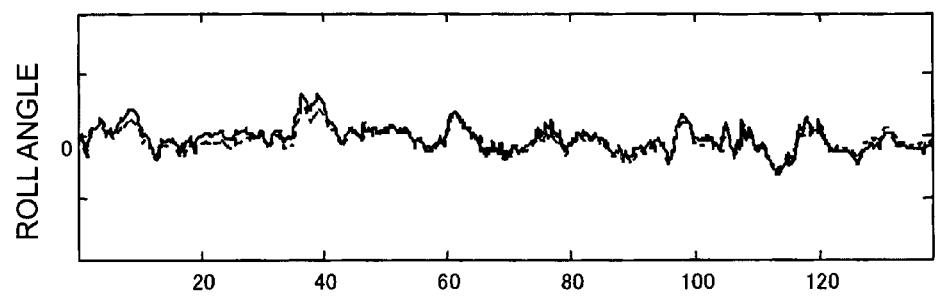
FIG. 6A is a graph showing estimation results of a roll angle when estimation of a sensor drift amount is adapted in a state in which drift is not applied.
Figure 6B:
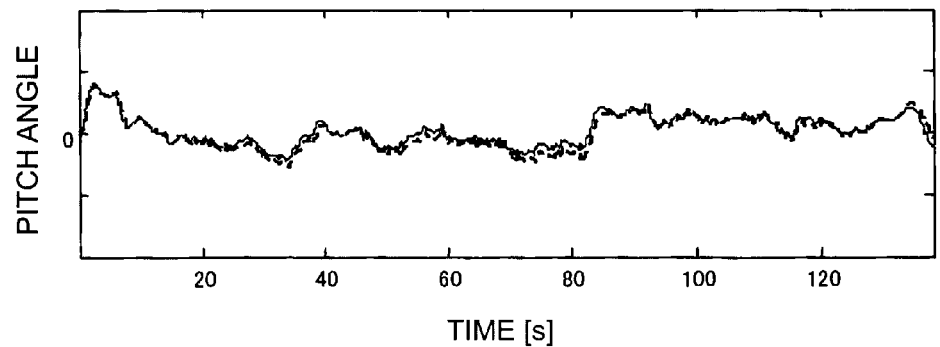
FIG. 6B is a graph showing estimation results of a pitch angle when estimation of a sensor drift amount is adapted in a state in which drift is not applied.
Figure 7A:
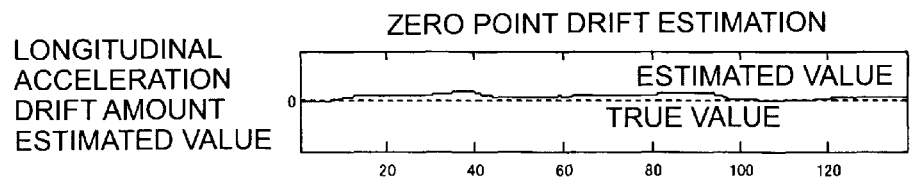
FIG. 7A is a graph showing estimation results of a sensor drift amount of a longitudinal acceleration sensor in a state in which drift is applied.
Figure 7B:
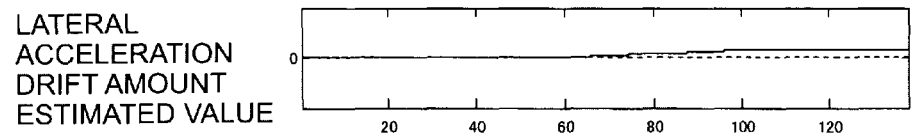
FIG. 7B is a graph showing estimation results of a sensor drift amount of a lateral acceleration sensor in a state in which drift is applied.
Figure 7C:
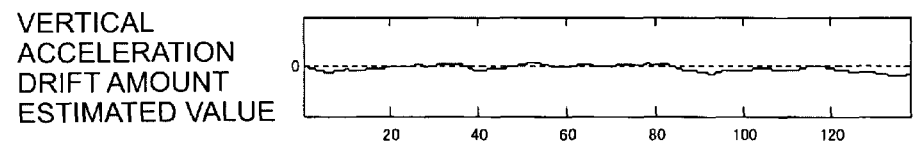
FIG. 7C is a graph showing estimation results of a sensor drift amount of a vertical acceleration sensor in a state in which drift is applied.
Figure 7D:
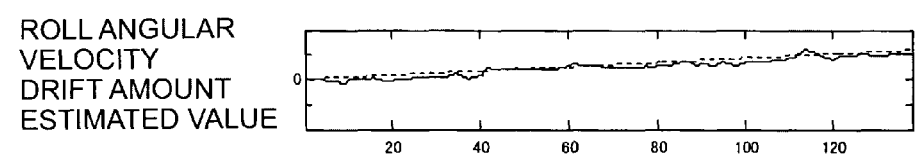
FIG. 7D is a graph showing estimation results of a sensor drift amount of a roll angular velocity sensor in a state in which drift is applied.
Figure 7E:
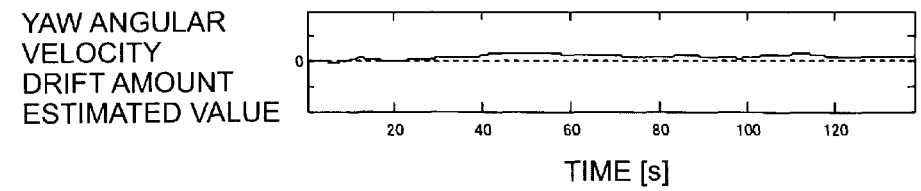
FIG. 7E is a graph showing estimation results of a sensor drift amount of a yaw angular velocity sensor in a state in which drift is applied.

Further, in the state in which drift was not applied, estimation of the attitude angles to which drift estimation was adapted, i.e., estimation of the attitude angles by using the estimation results of the sensor drift amounts, was carried out. In this case, estimation results such as shown in FIG. 6A, FIG. 6B were obtained. When compared with results to which the drift estimation was not adapted (true values), it could be confirmed that the values of the both substantially coincided, and, even in a state in which there is no sensor drift, the algorithms relating to the present embodiment do not adversely affect the estimated values.

Further, estimation of sensor drift amounts was carried out in a state in which drift was applied to the roll angular velocity sensor whose effects on roll angle estimation are great. In this case, estimation results such as shown in FIG. 7A through FIG. 7E were obtained. It was understood that the estimated sensor drift amounts appropriately follow the true values of the drift amounts that increase proportionately to time.

Figure 8A:
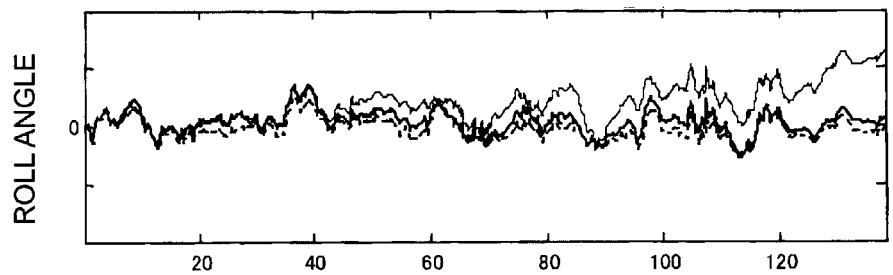
FIG. 8A is a graph showing estimation results of a roll angle when estimation of a sensor drift amount is adapted in a state in which drift is applied.
Figure 8B:
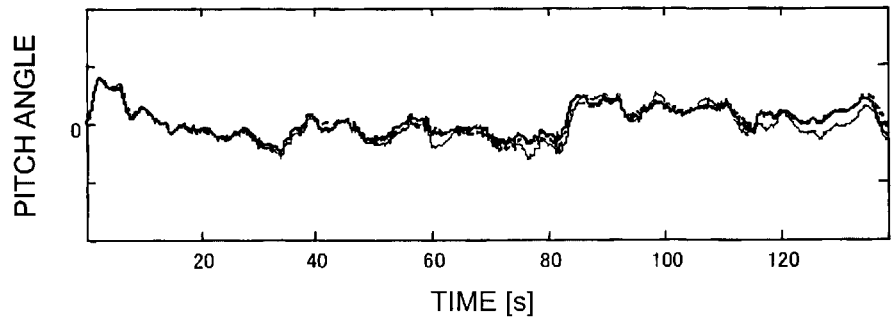
FIG. 8B is a graph showing estimation results of a pitch angle when estimation of a sensor drift amount is adapted in a state in which drift is applied.

Further, in a state in which drift was applied to the roll angular velocity sensor, estimation of the attitude angles to which the drift estimation was adapted, i.e., estimation of the attitude angles using the estimation results of these sensor drift amounts, was carried out. In this case, estimation results as shown in FIG. 8A, FIG. 8B were obtained. When compared with estimation results in a case in which the drift estimation is not adapted, it was understood that estimation near the true values can be carried out by adapting the drift estimation, as compared with the errors in the estimated values (differences with the estimated values of the attitude angles in a case in which drift is not applied) increasing in accordance with the sensor drift amount of the roll angular velocity sensor when the drift estimation is not adapted.

As described above, in accordance with the attitude angle estimating device relating to the first embodiment, sensor drift amounts of sensors that respectively detect the vertical acceleration and the roll angular velocity can be estimated stably regardless of the state of vehicle motion, by estimating the sensor drift amounts of the sensors that respectively detect the vertical acceleration and the roll angular velocity, by using the relationship that the respective derivative amounts of the roll angle and the pitch angle that were computed in order to estimate the roll angle and the pitch angle, and values, that consider sensor drift amounts in the respective derivative amounts of the roll angle and the pitch angle that are obtained from equations of motion for vehicle motion, are equal.

Further, sensor drift amounts of sensors that respectively detect the longitudinal acceleration, the lateral acceleration and the yaw angular velocity can be estimated stably regardless of the state of vehicle motion, by estimating the sensor drift amounts of the sensors that respectively detect the longitudinal acceleration, the lateral acceleration, and the yaw angular velocity, by using the relationship that the respective derivative amounts of the longitudinal vehicle body velocity and the lateral vehicle body velocity that were computed by the slip angle observer, and values, that consider sensor drift amounts in the respective derivative amounts of the longitudinal vehicle body velocity and the lateral vehicle body velocity that are obtained from equations of motion for vehicle motion, are equal.

Further, on the basis of the sensor signals that are corrected in accordance with the estimated sensor drift amounts, the roll angle and the pitch angle that serve as the attitude angles can be estimated accurately.

Further, on the basis of the sensor signals that are corrected in accordance with the estimated sensor drift amounts, the longitudinal vehicle body velocity and the lateral vehicle body velocity can be estimated accurately, and further, the vehicle body slip angle can be estimated accurately.

Next, a second embodiment is described. Note that portions that are structured similarly to the first embodiment are denoted by the same reference numerals and description thereof is omitted. The present embodiment applies the present invention to an attitude angle estimating device that estimates the pitch angle and the roll angle that are attitude angles of the vehicle with respect to the vertical axis.

Figure 9:
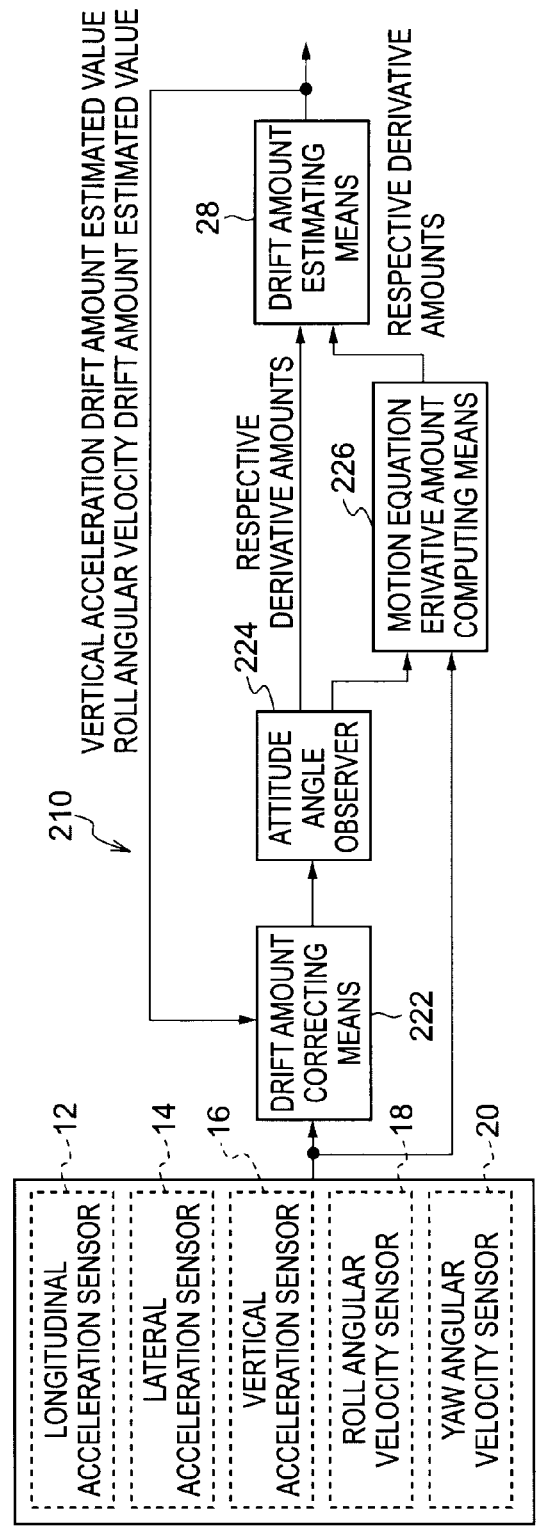
FIG. 9 is a schematic drawing showing the structure of an attitude angle-slip angle estimating device relating to a second embodiment of the present invention.

As shown in FIG. 9, an attitude angle estimating device 210 relating to the second embodiment has the longitudinal acceleration sensor 12, the lateral acceleration sensor 14, the vertical acceleration sensor 16, the roll angular velocity sensor 18, and the yaw angular velocity sensor 20.

The vertical acceleration sensor 16, the roll angular velocity sensor 18, and the yaw angular velocity sensor 20 are connected to a drift amount correcting means 222 that corrects sensor signals from respective sensors on the basis of sensor drift amounts estimated by the drift amount estimating means 28. The drift amount correcting means 222 is connected to the drift amount estimating means 28.

The drift amount correcting means 222 is connected to an attitude angle observer 224 that estimates the roll angle $\phi$ and the pitch angle $\theta$ that are attitude angles with respect to the vertical axis of the vehicle body.

The vertical acceleration sensor 16, the roll angular velocity sensor 18, the yaw angular velocity sensor 20, and the attitude angle observer 224 are connected to an motion equation derivative amount computing means 226 that computes respective derivative amounts of the roll angle and the pitch angle that are obtained from equations of motion for vehicle motion.

The attitude angle observer 224 and the motion equation derivative amount computing means 226 are connected to the drift amount estimating means 28.

The drift amount correcting means 222, the attitude angle observer 224, the motion equation derivative amount computing means 226, and the drift amount estimating means 28 can be structured by one or plural computers or by one or plural electronic circuits that realize the functions of the respective means.

The attitude angle observer 224 estimates the lateral vehicle body velocity V that is the vehicle speed in the vehicle lateral direction, and, on the basis of the wheel speeds of the respective wheels, estimates the longitudinal vehicle body velocity U that is the vehicle speed in the vehicle longitudinal direction, and further, estimates the pitch angular velocity Q in accordance with above equation (6) on the basis of the estimated value of the lateral vehicle body velocity V, the estimated value of the longitudinal vehicle body velocity U, and the corrected signal $G_z-G_{zdr}$ that corresponds to the detected value of the vertical acceleration $G_z$ and the corrected signal $P-P_{dr}$ that corresponds to the detected value of the roll angular velocity P, that were corrected at the drift amount correcting means 222. Note that the lateral vehicle body velocity V can be estimated by using a Kalman filter or the like, or can be estimated from the detected value of the lateral acceleration sensor.

Further, the attitude angle observer 224 estimates the respective derivative amounts d$\phi$ tilde, d$\theta$ tilde of the roll angle $\phi$ and the pitch angle $\theta$ that are attitude angles with respect to the vertical axis of the vehicle body, by using an equation similar to above equation (24), on the basis of the corrected signals $G_z-G_{zdr}$, $R-R_{dr}$, $P-P_{dr}$ that correspond to the respective detected values of the vertical acceleration $G_z$, the yaw angular velocity R, and the roll angular velocity P of the vehicle motion, and the sensor signals that correspond to the respective detected values of the yaw angular velocity R, the longitudinal acceleration $G_x$, and the lateral acceleration $G_y$, and the estimated value $V_{so}$ of the longitudinal vehicle body velocity U, and the estimated value of the pitch angular velocity Q.

Further, the attitude angle observer 224 can compute the roll angle $\phi$ tilde and the pitch angle $\theta$ tilde, by respectively integrating the computed derivative amount d$\phi$ tilde of the roll angle $\phi$ tilde and derivative amount d$\theta$ tilde of the pitch angle $\theta$ tilde.

In accordance with above equation (36), equation (37), the motion equation derivative amount computing means 226 computes the derivative amounts of the roll angle $\phi$ and the pitch angle $\theta$ that are obtained from equations of motion for vehicle motion. At this time, the estimated values of the roll angle $\phi$ and the pitch angle $\theta$, that were estimated by the attitude angle observer 224, are used as the roll angle $\phi$ and the pitch angle $\theta$. Further, the vertical acceleration $G_z$, the roll angular velocity P, and the yaw angular velocity R respectively use values that were detected by the vertical acceleration sensor 16, the roll angular velocity sensor 18, and the yaw angular velocity sensor 20. Further, the lateral vehicle body velocity V can be estimated by using a Kalman filter or the like or can be estimated from the detected value of the lateral acceleration sensor, and the longitudinal vehicle body velocity U can be estimated on the basis of the wheel speeds of the respective wheels.

Note that, because the other structures and operations of the attitude angle estimating device 210 are similar to the first embodiment, description thereof is omitted.

As described above, in accordance with the attitude angle estimating device relating to the second embodiment, sensor drift amounts of sensors that respectively detect the vertical acceleration and the roll angular velocity can be estimated stably regardless of the state of vehicle motion, by using the relationship that the respective derivative amounts of the roll angle and the pitch angle that were computed in order to estimate the roll angle and the pitch angle, and values, that consider sensor drift amounts in the respective derivative amounts of the roll angle and the pitch angle that are obtained from equations of motion for vehicle motion, are equal.

Next, a third embodiment is described. Note that portions that are structured similarly to the first embodiment are denoted by the same reference numerals and description thereof is omitted. The present embodiment applies the present invention to a slip angle estimating device that estimates the vehicle body slip angle.

In the third embodiment, the point that only the vehicle body slip angle is estimated, and the point that the sensor drift amounts of only the longitudinal acceleration sensor, the lateral acceleration sensor, and the yaw angular velocity sensor are estimated, are mainly different from the first embodiment.

Figure 10:
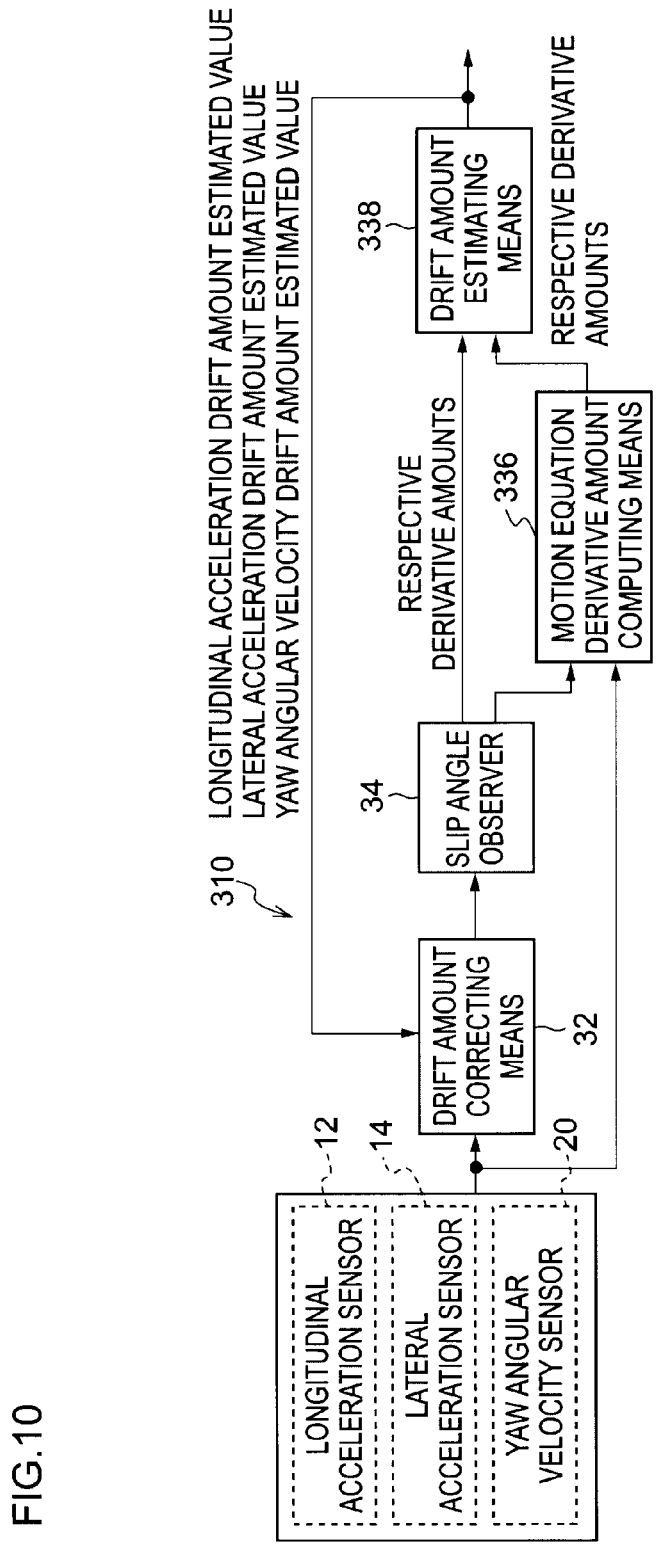
FIG. 10 is a schematic drawing showing the structure of a slip angle estimating device relating to a third embodiment of the present invention.

As shown in FIG. 10, a slip angle estimating device 310 relating to the third embodiment has the longitudinal acceleration sensor 12, the lateral acceleration sensor 14, and the yaw angular velocity sensor 20.

The longitudinal acceleration sensor 12, the lateral acceleration sensor 14, and the yaw angular velocity sensor 20 are connected to the drift amount correcting means 32. The drift amount correcting means 32 is connected to a drift amount estimating means 338.

The drift amount correcting means 32 is connected to the slip angle observer 34. The longitudinal acceleration sensor 12, the lateral acceleration sensor 14, the yaw angular velocity sensor 20, and the slip angle observer 34 are connected to an motion equation derivative amount computing means 336.

The slip angle observer 34 and the motion equation derivative amount computing means 336 are connected to the drift amount estimating means 338.

The drift amount correcting means 32, the slip angle observer 34, the motion equation derivative amount computing means 336, and the drift amount estimating means 338 can be structured by one or plural computers or by one or plural electronic circuits that realize the functions of the respective means.

Next, the method of computing the derivative amount U dot of the longitudinal vehicle body velocity U and the derivative amount V dot of the lateral vehicle body velocity V respectively, that are obtained from equations of motion for vehicle motion, is described.

With respect to above equation (32), equation (33), assuming that the roll angle φ and the pitch angle θ are 0, following equation (77), equation (78) are obtained.

[Formula 43]

$$\dot{U}=(R-R_{dr})V+G_x-G_{xdr} \quad (77)$$

$$\dot{V}=-(R-R_{dr})U+G_y-G_{ydr} \quad (78)$$

Wherein the bi-axial velocities that are the longitudinal acceleration $G_x-G_{xdr}$, and lateral acceleration $G_y-G_{ydr}$, and the yaw angular velocity $R-R_{dr}$ are signals in which the sensor signals detected at the longitudinal acceleration sensor 12, the lateral acceleration sensor 14, and the yaw angular velocity sensor 20 are corrected at the drift amount correcting means 32. Further, the lateral vehicle body velocity V and the longitudinal vehicle body velocity U can be estimated by the slip angle observer 34.

In accordance with equations in which the drift amounts are ignored in above equation (77), equation (78), the motion equation derivative amount computing means 336 computes the derivative amounts of the longitudinal vehicle body velocity U and the lateral vehicle body velocity V that are obtained from equations of motion for vehicle motion.

Next, the principles of the present embodiment are described. The observer that estimates the vehicle body slip angle from the motion state amounts of the vehicle has the effect of reducing the effects of the drift errors of the sensor signals. Accordingly, as compared with computed values of the longitudinal vehicle body velocity and the lateral vehicle body velocity that are determined merely by integrating motion state amounts obtained from equations of motion, the estimated values of the longitudinal vehicle body velocity and the lateral vehicle body velocity that are obtained from the slip angle observer 34 have the property that it is difficult for them to be affected by the drift errors that are included in the outputs of the sensors that detect the motion state amounts of the vehicle. This means that the drift errors can be estimated by comparing the estimated values and the computed values of the longitudinal vehicle body velocity and the lateral vehicle body velocity.

Thus, in the present embodiment, this quality is focused upon, and sensor drift amounts are estimated by the drift amount estimating means 338, from a comparison of the respective derivative amounts of the longitudinal vehicle body velocity and the lateral vehicle body velocity that were computed at the slip angle observer 34, and the respective derivative amounts of the longitudinal vehicle body velocity and the lateral vehicle body velocity that were computed at the motion equation derivative amount computing means 336. The comparison of these derivative amounts of the longitudinal vehicle body velocity and the lateral vehicle body velocity is always effective and not limited to a straight traveling state, and therefore, has the feature that sensor drift amounts can be estimated even in a non straight traveling state. Due thereto, the sensor drift amounts can always be estimated successively, even in traveling patterns in which there is little of a straight traveling state.

Next, the estimating method of the sensor drift amounts is described. The relationships expressed by following equation (79), equation (80) are established when it is assumed that the predetermined drift errors $G_{xdr}$, $G_{ydr}$, $R_{dr}$ are superposed on the sensor signals $G_x$, $G_y$, $G_z$, P, R, and further, it is assumed, with regard to the derivative amounts expressed by the right sides of above equation (77), equation (78), that true values are already known by the slip angle observer 234.

[Formula 44]

$$dU=(R-R_{dr})V+(G_x-G_{xdr}) \quad (79)$$

$$dV=-(R-R_{dr})U+(G_y-G_{ydr}) \quad (80)$$

Wherein dU, dV are the derivative amount of the longitudinal vehicle body velocity, the derivative amount of the lateral vehicle body velocity that serve as observer internally-computed values obtained from above equation (29-1). Above equation (79), equation (80) express the relationship that, when the sensor drift amounts of the sensor signals are taken into consideration, the derivative amounts of the longitudinal vehicle body velocity and the lateral vehicle body velocity computed by the slip angle observer 34, and values that consider the sensor drift amounts in the derivative amounts of the longitudinal vehicle body velocity and the lateral vehicle body velocity computed by the motion equation derivative amount computing means 336, are equal.

By the way, with respect to the lateral acceleration, the relationship expressed by following equation (81) can be used from the condition that "the slip angle does not stay in a non-linear region over a long time period".

[Formula 45]

$$G_{ydr} = \frac{1}{1+\tau_y s}\left(G_y - \frac{U^2}{1-\frac{m}{l^2}\cdot\frac{c_f l_f - c_r l_r}{c_f c_r}U^2}\cdot\frac{\delta_f}{l}\right) \equiv E_{gyf} \quad (81)$$

Wherein $\tau_y$ is a filter time constant for considering only motion of a long time period, $c_f$, $c_r$ are the cornering powers of the front and rear wheels, and $l_f$, $l_r$ are the distances between the longitudinal axis and the center of gravity. Further, l is the wheel base, m is the vehicle mass, and $\delta_f$ is the front wheel actual steering angle.

From above equation (79) through equation (81), it can be described by following equation (82).

[Formula 46]

$$dD2 \cdot \begin{bmatrix} G_{xdr} \\ G_{ydr} \\ R_{dr} \end{bmatrix} = \begin{bmatrix} dE4 \\ dE5 \\ dE6 \end{bmatrix} \quad (82)$$

Wherein dD2, dE4, dE5, dE6 are expressed by following equation (83) through equation (86).

[Formula 47]

$$dD2 = \begin{bmatrix} -1 & 0 & -V \\ 0 & -1 & U \\ 0 & 1 & 0 \end{bmatrix} \quad (83)$$

$$dE4 = dU - R\cdot V - G_x \quad (84)$$

$$dE5 = dV + R\cdot U - G_y \quad (85)$$

$$dE6 = E_{gyf} \quad (86)$$

Further, when the coefficient matrix of the left side and the vector of the right side of above equation (82) are integrated over a uniform time period, following equation (87) is obtained.

[Formula 48]

$$D2 \cdot \begin{bmatrix} G_{xdr} \\ G_{ydr} \\ R_{dr} \end{bmatrix} = \begin{bmatrix} E4 \\ E5 \\ E6 \end{bmatrix} \quad (87)$$

Wherein D2, E4, E5, E6 are expressed by following equation (88) through equation (91).

[Formula 49]

$$D2 = \int_{t}^{t+\Delta t} dD2 dt \quad (88)$$

$$E4 = \int_{t}^{t+\Delta t} dE4 dt \quad (89)$$

$$E5 = \int_{t}^{t+\Delta t} dE5 dt \quad (90)$$

$$E6 = \int_{t}^{t+\Delta t} dE6 dt \quad (91)$$

By solving above equation (87), following equation (92) can be derived.

[Formula 50]

$$\begin{bmatrix} G_{xdr} \\ G_{ydr} \\ R_{dr} \end{bmatrix} = D2^{-1} \cdot \begin{bmatrix} E4 \\ E5 \\ E6 \end{bmatrix} \quad (92)$$

As described above, the drift amount estimating means 338 can, in accordance with above equation (92), estimate the sensor drift amount of the longitudinal acceleration sensor 12, the sensor drift amount of the lateral acceleration sensor 14, and the sensor drift amount of the yaw angular velocity sensor 20, on the basis of the respective derivative amounts of the longitudinal vehicle body velocity and the lateral vehicle body velocity that are computed at the slip angle observer 34, and the respective derivative amounts of the longitudinal vehicle body velocity and the lateral vehicle body velocity that are computed at the motion equation derivative amount computing means 336.

Further, at the drift amount estimating means 338 relating to the present embodiment, in order to aim for stabilization of computation, the estimated values of the sensor drift amounts obtained by the results of computation of above equation (92) are smoothed in accordance with following equation (93) through equation (95) by using the estimated values of the preceding time.

[Formula 51]

$$\tilde{G}_{xdr}(i+1) = \lambda_2 \cdot \tilde{G}_{xdr}(i) + (1-\lambda_2) \cdot G_{xdr} \quad (93)$$

$$\tilde{G}_{ydr}(i+1) = \lambda_2 \cdot \tilde{G}_{ydr}(i) + (1-\lambda_2) \cdot G_{ydr} \quad (94)$$

$$\tilde{R}_{dr}(i+1) = \lambda_2 \cdot \tilde{R}_{dr}(i) + (1-\lambda_2) \cdot R_{dr} \quad (95)$$

Wherein $G_{xdr}$ tilde, $G_{ydr}$ tilde, $R_{dr}$ tilde are the estimated values of the sensor drift amounts after smoothing, and $\lambda 2$ is a forgetting factor.

In the above third embodiment, information processing by a program, that causes a computer to function as the respective means that are the drift amount correcting means 32, the slip angle observer 34, the motion equation derivative amount computing means 336, and the drift amount estimating means 338, can be realized by processes that are similar to the slip angle estimating processing routine shown in the flowchart of above FIG. 4.

As described above, in accordance with the slip angle estimating device relating to the third embodiment, sensor drift amounts of sensors that respectively detect the longitudinal acceleration, the lateral acceleration, and the yaw angular velocity can be estimated stably regardless of the state of vehicle motion, by using the relationship that the respective derivative amounts of the longitudinal vehicle body velocity and the lateral vehicle body velocity that were computed in order to estimate the vehicle body slip angle, and values, that consider the sensor drift amounts in the respective derivative amounts of the longitudinal vehicle body velocity and the lateral vehicle body velocity that are obtained from equations of motion for vehicle motion, are equal.

Further, the vehicle body slip angle can be estimated accurately on the basis of sensor signals that are corrected in accordance with the estimated sensor drift amounts.

Note that the above embodiment describes, as an example, a case in which the roll angle and the pitch angle are assumed to be 0, but the present invention is not limited to the same. The roll angle may be estimated by using the yaw angular velocity, the vehicle speed and the lateral acceleration, and further, the pitch angle may be estimated from the vehicle speed and the longitudinal acceleration.

Next, a fourth embodiment is described. Note that portions that are structured similarly to the first embodiment are denoted by the same reference numerals and description thereof is omitted. The present embodiment applies the present invention to an attitude angle-slip angle estimating device that estimates the pitch angle and the roll angle that are attitude angles of the vehicle, and estimates the vehicle body slip angle.

In the fourth embodiment, the point that the derivative amounts of corrected attitude angles are computed at the attitude angle observer, and the point that the derivative amounts of corrected vehicle body velocities are computed at the slip angle observer, are mainly different from the first embodiment.

Figure 11:
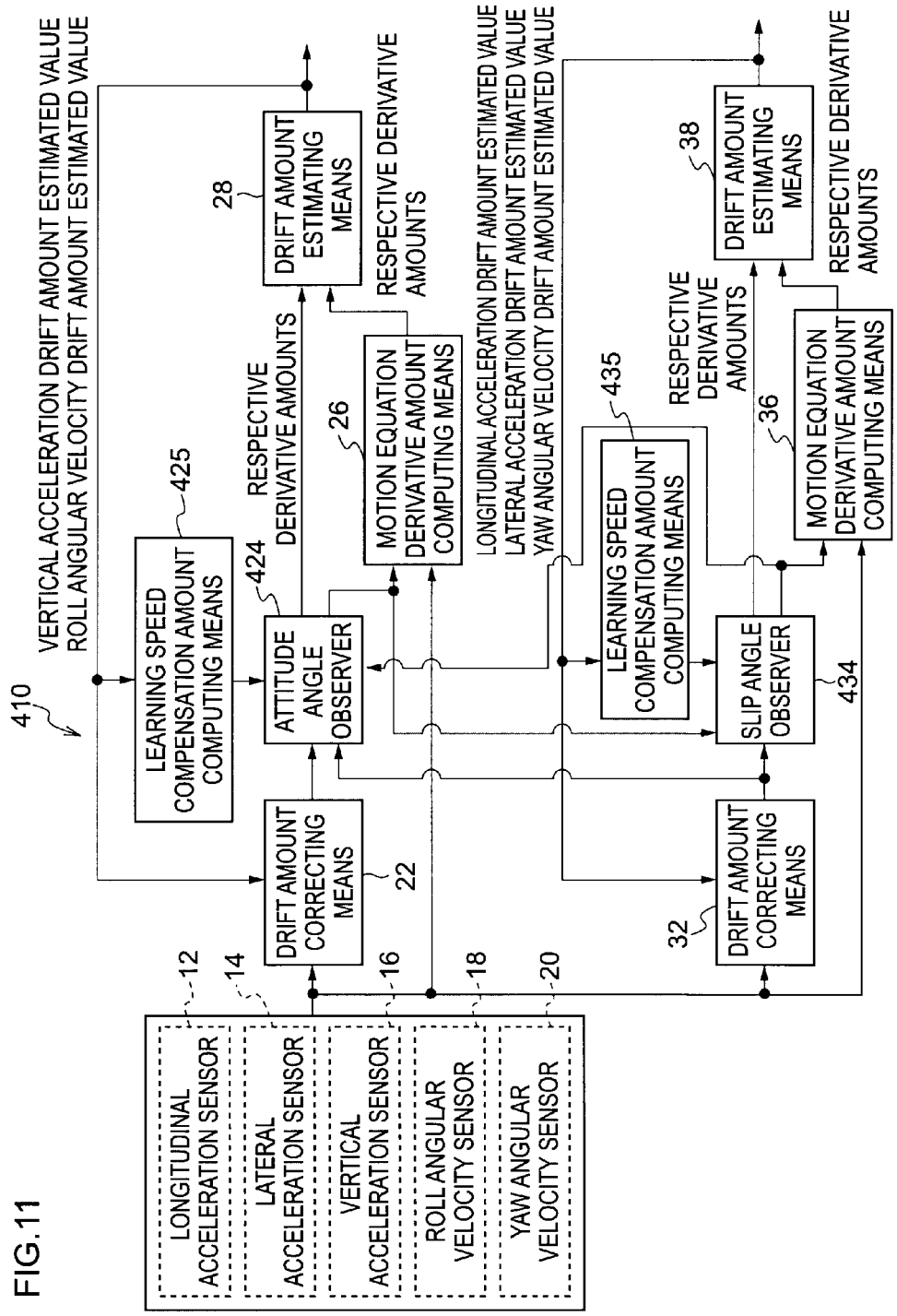
FIG. 11 is a schematic drawing showing the structure of an attitude angle-slip angle estimating device relating to a fourth embodiment of the present invention.

As shown in FIG. 11, the drift amount estimating means 28 of an attitude angle-slip angle estimating device 410 relating to the fourth embodiment is connected to a learning speed compensation amount computing means 425 that computes correction amounts for compensating for the learning speeds of the respective sensor drift amounts of the vertical acceleration sensor 16 and the roll angular velocity sensor 18, and to the drift amount correcting means 22.

The drift amount correcting means 22 and the learning speed compensation amount computing means 425 are connected to an attitude angle observer 424 that estimates the roll angle $\phi$ and the pitch angle $\theta$ that are attitude angles with respect to the vertical axis of the vehicle body.

The vertical acceleration sensor 16, the roll angular velocity sensor 18, the drift amount correcting means 32, and the attitude angle observer 424 are connected to the motion equation derivative amount computing means 26.

The attitude angle observer 424 and the motion equation derivative amount computing means 26 are connected to the drift amount estimating means 28.

The drift amount estimating means 38 is connected to a learning speed compensation amount computing means 435 that computes correction amounts for compensating for the learning speeds of the respective sensor drift amounts of the longitudinal acceleration sensor 12, the lateral acceleration sensor 14 and the yaw angular velocity sensor 20, and to the drift amount correcting means 32.

The drift amount correcting means 32 and the learning speed compensation amount computing means 435 are connected to a slip angle observer 434 that estimates the vehicle body slip angle.

The longitudinal acceleration sensor 12, the lateral acceleration sensor 14, the yaw angular velocity sensor 20, the attitude angle observer 424 and the slip angle observer 434 are connected to the motion equation derivative amount computing means 36.

The slip angle observer 434 and the motion equation derivative amount computing means 36 are connected to the drift amount estimating means 38.

The drift amount correcting means 22, the attitude angle observer 424, the learning speed compensation amount computing means 425, the motion equation derivative amount computing means 26, the drift amount estimating means 28, the drift amount correcting means 32, the slip angle observer 434, the learning speed compensation amount computing means 435, the motion equation derivative amount computing means 36, and the drift amount estimating means 38 can be structured by one or plural computers or by one or plural electronic circuits that realize the functions of the respective means.

Next, the principles of the present embodiment are described.

Sensor drift amounts are estimated and drift errors are corrected by sensor drift error learning, and correct attitude angle estimation can be expected. However, the effects of delays in sensor drift error learning on attitude angle estimation are of concern.

For example, if a positive sensor drift error is applied to the roll angular velocity, until the sensor drift error learning is completed, the estimated value of the roll angle is affected by the positive sensor drift error that is being applied to the roll angular velocity, and an error arises in the positive direction.

The present embodiment focuses on the point that effects due to delays in sensor drift error learning can be inferred in accordance with the speed of learning, i.e., in which direction the sensor drift amount that is estimated by the drift error learning is changing, and corrects a derivative state amount of the observer in accordance with the amount of change in the estimated sensor drift amount.

In accordance with following equation (96), the learning speed compensation amount computing means 425 computes a correction amount $P_c$ for correcting the derivative amount of the roll angle so as to compensate for the delay in the learning speed of the sensor drift amount of the roll angular velocity sensor 18, on the basis of the deviation of sensor drift amount $P_{dr}$, that is estimated by the drift amount estimating means 28 for the sensor signal that corresponds to the detected value of the roll angular velocity, from the preceding estimated value $P_{dr0}$.

[Formula 52]

$$P_c = \begin{cases} P_{c0} & (P_{dr} - P_{dr0} < -P_{sl}) \\ 0 & (|P_{dr} - P_{dr0}| < P_{sl}) \\ -P_{c0} & (P_{dr} - P_{dr0} > P_{sl}) \end{cases} \quad (96)$$

Wherein $P_{sl}$ is a predetermined threshold value relating to the amount of change in the sensor drift amount of the roll angular velocity sensor 18, and $P_{c0}$ is a predetermined correction amount. Further, $P_{sl}$, $P_{c0}$ are positive values.

In accordance with above equation (96), if, in accordance with the amount of change from the preceding estimated value of the sensor drift amount of the roll angular velocity sensor 18, the amount of change is negative and the absolute value of the amount of change is greater than or equal to the threshold value, the estimated sensor drift amount is changing in the negative direction. Therefore, the derivative amount of the roll angle is corrected so as to be increased, in order to compensate for the delay in the learning speed of the negative sensor drift amount. On the other hand, if, in accordance with the amount of change from the preceding estimated value of the sensor drift amount of the roll angular velocity sensor 18, the amount of change is positive and the absolute value of the amount of change is greater than or equal to the threshold value, the estimated sensor drift amount is changing in the positive direction. Therefore, the derivative amount of the roll angle is corrected so as to be decreased, in order to compensate for the delay in the learning speed of the positive sensor drift amount. Further, if the absolute value of the amount of change from the preceding estimated value of the sensor drift amount of the roll angular velocity sensor 18 is less than the threshold value, the estimated drift amount converges, and there is no need to compensate for a delay in the learning speed of the sensor drift amount. Therefore, the derivative amount of the roll angle is not corrected.

Further, in accordance with following equation (97), the learning speed compensation amount computing means 425 computes a correction amount $Q_c$ for correcting the derivative amount of the pitch angle so as to compensate for the delay in the learning speed of the sensor drift amount of the vertical acceleration sensor 16, on the basis of the deviation of sensor drift amount $G_{zdr}$, that is estimated by the drift amount estimating means 28 for the sensor signal that corresponds to the detected value of the vertical acceleration, from the preceding estimated value $G_{zdr0}$.

[Formula 53]

$$Q_c = \begin{cases} -Q_{c0} & \left(\dfrac{G_{zdr} - G_{zdr0}}{V_{s0}} < -Q_{sl}\right) \\ 0 & \left(\left|\dfrac{G_{zdr} - G_{zdr0}}{V_{s0}}\right| < Q_{sl}\right) \\ Q_{c0} & \left(\dfrac{G_{zdr} - G_{zdr0}}{V_{s0}} > Q_{sl}\right) \end{cases} \quad (97)$$

Wherein $Q_{sl}$ is a predetermined threshold value relating to a value obtained by dividing the amount of change in the sensor drift amount of the vertical acceleration sensor 16 by the longitudinal vehicle body velocity, and $Q_{c0}$ is a correction amount. Further, $Q_{sl}$, $Q_{c0}$ are positive values.

In accordance with above equation (97), if, in accordance with the amount of change from the preceding estimated value of the sensor drift amount of the vertical acceleration sensor 16, the amount of change is negative and the absolute value of a value obtained by dividing the amount of change by the longitudinal vehicle body velocity is greater than or equal to the threshold value, the estimated sensor drift amount is changing in the negative direction. Therefore, the derivative amount of the pitch angle is corrected so as to be decreased, in order to compensate for the delay in the learning speed of the negative sensor drift amount, from the relationship between the pitch angular velocity obtained from above equation (6) and the vertical acceleration. On the other hand, if, in accordance with the amount of change from the preceding estimated value of the sensor drift amount of the vertical acceleration sensor 16, the amount of change is positive and the absolute value of the value obtained by dividing the amount of change by the longitudinal vehicle body velocity is greater than or equal to the threshold value, the estimated sensor drift amount is changing in the positive direction. Therefore, the derivative amount of the pitch angle is corrected so as to be increased, in order to compensate for the delay in the learning speed of the positive sensor drift amount. Further, if the absolute value of the amount of change from the preceding estimated value of the sensor drift amount of the vertical acceleration sensor 16 is less than the threshold value, the estimated sensor drift amount converges, and there is no need to compensate for a delay in the learning speed of the sensor drift amount. Therefore, the derivative amount of the pitch angle is not corrected.

In accordance with following equation (98), the learning speed compensation amount computing means 435 computes a correction amount $G_{xc}$ for correcting the derivative amount of the longitudinal vehicle body velocity so as to compensate for the delay in the learning speed of the sensor drift amount of the longitudinal acceleration sensor 12, on the basis of the deviation of sensor drift amount $G_{xdr}$, that is estimated by the drift amount estimating means 38 for the sensor signal that corresponds to the detected value of the longitudinal acceleration, from the preceding estimated value $G_{xdr0}$.

[Formula 54]

$$G_{xc} = \begin{cases} G_{xc0} & (G_{xdr} - G_{xdr0} < -G_{xsl}) \\ 0 & (|G_{xdr} - G_{xdr0}| < G_{xsl}) \\ -G_{xc0} & (G_{xdr} - G_{xdr0} > G_{xsl}) \end{cases} \quad (98)$$

Wherein $G_{xs1}$ is a predetermined threshold value relating to the amount of change in the sensor drift amount of the longitudinal acceleration sensor 12, and $G_{xc0}$ is a predetermined correction amount. Further, $G_{xs1}$, $G_{xc0}$ are positive values.

In accordance with above equation (98), if, in accordance with the amount of change from the preceding estimated value of the sensor drift amount of the longitudinal acceleration sensor 12, the amount of change is negative and the absolute value of the amount of change is greater than or equal to the threshold value, the estimated sensor drift amount is changing in the negative direction. Therefore, the derivative amount of the longitudinal vehicle body velocity is corrected so as to be increased, in order to compensate for the delay in the learning speed of the negative sensor drift amount. On the other hand, if, in accordance with the amount of change from the preceding estimated value of the sensor drift amount of the longitudinal acceleration sensor 12, the amount of change is positive and the absolute value of the amount of change is greater than or equal to the threshold value, the estimated sensor drift amount is changing in the positive direction. Therefore, the derivative amount of the longitudinal vehicle body velocity is corrected so as to be decreased, in order to compensate for the delay in the learning speed of the positive sensor drift amount. Further, if the absolute value of the amount of change from the preceding estimated value of the sensor drift amount of the longitudinal acceleration sensor 12 is less than the threshold value, the estimated sensor drift amount converges, and there is no need to compensate for a delay in the learning speed of the sensor drift amount. Therefore, the derivative amount of the longitudinal vehicle body velocity is not corrected.

Further, in accordance with following equation (99), the learning speed compensation amount computing means 435 computes a correction amount $G_{yc}$ for correcting the derivative amount of the lateral vehicle body velocity so as to compensate for the delay in the learning speed of the sensor drift amount of the lateral acceleration sensor 14, on the basis of the deviation of sensor drift amount $G_{ydr}$, that is estimated by the drift amount estimating means 38 for the sensor signal that corresponds to the detected value of the lateral acceleration, from the preceding estimated value $G_{ydr0}$.

[Formula 55]

$$G_{yc} = \begin{cases} G_{yc0} & (G_{ydr} - G_{ydr0} < -G_{ysl}) \\ 0 & (|G_{ydr} - G_{ydr0}| < G_{ysl}) \\ -G_{yc0} & (G_{ydr} - G_{ydr0} > G_{ysl}) \end{cases} \quad (99)$$

Wherein $G_{ys1}$ is a predetermined threshold value relating to the amount of change in the sensor drift amount of the lateral acceleration sensor 14, and $G_{yc0}$ is a predetermined correction amount. Further, $G_{ys1}$, $G_{yc0}$ are positive values.

In accordance with above equation (99), if, in accordance with the amount of change from the preceding estimated value of the sensor drift amount of the lateral acceleration sensor 14, the amount of change is negative and the absolute value of the amount of change is greater than or equal to the threshold value, the estimated sensor drift amount is changing in the negative direction. Therefore, the derivative amount of the lateral vehicle body velocity is corrected so as to be increased, in order to compensate for the delay in the learning speed of the negative sensor drift amount. On the other hand, if, in accordance with the amount of change from the preceding estimated value of the sensor drift amount of the lateral acceleration sensor 14, the amount of change is positive and the absolute value of the amount of change is greater than or equal to the threshold value, the estimated sensor drift amount is changing in the positive direction. Therefore, the derivative amount of the lateral vehicle body velocity is corrected so as to be decreased, in order to compensate for the delay in the learning speed of the positive sensor drift amount. Further, if the absolute value of the amount of change from the preceding estimated value of the sensor drift amount of the lateral acceleration sensor 14 is less than the threshold value, the estimated sensor drift amount converges, and there is no need to compensate for a delay in the learning speed of the sensor drift amount. Therefore, the derivative amount of the lateral vehicle body velocity is not corrected.

The attitude angle observer 424 estimates the pitch angular velocity Q tilde on the basis of the estimated value of the lateral vehicle body velocity V, the estimated value of the longitudinal vehicle body velocity U that were estimated at the slip angle observer 434, and the corrected signal that corresponds to the detected value of the lateral acceleration $G_z$ and the corrected signal that corresponds to the detected value of the roll angular velocity P that were corrected at the drift amount correcting means 22. The attitude angle observer 424 computes the derivative amount dφ tilde of the roll angle and the derivative amount dθ tilde of the pitch angle that have been corrected so as to compensate for the delay in the learning speed of the sensor drift amounts, in accordance with following equation (100) that replaces above equation (24), on the basis of the corrected signals corresponding to the respective detected values of the longitudinal acceleration $G_x$, the lateral acceleration $G_y$, the vertical acceleration $G_z$, the yaw angular velocity R, and the roll angular velocity P of vehicle motion that were corrected at the drift amount correcting means 22 and the drift amount correcting means 32, and estimated value $V_{so}$ of the longitudinal vehicle body velocity U, and the estimated value Q tilde of the pitch angular velocity, and the correction amounts $P_c$, $Q_c$ that were computed by the learning speed compensation amount computing means 425.

[Formula 56]

$$\frac{d}{dt}\tilde{x} = \begin{bmatrix} P - P_{dr} + \tilde{Q}\sin\tilde{\phi}\tan\tilde{\theta} + (R - R_{dr})\cos\tilde{\phi}\tan\tilde{\theta} \\ \tilde{Q}\cos\tilde{\phi} - (R - R_{dr})\sin\tilde{\phi} \\ -\frac{\tilde{g}_{xdf}}{\tau_x} + \frac{g\sin\tilde{\theta}}{\tau_x} \\ -\frac{\tilde{g}_{ydf}}{\tau_y} - \frac{g\cos\tilde{\theta}\sin\tilde{\phi}}{\tau_y} \\ -(G_x - G_{xdr})\sin\tilde{\theta} + \\ (G_y - G_{ydr})\sin\tilde{\phi}\cos\tilde{\theta} + \\ -\frac{\tilde{g}_f}{\tau_g} + \frac{(G_z - G_{zdr})\cos\tilde{\phi}\cos\tilde{\theta}}{\tau_g} \end{bmatrix} +$$

$$\begin{bmatrix} 0 & -K_{\phi y} & K_{\phi g}(G_y - G_{ydr}) \\ K_{\theta x} & 0 & -K_{\theta g}(G_x - G_{xdr}) \\ K_x & 0 & 0 \\ 0 & K_y & 0 \\ 0 & 0 & K_g \end{bmatrix} \cdot \begin{bmatrix} g_{xdf} - \tilde{g}_{xdf} \\ g_{ydf} - \tilde{g}_{ydf} \\ g - \tilde{g}_f \end{bmatrix} + \begin{bmatrix} P_c \\ Q_c \\ 0 \\ 0 \\ 0 \end{bmatrix} \quad (100)$$

Further, the attitude angle observer 424 integrates the derivative amount of the roll angle and the derivative amount of the pitch angle that were computed in accordance with above equation (100), and estimates the roll angle φ tilde and the pitch angle θ tilde that are attitude angles.

The slip angle observer 434 estimates the lateral vehicle body velocity V tilde that is the vehicle body velocity in the vehicle lateral direction, and, on the basis of the wheel speeds of the respective wheels, estimates the longitudinal vehicle body velocity U tilde that is the vehicle body velocity in the vehicle longitudinal direction. Further, the slip angle observer 434 computes the derivative amount dU tilde of the longitudinal vehicle body velocity and the derivative amount dV tilde of the lateral vehicle body velocity that were corrected in order to compensate for the delay in the learning speed of the sensor drift amounts, in accordance with following equation (101-1) through equation (101-5) that replace above equation (29-1) through (29-5), on the basis of the estimated value V tilde of the lateral vehicle body velocity, the estimated value U tilde of the longitudinal vehicle body velocity, the corrected signals corresponding to the respective detected values of the longitudinal acceleration $G_x$, the lateral acceleration $G_y$, and the yaw angular velocity R of vehicle motion that have been corrected at the drift amount correcting means 32, and the correction amounts $G_{xc}$, $G_{yc}$ that were computed by the learning speed compensation amount computing means 435.

[Formula 57]

$$\frac{d}{dt}\tilde{x} = \begin{bmatrix} 0 & R - R_{dr} \\ -(R - R_{dr}) & 0 \end{bmatrix} \cdot \tilde{x} + \\ \begin{bmatrix} g\sin\tilde{\theta} + G_x - G_{xdr} \\ -g\cos\tilde{\theta}\sin\tilde{\phi} + G_y - G_{ydr} \end{bmatrix} + K \cdot (y - \tilde{y}) + \begin{bmatrix} G_{xc} \\ G_{yc} \end{bmatrix} \quad (101\text{-}1)$$

$$= \left( \begin{bmatrix} 0 & R - R_{dr} \\ -(R - R_{dr}) & 0 \end{bmatrix} - K \cdot [1 \ 0] \right) \cdot \\ \tilde{x} + \begin{bmatrix} g\sin\tilde{\theta} + G_x - G_{xdr} \\ -g\cos\tilde{\theta}\sin\tilde{\phi} + G_y - G_{ydr} \end{bmatrix} + K \cdot y + \begin{bmatrix} G_{xc} \\ G_{yc} \end{bmatrix} \quad (101\text{-}2)$$

$$= \left( \begin{bmatrix} 0 & R - R_{dr} \\ -(R - R_{dr}) & 0 \end{bmatrix} - \begin{bmatrix} 1.4|R - R_{dr}| \\ 0 \end{bmatrix} \cdot [1 \ 0] \right) \cdot \\ \tilde{x} + \begin{bmatrix} g\sin\tilde{\theta} + G_x - G_{xdr} \\ -g\cos\tilde{\theta}\sin\tilde{\phi} + G_y - G_{ydr} \end{bmatrix} + \begin{bmatrix} 1.4|R - R_{dr}| \\ 0 \end{bmatrix} \cdot y + \begin{bmatrix} G_{xc} \\ G_{yc} \end{bmatrix} \quad (101\text{-}3)$$

$$= \begin{bmatrix} -1.4|R - R_{dr}| & R - R_{dr} \\ -(R - R_{dr}) & 0 \end{bmatrix} \cdot \\ \tilde{x} + \begin{bmatrix} g\sin\tilde{\theta} + G_x - G_{xdr} \\ -g\cos\tilde{\theta}\sin\tilde{\phi} + G_y - G_{ydr} \end{bmatrix} + \begin{bmatrix} 1.4|R - R_{dr}| \\ 0 \end{bmatrix} \cdot V_{so} + \begin{bmatrix} G_{xc} \\ G_{yc} \end{bmatrix} \quad (101\text{-}4)$$

$$= \begin{bmatrix} -1.4|R - R_{dr}| & R - R_{dr} \\ -(R - R_{dr}) & 0 \end{bmatrix} \cdot \begin{bmatrix} \tilde{U} \\ \tilde{V} \end{bmatrix} + \\ \begin{bmatrix} g\sin\tilde{\theta} + G_x - G_{xdr} \\ -g\cos\tilde{\theta}\sin\tilde{\phi} + G_y - G_{ydr} \end{bmatrix} + \begin{bmatrix} 1.4|R - R_{dr}| \\ 0 \end{bmatrix} \cdot V_{so} + \begin{bmatrix} G_{xc} \\ G_{yc} \end{bmatrix} \quad (101\text{-}5)$$

Further, the slip angle observer 434 integrates the derivative amount of the longitudinal vehicle body velocity and the derivative amount of the lateral vehicle body velocity that were computed in accordance with above equation (101-1), and estimates the longitudinal vehicle body velocity U tilde and the lateral vehicle body velocity V tilde. Further, the slip angle observer 434 estimates the vehicle body slip angle β tilde in accordance with above (31), on the basis of the estimated value U tilde of the longitudinal vehicle body velocity and the estimated value V tilde of the lateral vehicle body velocity.

Figure 12:
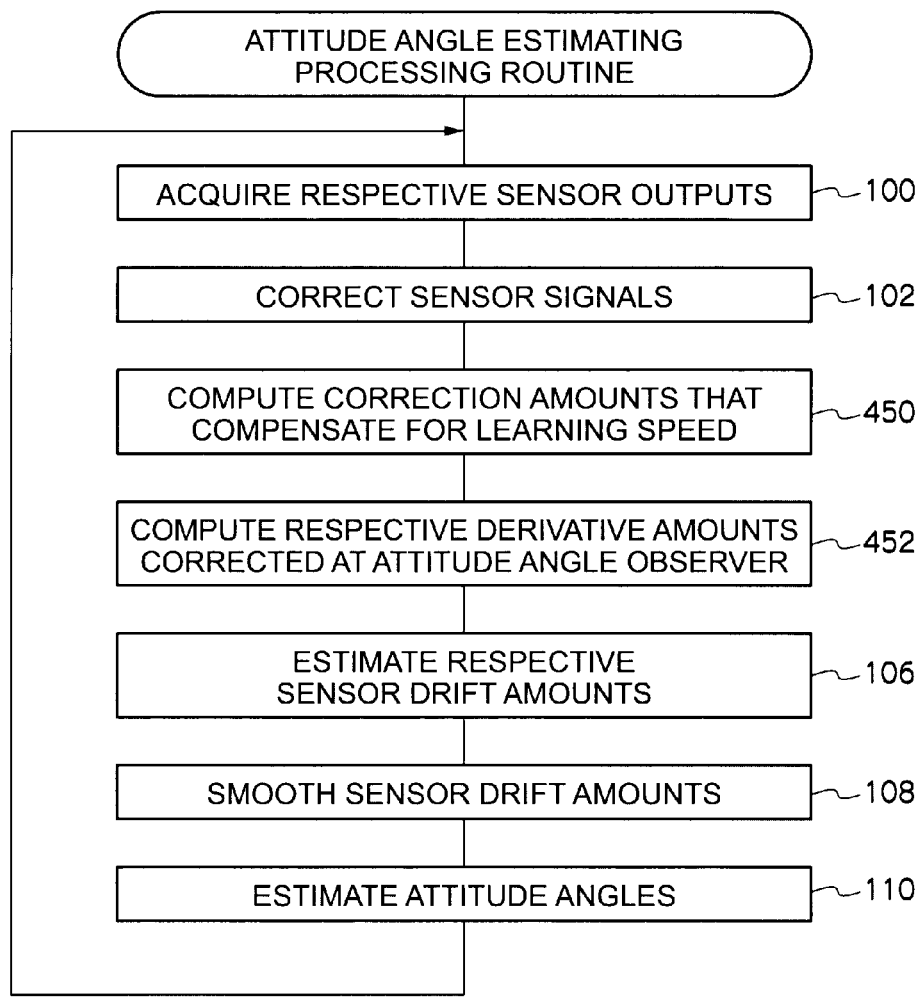
FIG. 12 is a flowchart showing the contents of an attitude angle estimating processing routine in the attitude angle-slip angle estimating device relating to the fourth embodiment of the present invention.

In the above fourth embodiment, information processing by a program, that causes a computer to function as the respective means that are the drift amount correcting means 22, the attitude angle observer 424, the learning speed compensation amount computing means 425, the motion equation derivative amount computing means 26, and the drift amount estimating means 28, can be realized by the attitude angle estimating processing routine that is shown in the flowchart of FIG. 12. Hereinafter, this attitude angle estimating processing routine is described. Note that processings that are similar to the first embodiment are denoted by the same reference numerals, and detailed description thereof is omitted.

First, in step 100, sensor signals corresponding to respective detected values are acquired from the longitudinal acceleration sensor 12, the lateral acceleration sensor 14, the vertical acceleration sensor 16, the roll angular velocity sensor 18, and the yaw angular velocity sensor 20.

Then, in step 102, the sensor signals, that were outputted from the vertical acceleration sensor 16 and the roll angular velocity sensor 18 and that were acquired in above step 100, are corrected by using the sensor drift amounts that were obtained one computation cycle before in step 108 that is described below.

In next step 450, the correction amount for correcting the derivative amount of the roll angle is computed on the basis of the amount of change between the sensor drift amount of the vertical acceleration sensor 16 that was obtained one computation cycle before in step 108 that is described below, and the sensor drift amount of the vertical acceleration sensor 16 that was obtained two computation cycles before. Further, the correction amount for correcting the derivative amount of the pitch angle is computed on the basis of the amount of change between the sensor drift amount of the roll angular velocity sensor 18 that was obtained one computation cycle before in step 108 that is described below, and the sensor drift amount of the roll angular velocity sensor 18 that was obtained two computation cycles before.

Then, in step 452, the respective derivative amounts of the roll angle and the pitch angle, that were corrected in order to compensate for the delay in the learning speed, are computed as described above by using the attitude angle estimated values obtained one computation cycle before in step 110 that is described below, and the vehicle body velocity estimated values that were obtained one computation cycle before in step 160 that is described below, and the correction amounts obtained in above step 450.

Then, in step 106, the sensor drift amount of the vertical acceleration sensor 16 and the sensor drift amount of the roll angular velocity sensor 18 are estimated.

In next step 108, the sensor drift amount of the vertical acceleration sensor 16 and the sensor drift amount of the roll angular velocity sensor 18, that were estimated in above step 106, are smoothed.

In next step 110, by integrating the respective derivative amounts of the roll angle and the pitch angle that were computed in above step 452, the roll angle and the pitch angle are estimated and outputted, and the routine returns to above step 100.

Figure 13:
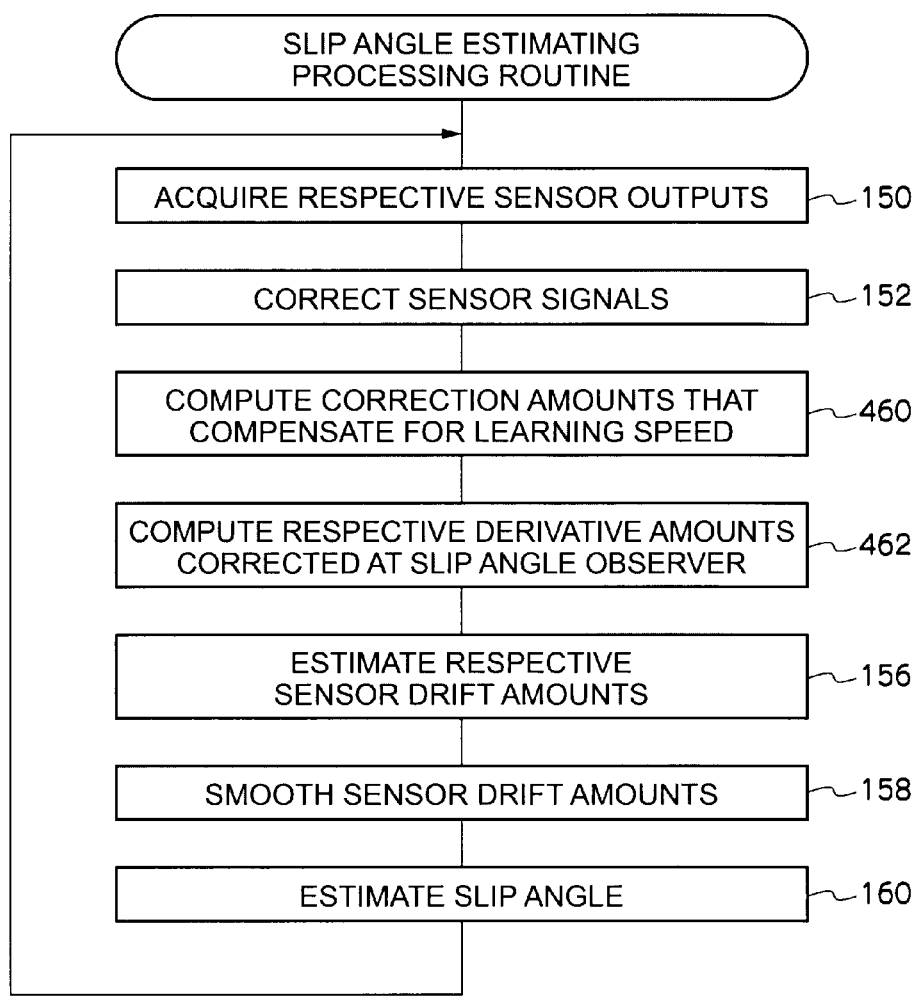
FIG. 13 is a flowchart showing the contents of a slip angle estimating processing routine in the attitude angle-slip angle estimating device relating to the fourth embodiment of the present invention.

Further, information processing by a program, that causes a computer to function as the respective means that are the drift amount correcting means 32, the slip angle observer 434, the learning speed compensation amount computing means 435, the motion equation derivative amount computing means 36, and the drift amount estimating means 38, can be realized by the slip angle estimating processing routine shown in the flowchart of FIG. 13. Hereinafter, this slip angle estimating processing routine is described. Note that processings that are similar to the first embodiment are denoted by the same reference numerals, and detailed description thereof is omitted.

First, in step 150, sensor signals corresponding to respective detected values are acquired from the longitudinal acceleration sensor 12, the lateral acceleration sensor 14, and the yaw angular velocity sensor 20.

Then, in step 152, the sensor signals, that were outputted respectively from the longitudinal acceleration sensor 12, the lateral acceleration sensor 14, and the yaw angular velocity sensor 20 and that were acquired in above step 150, are corrected by using the sensor drift amounts that were obtained one computation cycle before in step 158 that is described below.

In next step 460, the correction amount for correcting the derivative amount of the longitudinal vehicle body velocity is computed on the basis of the amount of change between the sensor drift amount of the longitudinal acceleration sensor 12 that was obtained one computation cycle before in step 158 that is described below, and the sensor drift amount of the longitudinal acceleration sensor 12 that was obtained two computation cycles before. Further, the correction amount for correcting the derivative amount of the lateral vehicle body velocity is computed on the basis of the amount of change between the sensor drift amount of the lateral acceleration sensor 14 that was obtained one computation cycle before in step 158 that is described below, and the sensor drift amount of the lateral acceleration sensor 14 that was obtained two computation cycles before.

Then, in step 462, the respective derivative amounts of the longitudinal vehicle body velocity and the lateral vehicle body velocity, that were corrected in order to compensate for the delay in the learning speed, are computed by using the attitude angle estimated values obtained one computation cycle before in above step 110, and the vehicle body velocity estimated values that were obtained one computation cycle before in step 160 that is described below, and the correction amounts obtained in above step 460.

Then, in step 156, the sensor drift amount of the longitudinal acceleration sensor 12, the sensor drift amount of the lateral acceleration sensor 14, and the sensor drift amount of the yaw angular velocity sensor 20 are estimated.

In next step 158, the sensor drift amount of the longitudinal acceleration sensor 12, the sensor drift amount of the lateral acceleration sensor 14, and the sensor drift amount of the yaw angular velocity sensor 20, that were estimated in above step 156, are smoothed.

In next step 160, by integrating the respective derivative amounts of the longitudinal vehicle body velocity and the lateral vehicle body velocity that were computed in above step 462, the longitudinal vehicle body velocity and the lateral vehicle body velocity are estimated, and, on the basis of the estimated longitudinal vehicle body velocity and lateral vehicle body velocity, the vehicle body slip angle is estimated and outputted, and the routine returns to above step 150.

Next, estimation results of attitude angles by the method of compensating for a delay in learning speed of the sensor drift amount of the present embodiment are described. Note that, in order to confirm the effects of the present technique, estimation of the attitude angles was carried out by applying a drift error to regular circle turning data of around 0.3 G. Further, drift error difference estimation of the roll angular velocity sensor 18 and the vertical acceleration sensor 16 was carried out, and further, estimation of the attitude angles was carried out in a case in which correction that compensated for the delays in the learning speeds of the sensor drift amounts of both sensors was carried out, and in a case in which correction that compensated for the delays in the learning speeds was not carried out.

Figure 14A:
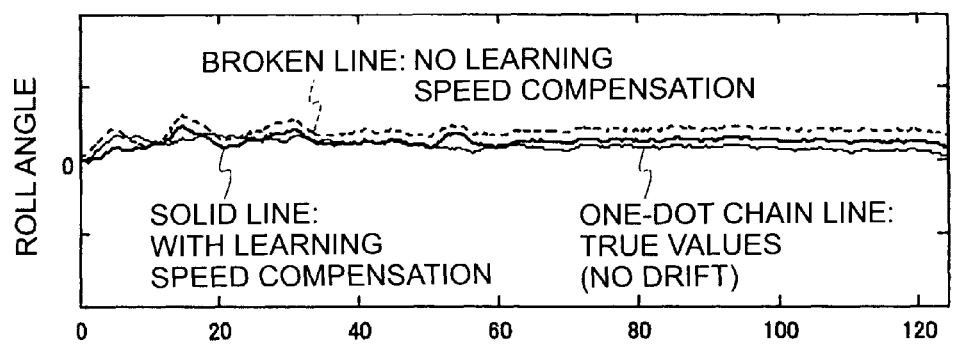
FIG. 14A is a graph showing estimation results of a roll angle when a delay in learning speed of a sensor drift amount is compensated for, in a state in which positive drift is applied to roll angular velocity.
Figure 14B:
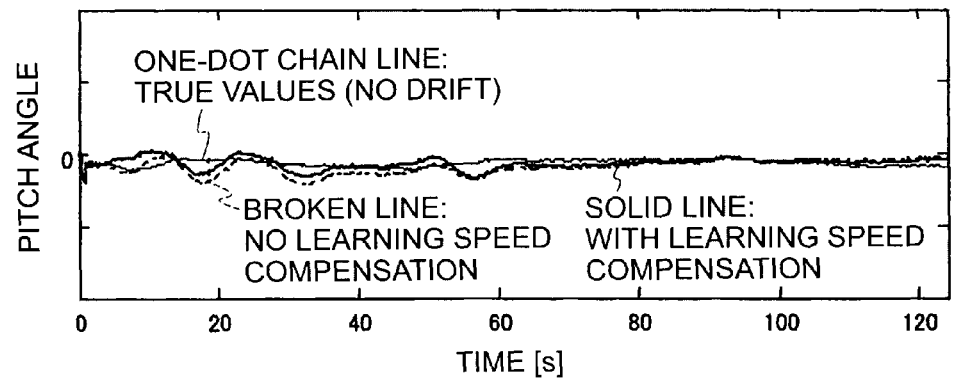
FIG. 14B is a graph showing estimation results of a pitch angle when a delay in learning speed of a sensor drift amount is compensated for, in a state in which positive drift is applied to roll angular velocity.

First, estimation of attitude angles was carried out in a state in which a drift error of 3 deg/s was applied to the sensor signal from the roll angular velocity sensor. As shown in FIG. 14A and FIG. 14B, it can be understood that the accuracy of attitude angle estimation is improved by carrying out correction that compensates for the delay in the learning speed of the sensor drift amount.

Figure 15A:
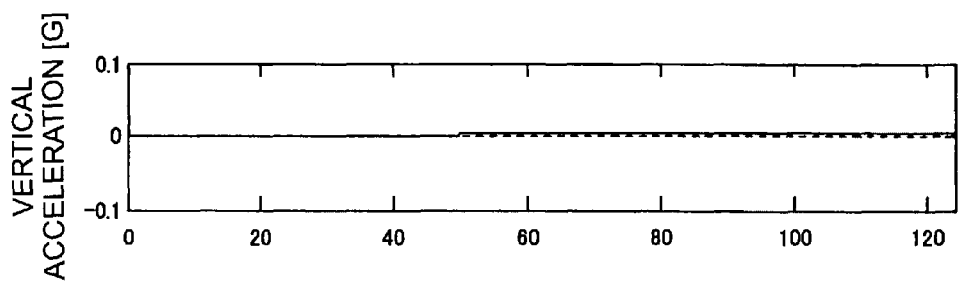
FIG. 15A is a graph showing estimation results of a sensor drift amount of a vertical acceleration sensor in a state in which positive drift is applied to roll angular velocity.
Figure 15B:
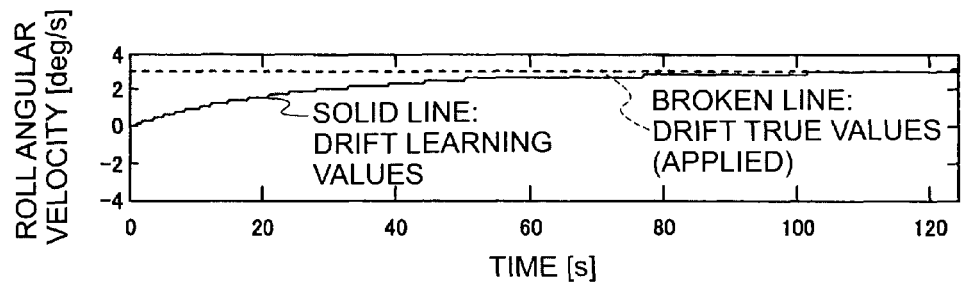
FIG. 15B is a graph showing estimation results of a sensor drift amount of a roll angular velocity sensor in a state in which positive drift is applied to roll angular velocity.

Further, as shown in FIG. 15B, it can be understood that, when a drift error of 3 deg/s is applied to the sensor signal from the roll angular velocity sensor, a delay in the learning speed of the sensor drift amount of the roll angular velocity arises.

Figure 16A:
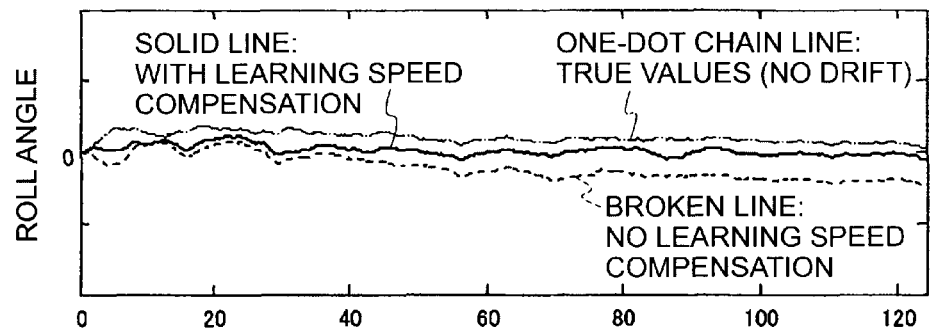
FIG. 16A is a graph showing estimation results of a roll angle when a delay in learning speed of a sensor drift amount is compensated for, in a state in which negative drift is applied to roll angular velocity.
Figure 16B:
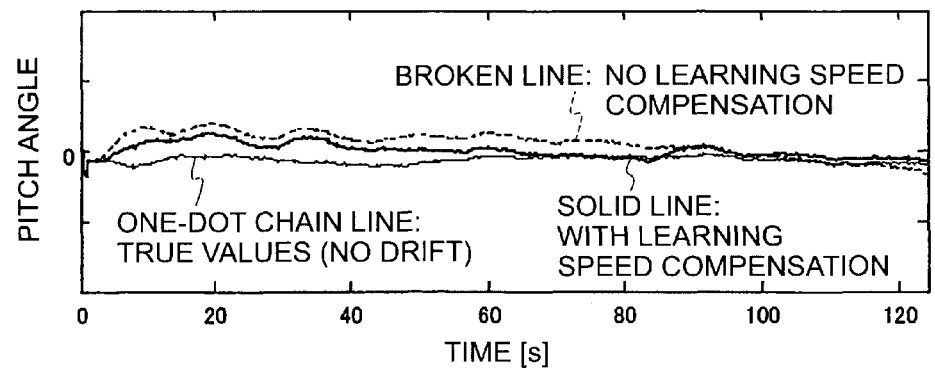
FIG. 16B is a graph showing estimation results of a pitch angle when a delay in learning speed of a sensor drift amount is compensated for, in a state in which negative drift is applied to roll angular velocity.

Further, estimation of attitude angles was carried out in a state in which a drift error of −3 deg/s was applied to the sensor signal from the roll angular velocity sensor. As shown in FIG. 16A and FIG. 16B, it can be understood that the accuracy of attitude angle estimation is improved by carrying out correction that compensates for the delay in the learning speed of the sensor drift amount.

Figure 17A:
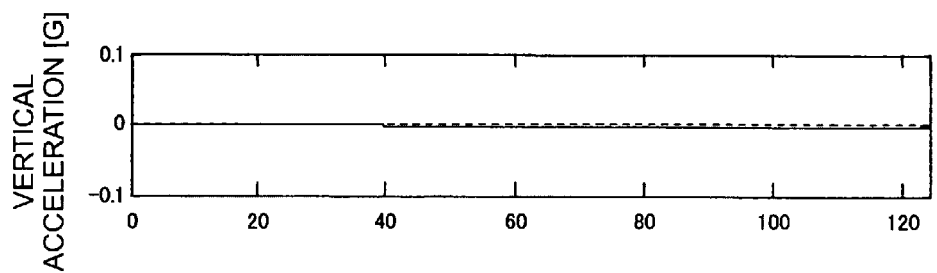
FIG. 17A is a graph showing estimation results of a sensor drift amount of a vertical acceleration sensor in a state in which negative drift is applied to roll angular velocity.
Figure 17B:
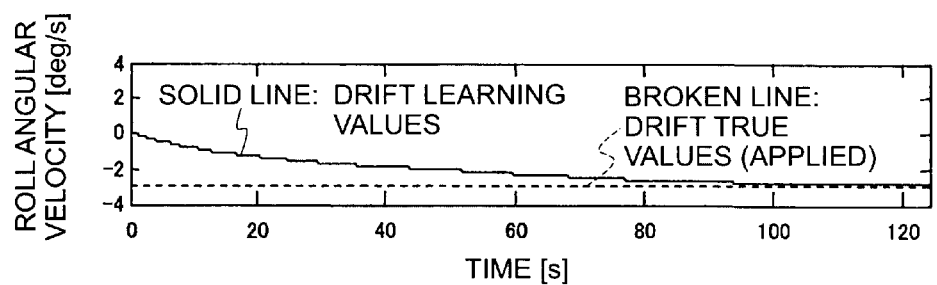
FIG. 17B is a graph showing estimation results of a sensor drift amount of a roll angular velocity sensor in a state in which negative drift is applied to roll angular velocity.

Further, as shown in FIG. 17B, it can be understood that, when a drift error of −3 deg/s is applied to the sensor signal from the roll angular velocity sensor, a delay in the learning speed of the sensor drift amount of the roll angular velocity arises.

Figure 18A:
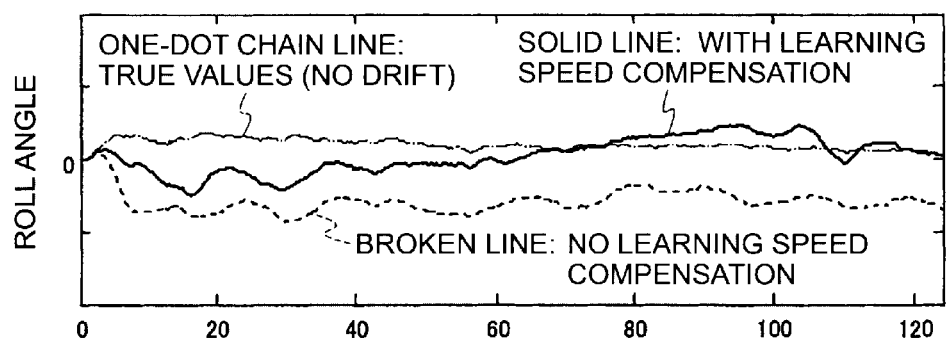
FIG. 18A is a graph showing estimation results of a roll angle when a delay in learning speed of a sensor drift amount is compensated for, in a state in which positive drift is applied to vertical acceleration.
Figure 18B:
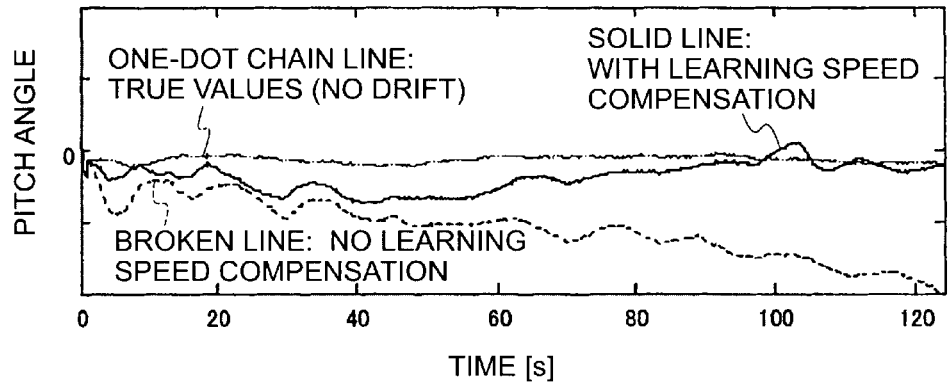
FIG. 18B is a graph showing estimation results of a pitch angle when a delay in learning speed of a sensor drift amount is compensated for, in a state in which positive drift is applied to vertical acceleration.

Further, estimation of attitude angles was carried out in a state in which a drift error of 0.07 G was applied to the sensor signal from the vertical acceleration sensor. As shown in FIG. 18A and FIG. 18B, it can be understood that the accuracy of attitude angle estimation is improved by carrying out correction that compensates for the delay in the learning speed of the sensor drift amount.

Figure 19A:
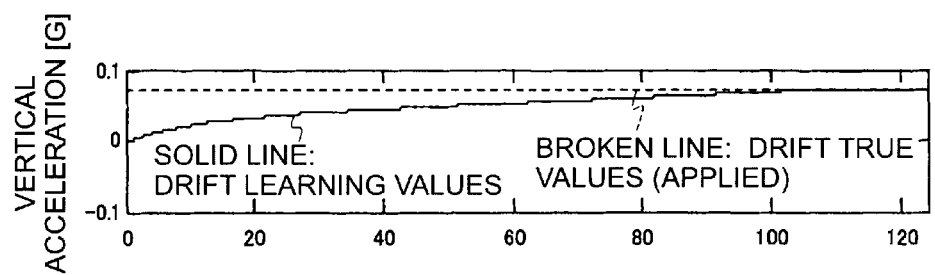
FIG. 19A is a graph showing estimation results of a sensor drift amount of a vertical acceleration sensor in a state in which positive drift is applied to vertical acceleration.
Figure 19B:
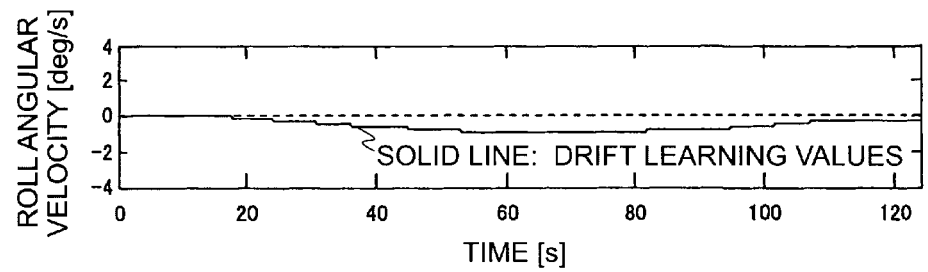
FIG. 19B is a graph showing estimation results of a sensor drift amount of a roll angular velocity sensor in a state in which positive drift is applied to vertical acceleration.

Further, as shown in FIG. 19A, it can be understood that, when a drift error of 0.07 G is applied to the sensor signal from the vertical acceleration sensor, a delay in the learning speed of the sensor drift amount of the vertical acceleration arises. Further, the accuracy of drift estimation also is improved by carrying out correction that compensates for the delay in the learning speed of the sensor drift amount.

Figure 20A:
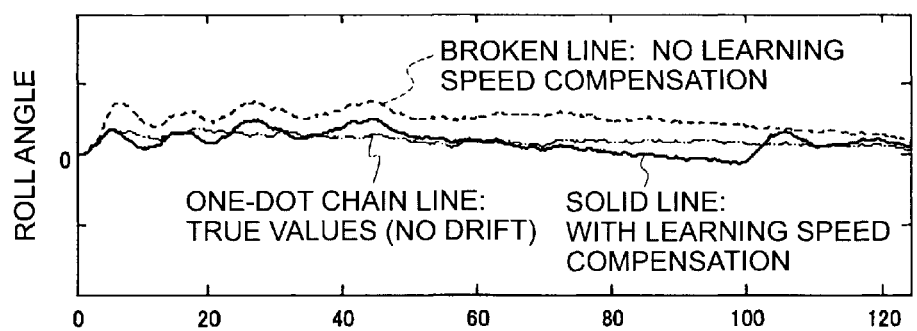
FIG. 20A is a graph showing estimation results of a roll angle when a delay in learning speed of a sensor drift amount is compensated for, in a state in which negative drift is applied to vertical acceleration.
Figure 20B:
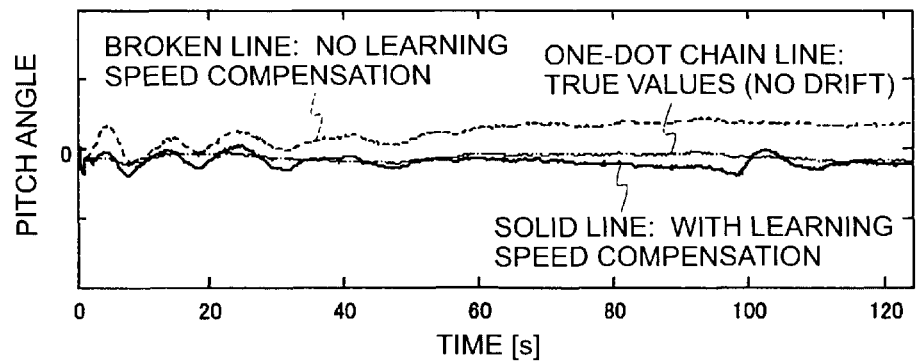
FIG. 20B is a graph showing estimation results of a pitch angle when a delay in learning speed of a sensor drift amount is compensated for, in a state in which negative drift is applied to vertical acceleration.

Further, estimation of attitude angles was carried out in a state in which a drift error of −0.07 G was applied to the sensor signal from the vertical acceleration sensor. As shown in FIG. 20A and FIG. 20B, it can be understood that the accuracy of attitude angle estimation is improved by carrying out correction that compensates for the delay in the learning speed of the sensor drift amount.

Figure 21A:
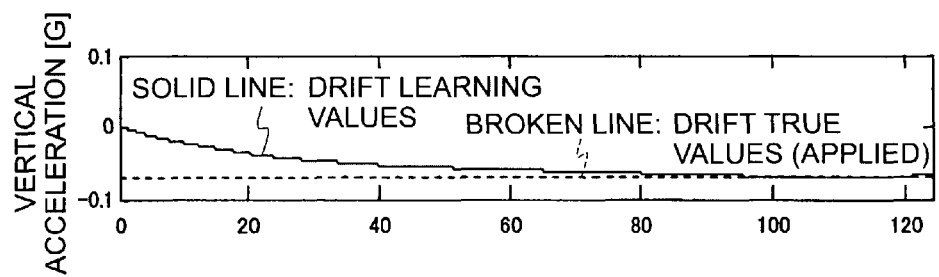
FIG. 21A is a graph showing estimation results of a sensor drift amount of a vertical acceleration sensor in a state in which negative drift is applied to vertical acceleration.
Figure 21B:
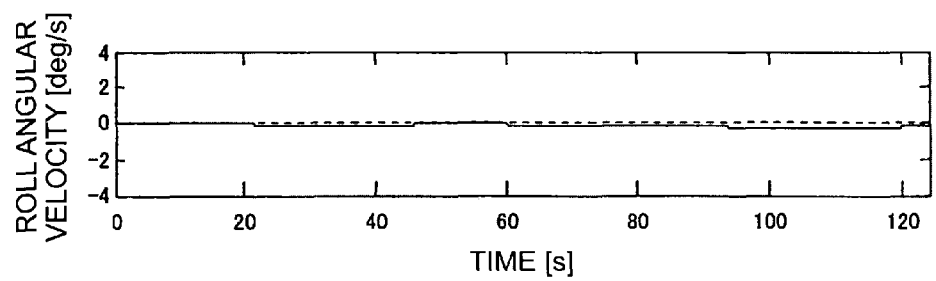
FIG. 21B is a graph showing estimation results of a sensor drift amount of a roll angular velocity sensor in a state in which negative drift is applied to vertical acceleration.

Further, as shown in FIG. 21A, it can be understood that, when a drift error of −0.07 G is applied to the sensor signal from the vertical acceleration sensor, a delay in the learning speed of the sensor drift amount of the vertical acceleration arises. Further, the accuracy of drift estimation also is improved by carrying out correction that compensates for the delay in the learning speed of the sensor drift amount.

As described above, in accordance with the attitude angle-slip angle estimating device relating to the fourth embodiment, even when the learning speeds of the sensor drift amounts of the roll angular velocity and the vertical acceleration are slow, by correcting the respective derivative amounts of the roll angle and the pitch angle in accordance with the amounts of change of the estimated sensor drift amounts, the roll angle and the pitch angle can be estimated accurately. Further, even when the learning speeds of the sensor drift amounts of the longitudinal acceleration and the lateral acceleration are slow, by correcting the respective derivative amounts of the longitudinal velocity and the lateral velocity in accordance with the amounts of change of the estimated sensor drift amounts, the longitudinal velocity and the lateral velocity can be estimated accurately.

Next, a fifth embodiment is described. Note that portions that are structured similarly to the first embodiment and the fourth embodiment are denoted by the same reference numerals and description thereof is omitted.

In the fifth embodiment, the point that a pitch angular velocity sensor is provided, and the point that the sensor drift amount of the pitch angular velocity sensor is estimated, and the point that the derivative amount of a pitch angle, that is corrected in order to compensate for the delay in the learning speed of the sensor drift amount of the pitch angular velocity sensor, is computed at the attitude angle observer, are mainly different from the fourth embodiment.

Figure 22:
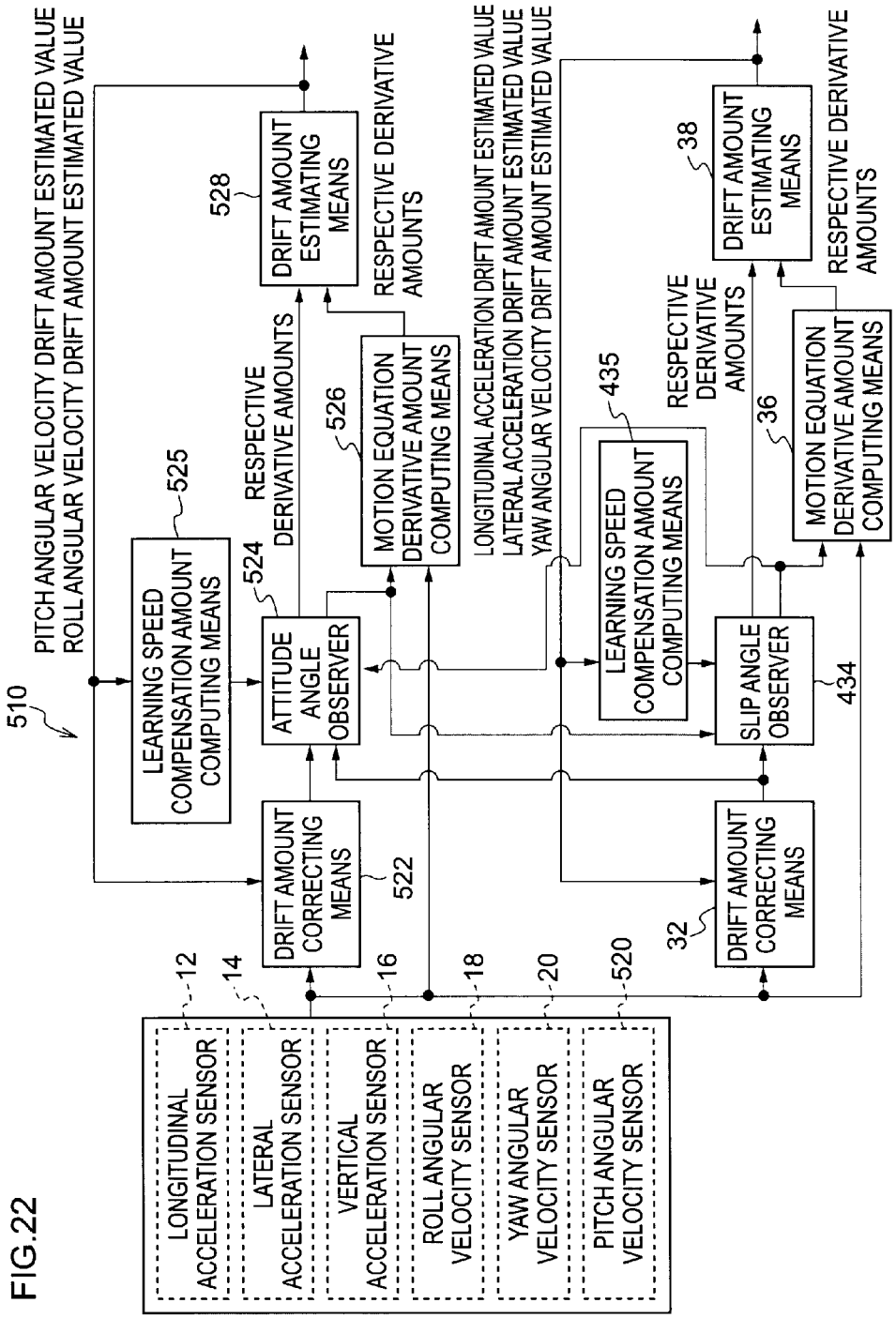
FIG. 22 is a schematic drawing showing the structure of an attitude angle-slip angle estimating device relating to a fifth embodiment of the present invention.

As shown in FIG. 22, an attitude angle-slip angle estimating device 510 relating to the fifth embodiment has the longitudinal acceleration sensor 12, the lateral acceleration sensor 14, the vertical acceleration sensor 16, the roll angular velocity sensor 18, the yaw angular velocity sensor 20, and a pitch angular velocity sensor 520 that detects the pitch angular velocity Q and outputs a sensor signal corresponding to the detected value.

The pitch angular velocity sensor 520 and the roll angular velocity sensor 18 are connected to a drift amount correcting means 522 that corrects the sensor signals from the respective sensors, on the basis of sensor drift amounts that were estimated by a drift amount estimating means 528 that is described below.

The drift amount estimating means 528 is connected to a learning speed compensation amount computing means 525 that computes correction amounts for compensating for the learning speeds of the sensor drift amounts, and to the drift amount correcting means 522.

The drift amount correcting means 522 and the learning speed compensation amount computing means 525 are connected to an attitude angle observer 524 that estimates the roll angle ϕ and the pitch angle θ that are attitude angles with respect to the vertical axis of the vehicle body.

The roll angular velocity sensor 18, the pitch angular velocity sensor 520, the drift amount correcting means 32, and the attitude angle observer 524 are connected to an motion equation derivative amount computing means 526 that computes the respective derivative amounts of the roll angle and the pitch angle obtained from the equations of motion for vehicle motion. Note that the yaw angular velocity whose drift amount is corrected is inputted from the drift amount correcting means 32 to the motion equation derivative amount computing means 526.

The attitude angle observer 524 and the motion equation derivative amount computing means 526 are connected to the drift amount estimating means 528 that estimates the respective sensor drift amounts of the pitch angular velocity sensor 520 and the roll angular velocity sensor 18.

In accordance with above equation (96), the learning speed compensation amount computing means 525 computes the correction amount $P_c$ for correcting the derivative amount of the roll angle so as to compensate for the learning speed, on the basis of the deviation of the sensor drift amount $P_{dr}$ that is estimated by the drift amount estimating means 528 for the sensor signal that corresponds to the detected value of the roll angular velocity, from the preceding estimated value $P_{dr0}$.

Further, in accordance with following equation (102), the learning speed compensation amount computing means 525 computes the correction amount $Q_c$ for correcting the derivative amount of the pitch angle so as to compensate for the delay in the learning speed of the sensor drift amount of the pitch angular velocity sensor 520, on the basis of the deviation of a sensor drift amount $Q_{dr}$, that is estimated by the drift amount estimating means 528 for the sensor signal that corresponds to the detected value of the pitch angular velocity, from the preceding estimated value $Q_{dr0}$.

[Formula 58]

$$Q_c = \begin{cases} Q_{c0} & (Q_{dr} - Q_{dr0} < -Q_{sl}) \\ 0 & (|Q_{dr} - Q_{dr0}| < Q_{sl}) \\ -Q_{c0} & (Q_{dr} - Q_{dr0} > Q_{sl}) \end{cases} \quad (102)$$

Wherein $Q_{s1}$ is a predetermined threshold value relating to the amount of change in the sensor drift amount of the pitch angular velocity sensor 520, and $Q_{c0}$ is a predetermined correction amount. Further, $Q_{s1}$, $Q_{c0}$ are positive values.

In accordance with above equation (102), if, in accordance with the amount of change from the preceding estimated value of the sensor drift amount of the pitch angular velocity sensor 520, the amount of change is negative and the absolute value of the amount of change is greater than or equal to the threshold value, the estimated sensor drift amount is changing in the negative direction. Therefore, the derivative amount of the pitch angle is corrected so as to be increased, in order to compensate for the delay in the learning speed of the negative sensor drift amount. On the other hand, if, in accordance with the amount of change from the preceding estimated value of the sensor drift amount of the pitch angular velocity sensor 520, the amount of change is positive and the absolute value of the amount of change is greater than or equal to the threshold value, the estimated sensor drift amount is changing in the positive direction. Therefore, the derivative amount of the pitch angle is corrected so as to be decreased, in order to compensate for the delay in the learning speed of the positive sensor drift amount. Further, if the absolute value of the amount of change from the preceding estimated value of the sensor drift amount of the pitch angular velocity sensor 520 is less than the threshold value, the estimated sensor drift amount converges, and there is no need to compensate for a delay in the learning speed of the sensor drift amount. Therefore, the derivative amount of the pitch angle is not corrected.

The attitude angle observer 524 computes the derivative amount dφ tilde of the roll angle and the derivative amount dθ tilde of the pitch angle that were corrected in order to compensate for the delay in the learning speed, in accordance with following equation (103) that replaces above equation (24), on the basis of the estimated value $V_{so}$ of the longitudinal vehicle body velocity U estimated at the slip angle observer 434, the corrected signals $G_x-G_{xdr}$, $G_y-G_{ydr}$, $R-R_{dr}$, $Q-Q_{dr}$ that correspond to the respective detected values of the longitudinal acceleration $G_x$, the lateral acceleration $G_y$, the yaw angular velocity R, the roll angular velocity P, and the pitch angular velocity Q that were corrected at the drift amount correcting means 522 and the drift amount correcting means 32, the sensor signal that corresponds to the detected value of the vertical acceleration $G_z$, and the correction amounts $P_c$, $Q_c$ computed by the learning speed compensation amount computing means 525.

[Formula 59]

$$\frac{d}{dt}\tilde{x} = \begin{bmatrix} P - P_{dr} + (Q - Q_{dr})\sin\tilde{\phi}\tan\tilde{\theta} + (R - R_{dr})\cos\tilde{\phi}\tan\tilde{\theta} \\ (Q - Q_{dr})\cos\tilde{\phi} - (R - R_{dr})\sin\tilde{\phi} \\ -\frac{\tilde{g}_{xdf}}{\tau_x} + \frac{g\sin\tilde{\theta}}{\tau_x} \\ -\frac{\tilde{g}_{ydf}}{\tau_y} - \frac{g\cos\tilde{\theta}\sin\tilde{\phi}}{\tau_y} \\ -\frac{\tilde{g}_f}{\tau_g} + \frac{-(G_x - G_{xdr})\sin\tilde{\theta} + (G_y - G_{ydr})\sin\tilde{\phi}\cos\tilde{\theta} + G_z\cos\tilde{\phi}\cos\tilde{\theta}}{\tau_g} \end{bmatrix} +$$

$$\begin{bmatrix} 0 & -K_{\phi y} & K_{\phi g}(G_y - G_{ydr}) \\ K_{\theta x} & 0 & -K_{\theta g}(G_x - G_{xdr}) \\ K_x & 0 & 0 \\ 0 & K_y & 0 \\ 0 & 0 & K_g \end{bmatrix} \cdot \begin{bmatrix} g_{xdf} - \tilde{g}_{xdf} \\ g_{ydf} - \tilde{g}_{ydf} \\ g - \tilde{g}_f \end{bmatrix} + \begin{bmatrix} P_c \\ Q_c \\ 0 \\ 0 \\ 0 \end{bmatrix}$$

wherein $$\tilde{x} = \begin{bmatrix} \tilde{\phi} & \tilde{\theta} & \tilde{g}_{xdf} & \tilde{g}_{ydf} & \tilde{g}_f \end{bmatrix}^T \quad (104)$$

Further, the attitude angle observer 524 integrates the derivative amount of the roll angle and the derivative amount of the pitch angle that were computed in accordance with above equation (103), and estimates the roll angle φ tilde and the pitch angle θ tilde that are attitude angles.

When the equations of motion of the roll angle φ and the pitch angle θ, that are described in above equation (4), equation (5), take the sensor drift amounts into consideration, they are described by following equation (105), equation (106).

[Formula 60]

$$\dot{\phi}=P-P_{dr}+(Q-Q_{dr})\sin\phi\tan\theta+(R-R_{dr})\cos\phi\tan\theta \quad (105)$$

$$\dot{\theta}=(Q-Q_{dr})\cos\phi-(R-R_{dr})\sin\phi \quad (106)$$

Wherein the estimated values of the roll angle φ and the pitch angle θ that were estimated by the attitude angle observer 524 are used as the roll angle φ and the pitch angle θ. Further, the respective tri-axial angular velocities that are the roll angular velocity $P-P_{dr}$, the yaw angular velocity $R-R_{dr}$, and the pitch angular velocity $Q-Q_{dr}$ are signals in which the sensor signals that were detected by the roll angular velocity sensor 18, the yaw angular velocity sensor 20, and the pitch angular velocity sensor 520 have been corrected by the drift amount correcting means 32, 522.

On the basis of following equation (107), equation (108) that ignore the drift amounts of above equation (105), equation (106), the motion equation derivative amount computing means 526 computes derivative amount $d\phi_m$ of φ and derivative amount $d\theta_m$ of the pitch angle θ.

[Formula 61]

$$d\phi_m=P+Q\sin\phi\tan\theta+R\cos\phi\tan\theta \quad (107)$$

$$d\theta_m=Q\cos\phi-R\sin\phi \quad (108)$$

Further, the relationships expressed by following equation (109), equation (110) exist between φ dot of equation (105), θ dot of equation (106), and $d\theta_m$ of equation (107), $d\theta_m$ of equation (108).

[Formula 62]

$$\dot{\phi}=d\phi_m-P_{dr}-Q_{dr}\sin\phi\tan\theta-R_{dr}\phi\tan\theta \quad (109)$$

$$\dot{\theta}=d\theta_m-Q_{dr}\cos\phi+R_{dr}\sin\phi \quad (110)$$

The drift amount estimating means 528 estimates the sensor drift amounts from a comparison of the derivative amounts of the attitude angles computed at the attitude angle observer 524 and the derivative amounts of the attitude angles computed at the motion equation derivative amount computing means 526.

Next, the estimating method of the sensor drift amounts is described.

The relationships expressed by following equation (111), equation (112) are established when it is assumed that predetermined drift errors $G_{xdr}$, $G_{ydr}$, $P_{dr}$, $Q_{dr}$, $R_{dr}$ are superposed on the sensor signals $G_x$, $G_y$, P, Q, R, and further, it is assumed, with regard to the derivative amounts expressed by the right sides of above equation (109), equation (110), that true values are already known by the attitude angle observer 524.

[Formula 63]

$$d\phi=d\phi_m-P_{dr}-Q_{dr}\sin\phi\tan\theta-R_{dr}\cos\phi\tan\theta \quad (111)$$

$$d\theta=d\theta_m-Q_{dr}\cos\phi-R_{dr}\sin\phi \quad (112)$$

Wherein dφ, dθ are the derivative amount of the roll angle, the derivative amount of the pitch angle that serve as observer internally-computed values obtained from above equation (103).

Above equation (111), equation (112) express the relationship that, when the sensor drift amounts of the sensor signals are taken into consideration, the derivative amounts of the roll angle and the pitch angle that are computed by the attitude angle observer 524, and values that consider the sensor drift amounts in the derivative amounts of the roll angle and the pitch angle that are obtained from equations of motion, are equal.

Here, because the coefficient of the yaw angular velocity drift in equation (109), equation (110) is relatively small (when it is assumed that the attitude angle is small) and the effects can be ignored, the term of the yaw angular velocity drift is ignored and equation (109), equation (110) are arranged as per following equation (113).

[Formula 64]

$$dD1 \cdot \begin{bmatrix} P_{dr} \\ Q_{dr} \end{bmatrix} = \begin{bmatrix} dE1 \\ dE2 \end{bmatrix} \quad (113)$$

wherein $$dD1 = \begin{bmatrix} -1 & -\sin\tilde{\phi}\tan\tilde{\theta} \\ 0 & -\cos\tilde{\phi} \end{bmatrix}$$

$$dE1 = d\phi - d\phi_m = d\phi - P - Q\sin\tilde{\phi}\tan\tilde{\theta} - R\cos\tilde{\phi}\tan\tilde{\theta}$$

$$dE2 = d\theta - d\theta_m = d\theta - Q\cos\tilde{\phi} - R\sin\tilde{\phi}$$

The roll angular velocity drift and the pitch angular velocity drift can be determined by following equation (115) that is derived by solving following equation (114) in which the coefficient matrix of the left side and the vector of the right side of equation (113) are integrated over a uniform time period.

[Formula 65]

$$D1 \cdot \begin{bmatrix} P_{dr} \\ Q_{dr} \end{bmatrix} = \begin{bmatrix} E1 \\ E2 \end{bmatrix} \quad (114)$$

wherein $$D1 = \int_{t}^{t+\Delta t} dD1 dt$$

$$E1 = \int_{t}^{t+\Delta t} dE1 dt$$

$$E2 = \int_{t}^{t+\Delta t} dE2 dt$$

[Formula 66]

$$\begin{bmatrix} P_{dr} \\ Q_{dr} \end{bmatrix} = D1^{+} \cdot \begin{bmatrix} E1 \\ E2 \end{bmatrix} \quad (115)$$

In accordance with above equation (115), the drift amount estimating means 528 can estimate the sensor drift amount of the pitch angular velocity sensor 520 and the sensor drift amount of the roll angular velocity sensor 18, on the basis of the respective derivative amounts of the roll angle and the pitch angle computed at the attitude angle observer 524, and the respective derivative amounts of the roll angle and the pitch angle computed at the motion equation derivative amount computing means 526.

Further, at the drift amount estimating means 528 relating to the present embodiment, in order to aim for stabilization of computation, the estimated values of the sensor drift amounts obtained by the results of computation of above equation (115) are smoothed in accordance with following equation (116), equation (117) by using the estimated values of the preceding time.

[Formula 67]

$$\tilde{Q}_{dr}(i+1) = \lambda_1 \cdot \tilde{Q}_{dr}(i) + (1-\lambda_1) \cdot Q_{dr} \quad (116)$$

$$\tilde{P}_{dr}(i+1) = \lambda_1 \cdot \tilde{P}_{dr}(i) + (1-\lambda_1) \cdot P_{dr} \quad (117)$$

Wherein $Q_{dr}$ tilde, $P_{dr}$ tilde are the estimated values of the sensor drift amounts after smoothing, and $\lambda 1$ is a forgetting factor.

Note that, because the other structures and operations of the attitude angle-slip angle estimating device 510 relating to the fifth embodiment are similar to the fourth embodiment, description thereof is omitted.

As described above, in accordance with the attitude angle-slip angle estimating device relating to the fifth embodiment, even if the learning speeds of the sensor drift amounts of the roll angular velocity and the pitch angular velocity are slow, the roll angle and the pitch angle can be estimated accurately by correcting the respective derivative amounts of the roll angle and the pitch angle in accordance with the amounts of change in the estimated sensor drift amounts.

Next, a sixth embodiment is described. Note that portions that are structured similarly to the first embodiment, the second embodiment and the fourth embodiment are denoted by the same reference numerals and description thereof is omitted. The present embodiment applies the present invention to an attitude angle estimating device that estimates the pitch angle and the roll angle.

Figure 23:
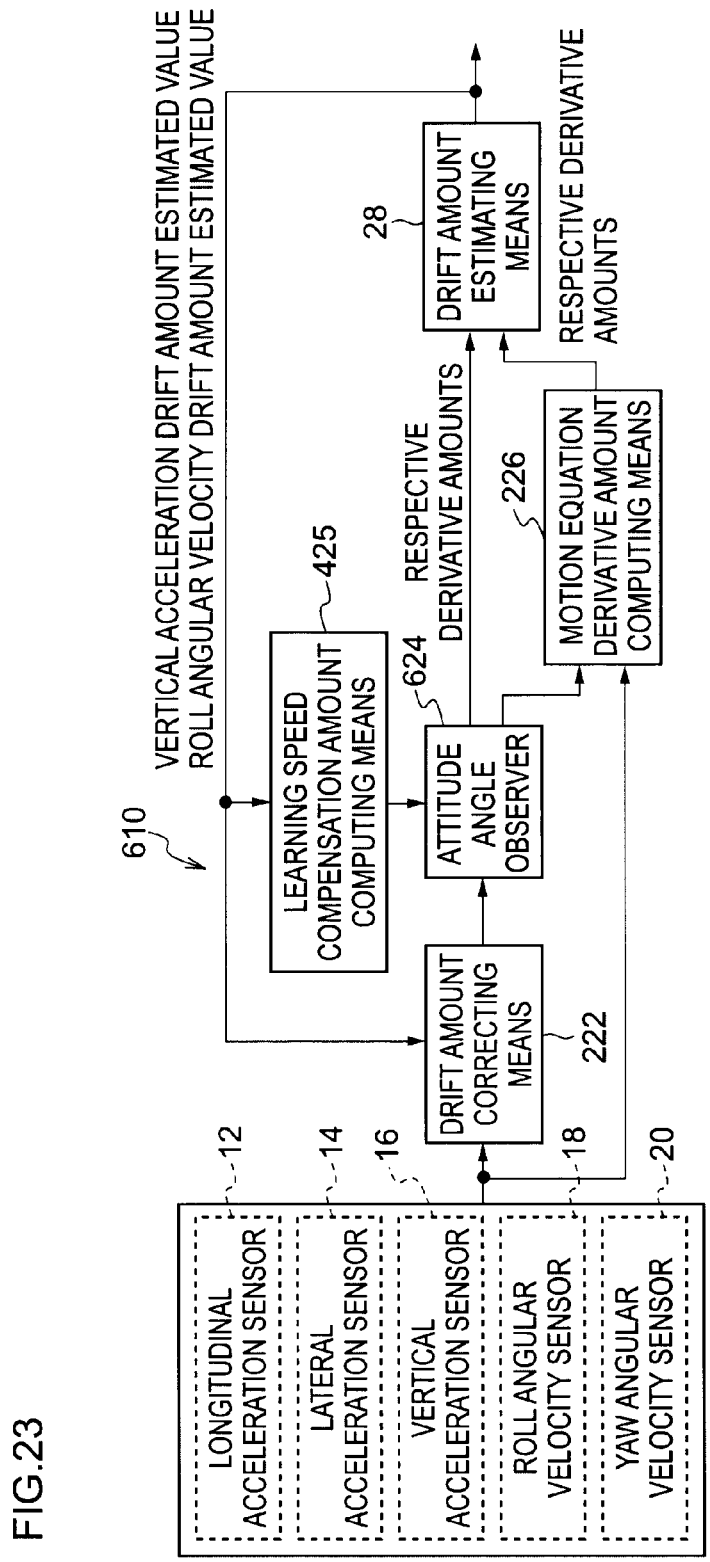
FIG. 23 is a schematic drawing showing the structure of an attitude angle estimating device relating to a sixth embodiment of the present invention.

As shown in FIG. 23, the drift amount estimating means 28 of an attitude angle estimating device 610 relating to the sixth embodiment is connected to the drift amount correcting means 222 and the learning speed compensation amount computing means 425.

The drift amount correcting means 222 and the learning speed compensation amount computing means 425 are connected to an attitude angle observer 624 that estimates the roll angle $\phi$ and the pitch angle $\theta$ that are attitude angles with respect to the vertical axis of the vehicle body.

The vertical acceleration sensor 16, the roll angular velocity sensor 18, the yaw angular velocity sensor 20, and the attitude angle observer 624 are connected to the motion equation derivative amount computing means 226.

The attitude angle observer 624 and the motion equation derivative amount computing means 226 are connected to the drift amount estimating means 28.

The drift amount correcting means 222, the attitude angle observer 624, the learning speed compensation amount computing means 425, the motion equation derivative amount computing means 226, and the drift amount estimating means 28 can be structured by one or plural computers or by one or plural electronic circuits that realize the functions of the respective means.

The attitude angle observer 624 estimates the lateral vehicle body velocity V that is the vehicle speed in the vehicle lateral direction, and, on the basis of the wheel speeds of the respective wheel, estimates the longitudinal vehicle body velocity U that is the vehicle speed in the vehicle longitudinal direction, and further, estimates the pitch angular velocity Q tilde in accordance with above equation (6) on the basis of the estimated value V tilde of the lateral vehicle body velocity, the estimated value U tilde of the longitudinal vehicle body velocity, and the corrected signal $G_z$-$G_{zdr}$ that corresponds to the detected value of the vertical acceleration $G_z$ and the corrected signal $P-P_{dr}$ that corresponds to the detected value of the roll angular velocity P, that were corrected at the drift amount correcting means 222.

Further, the attitude angle observer 624 estimates the roll angle ϕ and the pitch angle θ that are attitude angles with respect to the vertical axis of the vehicle body, by using an equation similar to above equation (100), on the basis of corrected signals $G_z-G_{zdr}$, $P_z-P_{dr}$ that correspond to the respective detected values of the vertical acceleration $G_z$ and the roll angular velocity P of vehicle motion, and the sensor signals corresponding to the respective detected values of the yaw angular velocity R, the longitudinal acceleration $G_x$, and the lateral acceleration $G_y$, and the estimated value $V_{so}$ of the longitudinal vehicle body velocity U, and the estimated value Q tilde of the pitch angular velocity, and the correction amounts Pc, Qc computed by the learning speed compensation amount computing means 425.

Further, the attitude angle observer 624 can compute the roll angle ϕ tilde and the pitch angle θ tilde, by respectively integrating the computed derivative amount dϕ tilde of the roll angle ϕ tilde and derivative amount dθ tilde of the pitch angle θ tilde.

In accordance with above equation (36), equation (37), the motion equation derivative amount computing means 226 computes the derivative amounts of the roll angle ϕ and the pitch angle θ that are obtained from equations of motion for vehicle motion, by using the estimated values of the roll angle ϕ and the pitch angle θ that were estimated by the attitude angle observer 624.

Note that, because the other structures and operations of the attitude angle estimating device 610 are similar to the first embodiment, description thereof is omitted.

As described above, in accordance with the attitude angle estimating device relating to the sixth embodiment, even if the learning speeds of the sensor drift amounts of the roll angular velocity and the vertical acceleration are slow, the roll angle and the pitch angle can be estimated accurately by correcting the respective derivative amounts of the roll angle and the pitch angle in accordance with the amounts of change in the estimated sensor drift amounts.

Next, a seventh embodiment is described. Note that portions that are structured similarly to the first embodiment, the third embodiment and the fourth embodiment are denoted by the same reference numerals and description thereof is omitted. The present embodiment applies the present invention to a slip angle estimating device that estimates the vehicle body slip angle.

In the seventh embodiment, the point that only the vehicle body slip angle is estimated, and the point that the sensor drift amounts of only the longitudinal acceleration sensor, the lateral acceleration sensor, and the yaw angular velocity sensor are estimated, are mainly different from the fourth embodiment.

Figure 24:
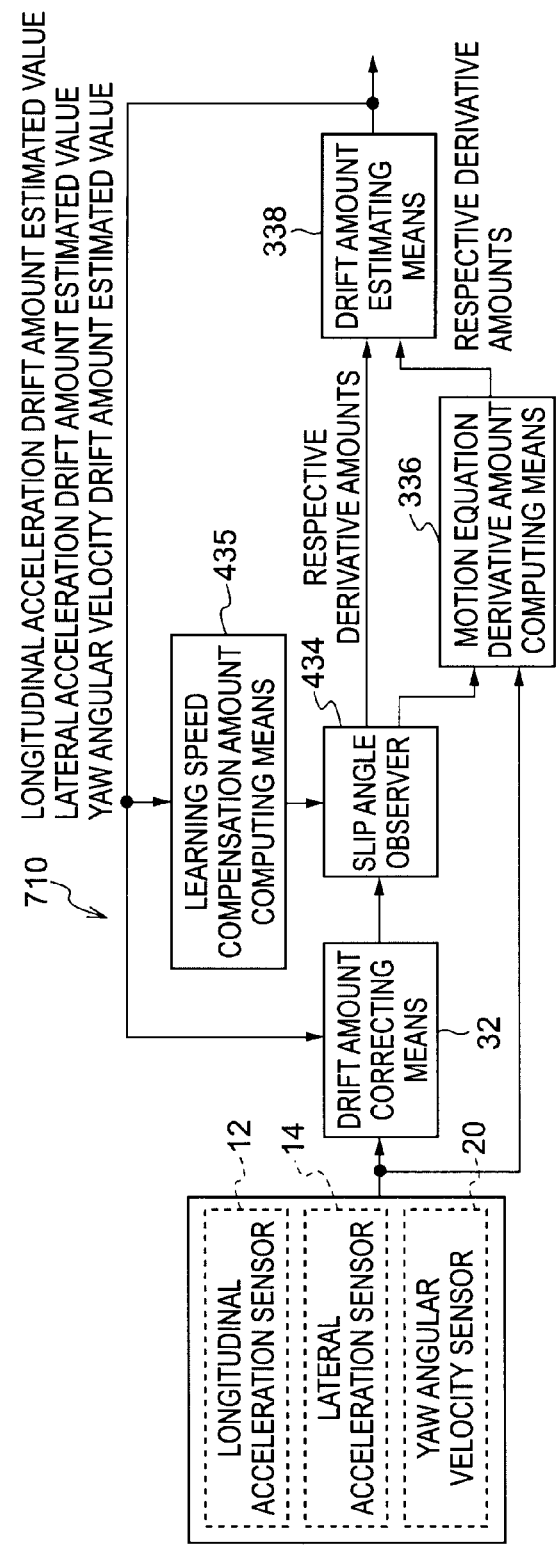
FIG. 24 is a schematic drawing showing the structure of a slip angle estimating device relating to a seventh embodiment of the present invention.

As shown in FIG. 24, a slip angle estimating device 710 relating to the seventh embodiment has the longitudinal acceleration sensor 12, the lateral acceleration sensor 14, and the yaw angular velocity sensor 20.

The longitudinal acceleration sensor 12, the lateral acceleration sensor 14, and the yaw angular velocity sensor 20 are connected to the drift amount correcting means 32. The drift amount correcting means 32 is connected to the drift amount estimating means 338.

The drift amount estimating means 338 is connected to the drift amount correcting means 32 and the learning speed compensation amount computing means 435.

The drift amount correcting means 32 and the learning speed compensation amount computing means 435 are connected to the slip angle observer 434. The longitudinal acceleration sensor 12, the lateral acceleration sensor 14, the yaw angular velocity sensor 20, and the slip angle observer 434 are connected to the motion equation derivative amount computing means 336.

The slip angle observer 434 and the motion equation derivative amount computing means 336 are connected to the drift amount estimating means 338.

The drift amount correcting means 32, the slip angle observer 434, the learning speed compensation amount computing means 435, the motion equation derivative amount computing means 336, and the drift amount estimating means 338 can be structured by one or plural computers or by one or plural electronic circuits that realize the functions of the respective means.

In accordance with above equation (98), the learning speed compensation amount computing means 435 computes the correction amount $G_{xc}$ for correcting the derivative amount of the longitudinal vehicle body velocity so as to compensate for the delay in the learning speed of the sensor drift amount of the longitudinal acceleration sensor 12. Further, in accordance with above equation (99), the learning speed compensation amount computing means 435 computes the correction amount $G_{yc}$ for correcting the derivative amount of the lateral vehicle body velocity so as to compensate for the delay in the learning speed of the sensor drift amount of the lateral acceleration sensor 14.

The slip angle observer 434 estimates the lateral vehicle body velocity V tilde that is the vehicle body velocity in the vehicle lateral direction, and, on the basis of the wheel speeds of the respective wheels, estimates the longitudinal vehicle body velocity U tilde that is the vehicle body velocity in the vehicle longitudinal direction. Further, the slip angle observer 434 computes the derivative amount dU tilde of the longitudinal vehicle body velocity and the derivative amount dV tilde of the lateral vehicle body velocity that were corrected in order to compensate for the delay in the learning speeds, in accordance with above equation (101-5), and under the assumption that the roll angle and the pitch angle are 0, and on the basis of the estimated value V of the lateral vehicle body velocity, the estimated value U of the longitudinal vehicle body velocity, the corrected signals $G_x-G_{xdr}$, $G_y-G_{ydr}$, $R-R_{dr}$, corresponding to the respective detected values of the longitudinal acceleration $G_x$, the lateral acceleration $G_y$, and the yaw angular velocity R of vehicle motion that have been corrected at the drift amount correcting means 32, and the correction amounts $G_{xc}$, $G_{yc}$ that were computed by the learning speed compensation amount computing means 435.

Further, the slip angle observer 434 integrates the computed derivative amount dU tilde of the longitudinal vehicle body velocity and derivative amount dV tilde of the lateral vehicle body velocity, and estimates the longitudinal vehicle body velocity U tilde and the lateral vehicle body velocity V tilde. Further, the slip angle observer 434 estimates the slip angle β tilde on the basis of the estimated longitudinal vehicle body velocity U tilde and lateral vehicle body velocity V tilde.

In accordance with equations in which the drift amounts are ignored in above equation (77), equation (78), the motion equation derivative amount computing means 336 computes the derivative amounts of the longitudinal vehicle body velocity U and the lateral vehicle body velocity V that are obtained from equations of motion for vehicle motion.

In accordance with above equation (92), the drift amount estimating means 338 estimates the sensor drift amount of the longitudinal acceleration sensor 12, the sensor drift amount of the lateral acceleration sensor 14, and the sensor drift amount of the yaw angular velocity sensor 20, on the basis of the respective derivative amounts of the longitudinal vehicle body velocity and the lateral vehicle body velocity computed at the slip angle observer 434 and the respective derivative amounts of the longitudinal vehicle body velocity and the lateral vehicle body velocity computed at the motion equation derivative amount computing means 336.

Further, at the drift amount estimating means 338 relating to the present embodiment, in order to aim for stabilization of computation, the estimated values of the sensor drift amounts obtained by the results of computation of above equation (92) are smoothed in accordance with above equation (93) through equation (95) by using the estimated values of the preceding time.

As described above, in accordance with the slip angle estimating device relating to the seventh embodiment, even if the learning speeds of the sensor drift amounts of the longitudinal acceleration and the lateral acceleration are slow, the longitudinal velocity and the lateral velocity can be estimated accurately by correcting the respective derivative amounts of the longitudinal velocity and the lateral velocity in accordance with the amounts of change in the estimated sensor drift amounts.

Next, an eighth embodiment is described. Note that portions that are structured similarly to the first embodiment and the fifth embodiment are denoted by the same reference numerals and description thereof is omitted.

In the eighth embodiment, the point that a pitch angular velocity sensor is provided, the point that the sensor drift amount of the pitch angular velocity sensor is estimated, and the point that the derivative amount of the pitch angle, that is corrected in order to compensate for the delay in the learning speed of the sensor drift amount of the pitch angular velocity sensor, is computed at the attitude angle observer, are mainly different from the sixth embodiment.

Figure 25:
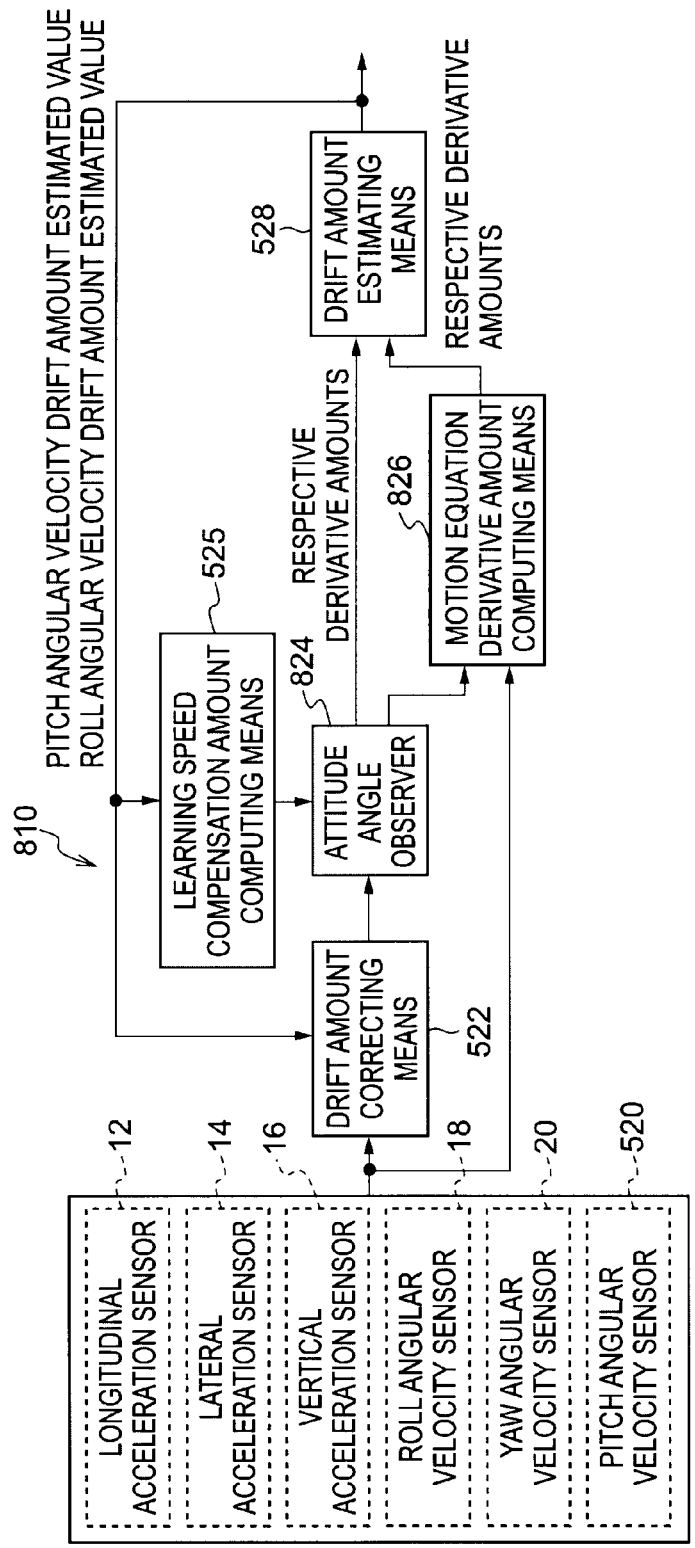
FIG. 25 is a schematic drawing showing the structure of an attitude angle estimating device relating to eighth embodiment of the present invention.

As shown in FIG. 25, an attitude angle estimating device 810 relating to the eighth embodiment has the longitudinal acceleration sensor 12, the lateral acceleration sensor 14, the vertical acceleration sensor 16, the roll angular velocity sensor 18, the yaw angular velocity sensor 20, and the pitch angular velocity sensor 520.

The pitch angular velocity sensor 520 and the roll angular velocity sensor 18 are connected to the drift amount correcting means 522. The drift amount correcting means 522 is connected to the drift amount estimating means 528.

The drift amount estimating means 528 is connected to the learning speed compensation amount computing means 525 and the drift amount correcting means 522.

The drift amount correcting means 522 and the learning speed compensation amount computing means 525 are connected to an attitude angle observer 824 that estimates the roll angle $\phi$ and the pitch angle $\theta$ that are attitude angles with respect to the vertical axis of the vehicle body.

The roll angular velocity sensor 18, the pitch angular velocity sensor 520, the yaw angular velocity sensor 20, and the attitude angle observer 824 are connected to an motion equation derivative amount computing means 826 that computes the respective derivative amounts of the roll angle and the pitch angle obtained from equations of motion for vehicle motion.

The attitude angle observer 824 and the motion equation derivative amount computing means 826 are connected to the drift amount estimating means 528.

In accordance with above equation (96), the learning speed compensation amount computing means 525 computes the correction amount $P_c$ for correcting the derivative amount of the roll angle so as to compensate for the delay in the learning speed of the sensor drift amount of the roll angular velocity sensor 18. In accordance with above equation (102), the learning speed compensation amount computing means 525 computes the correction amount $Q_c$ for correcting the derivative amount of the pitch angle so as to compensate for the delay in the learning speed of the sensor drift amount of the pitch angular velocity sensor 520.

The attitude angle observer 824 computes the derivative amount d$\phi$ tilde of the roll angle and the derivative amount d$\theta$ tilde the pitch angle that are corrected in order to compensate for the delay in learning speeds, in accordance with an equation similar to above equation (103), on the basis of corrected signals $P-P_{dr}$, $Q-Q_{dr}$ that correspond to the respective detected values of the roll angular velocity P and the pitch angular velocity Q that were corrected by the drift amount correcting means 522, and the sensor signals corresponding to the respective detected values of the yaw angular velocity R, the longitudinal acceleration $G_x$, the lateral acceleration $G_y$, and the vertical acceleration $G_z$, and the estimated value $V_{so}$ of the longitudinal vehicle body velocity U, and the correction amounts $P_c$, $Q_c$ that were computed by the learning speed compensation amount computing means 525.

Further, the attitude angle observer 824 computes the roll angle ($\Phi$) tilde and the pitch angle $\theta$ tilde, by respectively integrating the computed derivative amount d$\phi$ tilde of the roll angle and derivative amount d$\theta$ tilde of the pitch angle.

In accordance with above equation (107), equation (108), the motion equation derivative amount computing means 826 computes the derivative amounts of the roll angle and the pitch angle $\theta$ that are obtained from equations of motion for vehicle motion, by using the roll angle $\phi$ and the pitch angle $\theta$ that were estimated by the attitude angle observer 824. At this time, the estimated value $\phi$ tilde of the roll angle and the estimated value $\theta$ tilde of the pitch angle, that were estimated by the attitude angle observer 824, are used as the roll angle $\phi$ and the pitch angle $\theta$. Further, the tri-axial angular velocities that are the roll angular velocity P, the yaw angular velocity R, and the pitch angular velocity Q respectively use the sensor signals detected by the roll angular velocity sensor 18, the yaw angular velocity sensor 20, and the pitch angular velocity sensor 520.

The drift amount estimating means 528 estimates the sensor drift amount of the pitch angular velocity sensor 520 and the sensor drift amount of the roll angular velocity sensor 18, from a comparison of the derivative amounts of the attitude angles computed at the attitude angle observer 824 and the derivative amounts of the attitude angles computed at the motion equation derivative amount computing means 826.

As described above, in accordance with the attitude angle estimating device relating to the eighth embodiment, even if the learning speeds of the sensor drift amounts of the roll angular velocity and the pitch angular velocity are slow, the roll angle and the pitch angle can be estimated accurately by correcting the respective derivative amounts of the roll angle and the pitch angle in accordance with the amounts of change in the estimated sensor drift amounts.

Next, a ninth embodiment is described. Note that portions that are structured similarly to the first embodiment are denoted by the same reference numerals and description thereof is omitted.

In the ninth embodiment, the point that the sensor drift amounts are updated in the direction in which the absolute values of the estimated roll angle and pitch angle become small, is mainly different from the first embodiment.

Figure 26:
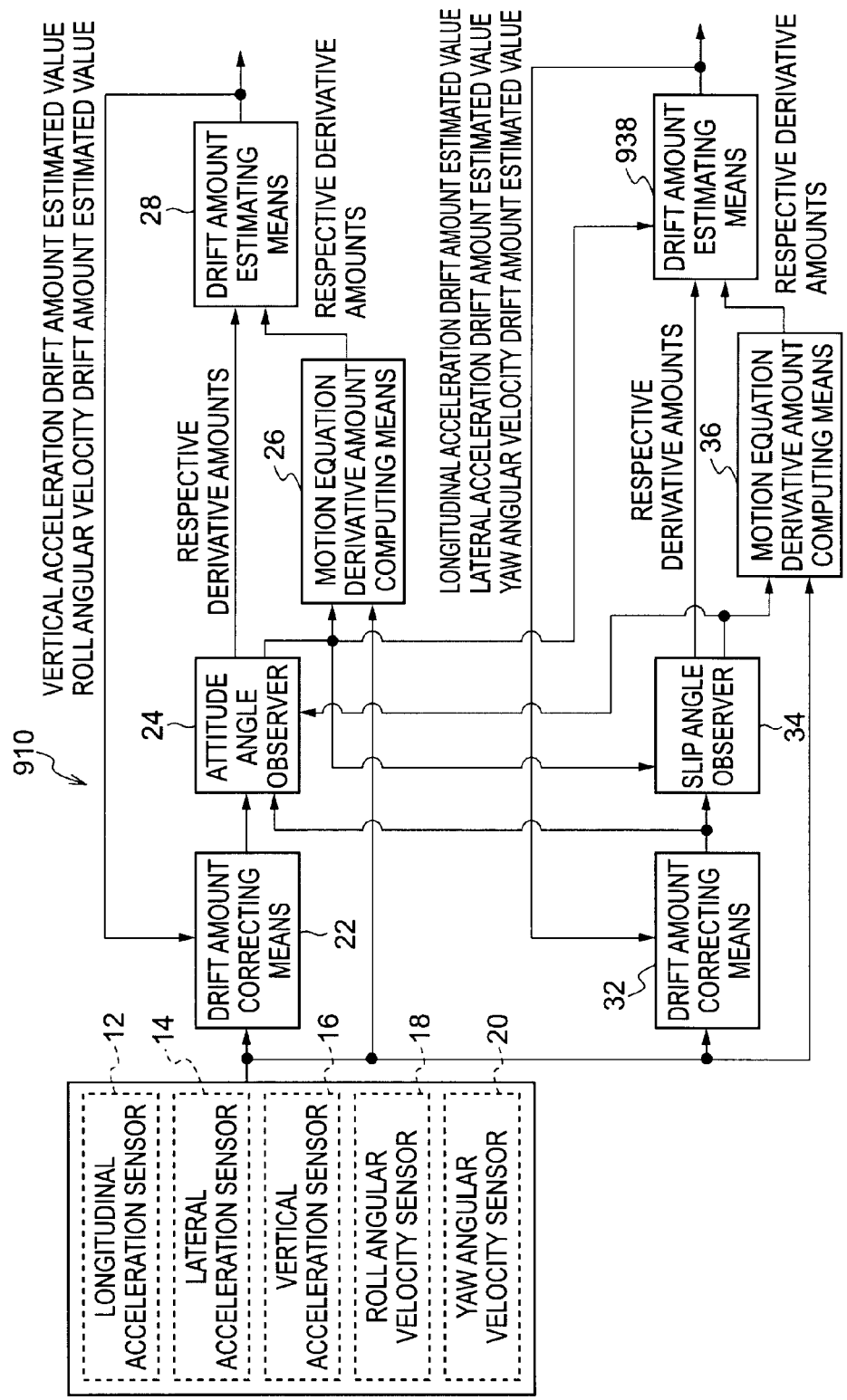
FIG. 26 is a schematic drawing showing the structure of an attitude angle-slip angle estimating device relating to a ninth embodiment of the present invention.

As shown in FIG. 26, in an attitude angle-slip angle estimating device 910 relating to the ninth embodiment, the attitude angle observer 24, the slip angle observer 34, and the motion equation derivative amount computing means 34 are connected to a drift amount estimating means 938. Further, the drift amount estimating means 938 is connected to the drift amount correcting means 32.

Next, the principles of estimating the sensor drift amounts are described.

Assuming that the uniform sensor drift errors $G_{ydr}$, $R_{dr}$ are superposed on the sensor signal Gy of the lateral acceleration and the sensor signal R of the yaw angular velocity, the equation of motion of the lateral direction is expressed by above equation (33). Further, the derivative amount of the lateral velocity obtained from the equations of motion is expressed by above equation (41).

Assuming that the derivative amount of the lateral velocity of the left side of above equation (33) coincides with dV that is an internally-computed value of the observer, following equation (118) is obtained.

[Formula 68]

$$dV - dV_m = -G_{ydr} R_{dr} U \qquad (118)$$

In the above embodiment, the sensor drift amount is computed from the difference between the derivative amount of the observer, in which the effect of the sensor drift is small, and the derivative amount of the equations of motion, that include the effect of the sensor drift. Namely, the uniform drift errors $G_{ydr}$, $R_{dr}$ that are superposed on the sensor signals $G_y$, R can be estimated and computed on the basis of above equation (118).

By the way, when an error A is included in the estimated value of the roll angle, above equation (41) is expressed by following equation (119).

[Formula 69]

$$dV_m = G_y - R \cdot U - g\cos\theta\sin(\phi + \Delta\phi) \cong \qquad (119)$$
$$G_y - R \cdot U - g\cos\theta\sin\phi - g\cos\theta\cos\phi \cdot \Delta\phi$$

In accordance with above equation (119), above equation (118) can be described by the approximate expression expressed by following equation (120).

[Formula 70]

$$dV - dV_m \cong -G_{ydr} + R_{dr} U + g\cos\theta\cos\phi \cdot \Delta\phi \qquad (120)$$

Above equation (120) means that the estimated error of the roll angle affects the drift error estimation.

Further, assuming that the uniform sensor drift errors $G_{xdr}$, $R_{dr}$ are superposed on the sensor signal $G_x$ of the longitudinal acceleration and the sensor signal R of the yaw angular velocity, the equation of motion of the longitudinal direction is expressed by above equation (32). Here, the derivative amount of the longitudinal velocity obtained from the equations of motion is expressed by following equation (121).

[Formula 71]

$$dU_m = (R - R_{dr})V + g\sin\theta + G_x \qquad (121)$$

Note that, in above equation (121), it is assumed that the drift error of the yaw angular velocity is already estimated on the basis of above equation (118). At this time, assuming that the derivative amount of the longitudinal velocity of the left side of above equation (32) coincides with dU that is an internally-computed value of the observer, following equation (122) is obtained.

[Formula 72]

$$dU - dU_m = -G_{dr} \qquad (122)$$

On the basis of above equation (122), the uniform drift error $G_{xdr}$ that is superposed on the sensor signal $G_x$ can be estimated and computed. By the way, when $\Delta\theta$ is included in the pitch angle estimated value, above equation (121) is expressed by following equation (123).

[Formula 73]

$$dU_m = (R - R_{dr})V + g\sin(\theta + \Delta\theta) + G_x \cong \qquad (123)$$
$$(R - R_{dr})V + g\sin\theta + g\cos\theta \cdot \Delta\theta + G_x$$

In accordance with above equation (123), above equation (122) can be described by the approximate expression expressed by following equation (124).

[Formula 74]

$$dU - dU_m \cong -G_{xdr} - g\cos\theta \cdot \Delta\theta \qquad (124)$$

Above equation (124) means that the estimated error of the pitch angle affects drift error estimation.

Further, because an increase in the estimated value of the attitude angle affects the stability of the observer, it is preferable that, if either, the value be estimated small. Therefore, in the present embodiment, in order to suppress an increase in the attitude angle estimated value in a state of equilibrium between the translational acceleration and the attitude angle, when updating the drift error learning values of the translational acceleration (the longitudinal acceleration and the lateral acceleration) and the yaw angular velocity, the learning values of the drift errors are updated only when the drift error learning values are changed in the direction of decreasing the absolute value of the estimated value of the attitude angle.

Namely, an estimated value $G_{ydr}(i+1)$ tilde of the drift error of the lateral acceleration is computed in accordance with following equation (125), from the estimated value $\phi$ of the roll angle by the attitude angle observer 24 and the preceding value $G_{ydr}(i)$ tilde of the drift error learning value and the newly computed value $G_{ydr}$.

[Formula 75]

$$\tilde{G}_{ydr}(i+1) = \begin{cases} \lambda \cdot \tilde{G}_{ydr}(i) + (1-\lambda) \cdot G_{ydr} & (\phi \cdot (G_{ydr} - \tilde{G}_{ydr}(i)) > 0) \\ \tilde{G}_{ydr}(i) & (\phi \cdot (G_{ydr} - \tilde{G}_{ydr}(i)) \leq 0) \end{cases} \qquad (125)$$

Here, $\lambda$ is a forgetting factor that is introduced in order to smooth the estimated value. As shown in above equation (125), when the estimated value $\phi$ of the roll angle is positive, if the estimated value $G_{ydr}$ of the drift error that is newly computed is larger than the preceding value $G_{ydr}(i)$ tilde, the absolute value of the estimated value of the roll angle can be made to be small by updating the drift error, and therefore, the drift error learning value is updated. Further, when the estimated value $\phi$ of the roll angle is negative, if the estimated value $G_{ydr}$ of the drift error that is newly computed is smaller than the preceding value $G_{ydr}(i)$ tilde, the absolute value of the estimated value of the roll angle can be made to be small by updating the drift error, and therefore, the drift error learning value is updated.

Similarly, a drift error estimated value $R_{dr}(i+1)$ tilde of the yaw angular velocity is computed in accordance with following equation (126), from the roll angle estimated value $\phi$ by the attitude angle observer 24 and the preceding value $R_{dr}(i)$ tilde of the drift error learning value and the newly computed value $R_{dr}$.

[Formula 76]

$$\tilde{R}_{dr}(i+1) = \begin{cases} \lambda \cdot \tilde{R}_{dr}(i) + (1-\lambda) \cdot R_{dr} & (\phi \cdot (R_{dr} - \tilde{R}_{dr}(i)) < 0) \\ \tilde{R}_{dr}(i) & (\phi \cdot (R_{dr} - \tilde{R}_{dr}(i)) \geq 0) \end{cases} \quad (126)$$

As shown in above equation (126), when the estimated value $\phi$ of the roll angle is positive, if the estimated value $R_{dr}$ of the drift error that is newly computed is smaller than the preceding value $R_{dr}(i)$ tilde, the absolute value of the estimated value of the roll angle can be made to be small by updating the drift error, and therefore, the drift error learning value is updated. Further, when the estimated value $\phi$ of the roll angle is negative, if the estimated value $R_{dr}$ of the drift error that is newly computed is larger than the preceding value $R_{dr}(i)$ tilde, the absolute value of the estimated value of the roll angle can be made to be small by updating the drift error, and therefore, the drift error learning value is updated.

Further, a drift error estimated value $G_{xdr}(i+1)$ tilde of the longitudinal acceleration is computed in accordance with following equation (127), from the pitch angle estimated value $\theta$ by the attitude angle observer 24 and the preceding value $G_{xdr}(i)$ tilde of the drift error learning value and the newly computed value $G_{xdr}$.

[Formula 77]

$$\tilde{G}_{xdr}(i+1) = \begin{cases} \lambda \cdot \tilde{G}_{xdr}(i) + (1-\lambda) \cdot G_{xdr} & (\phi \cdot (G_{xdr} - \tilde{G}_{xdr}(i)) < 0) \\ \tilde{G}_{xdr}(i) & (\phi \cdot (G_{xdr} - \tilde{G}_{xdr}(i)) \geq 0) \end{cases} \quad (127)$$

As shown in above equation (127), when the estimated value $\theta$ of the pitch angle is positive, if the estimated value $G_{xdr}$ of the drift error that is newly computed is smaller than the preceding value $G_{xdr}(i)$ tilde, the absolute value of the estimated value of the pitch angle can be made to be small by updating the drift error, and therefore, the drift error learning value is updated. Further, when the estimated value $\theta$ of the pitch angle is negative, if the estimated value $G_{xdr}$ of the drift error that is newly computed is greater than the preceding value $G_{xdr}(i)$ tilde, the absolute value of the estimated value of the pitch angle can be made to be small by updating the drift error, and therefore, the drift error learning value is updated.

In accordance with above equation (73), the drift amount estimating means 938 estimates the sensor drift amount of the longitudinal acceleration sensor 12, the sensor drift amount of the lateral acceleration sensor 14, and the sensor drift amount of the yaw angular velocity sensor 20, on the basis of the respective derivative amounts of the longitudinal vehicle body velocity and the lateral vehicle body velocity computed at the slip angle observer 34, and the respective derivative amounts of the longitudinal vehicle body velocity and the lateral vehicle body velocity computed at the motion equation derivative amount computing means 36.

Further, the drift amount estimating means 938 updates the sensor drift amount of the longitudinal acceleration sensor 12, the sensor drift amount of the lateral acceleration sensor 14, and the sensor drift amount of the yaw angular velocity sensor 20, in accordance with above equation (125) through equation (127), by using the estimated values of the sensor drift amounts obtained by the results of computation of above equation (73).

In the above ninth embodiment, information processing by a program, that causes a computer to function as the respective means that are the drift amount correcting means 22, the attitude angle observer 24, the motion equation derivative amount computing means 26, and the drift amount estimating means 28, can be realized by the attitude angle estimating processing routine shown in the flowchart of above FIG. 3.

Figure 27:
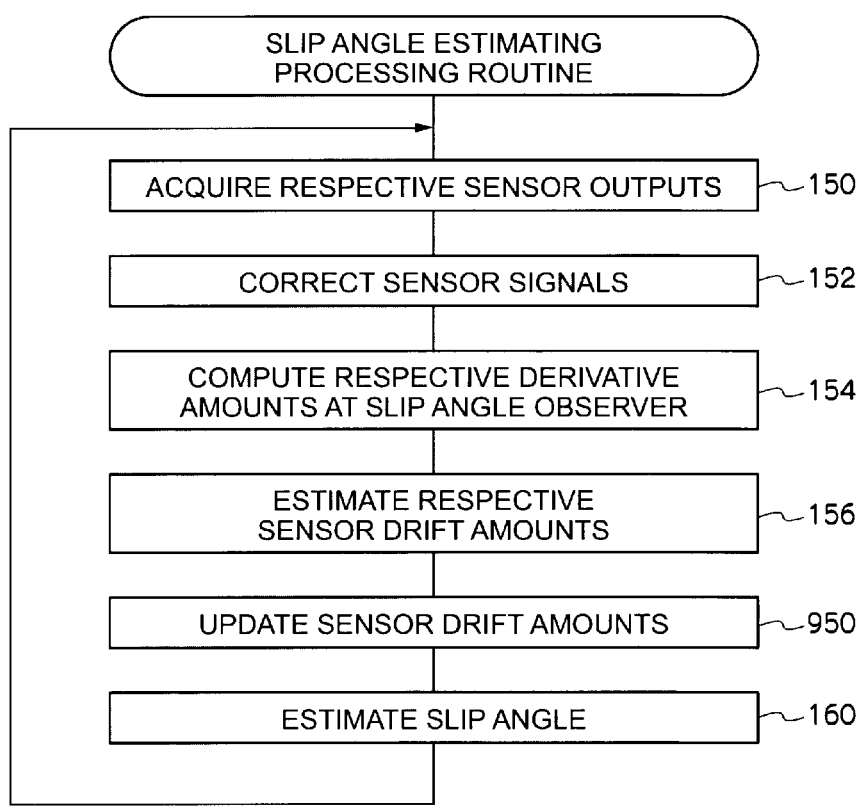
FIG. 27 is a flowchart showing the contents of a slip angle estimating processing routine in the attitude angle-slip angle estimating device relating to the ninth embodiment of the present invention.

Further, information processing by a program, that causes a computer to function as the respective means that are the drift amount correcting means 32, the slip angle observer 34, the motion equation derivative amount computing means 36, and the drift amount estimating means 938, can be realized by the slip angle estimating processing routine that is shown in the flowchart of FIG. 27.

This slip angle estimating processing routine is described hereinafter. Note that processings that are similar to the first embodiment are denoted by the same reference numerals, and detailed description thereof is omitted.

First, in step 150, sensor signals corresponding to respective detected values are acquired from the longitudinal acceleration sensor 12, the lateral acceleration sensor 14, and the yaw angular velocity sensor 20. Then, in step 152, the sensor signals, that were outputted respectively from the longitudinal acceleration sensor 12, the lateral acceleration sensor 14, and the yaw angular velocity sensor 20 and that were acquired in above step 150, are corrected by using the sensor drift amount of the longitudinal acceleration sensor 12, the sensor drift amount of the lateral acceleration sensor 14 and the sensor drift amount of the yaw angular velocity sensor 20 that were obtained one computation cycle before in step 950 that is described below.

Then, in step 154, the respective derivative amounts of the longitudinal vehicle body velocity and the lateral vehicle body velocity, that are computed in order to estimate the longitudinal vehicle body velocity and the lateral vehicle body velocity, are computed as described above by using the attitude angle estimated values that were obtained one computation cycle before in above step 110 and the vehicle body velocity estimated values that were obtained one computation cycle before in step 160 that is described below.

Then, in step 156, the sensor drift amount of the longitudinal acceleration sensor 12, the sensor drift amount of the lateral acceleration sensor 14, and the sensor drift amount of the yaw angular velocity sensor 20 are estimated by using the attitude angle estimated values that were obtained one computation cycle before in above step 110 and the vehicle body velocity estimated values that were obtained one computation cycle before in step 160 that is described below.

In next step 950, for the respective sensor drift amounts of the longitudinal acceleration sensor 12, the lateral acceleration sensor 14, and the yaw angular velocity sensor 20, only when the absolute values of the attitude angle estimated values become small by updating, the estimated values of these sensor drift amounts are updated by using the attitude angle estimated values that were obtained one computation cycle before in above step 110, and the sensor drift amount of the longitudinal acceleration sensor 12, the sensor drift amount of the lateral acceleration sensor 14, and the sensor drift amount of the yaw angular velocity sensor 20 that were estimated in above step 156.

In next step 160, by integrating the respective derivative amounts of the longitudinal vehicle body velocity and the lateral vehicle body velocity that were computed in above step 154, the longitudinal vehicle body velocity and the lateral vehicle body velocity are estimated, and, on the basis of the estimated longitudinal vehicle body velocity and lateral vehicle body velocity, the vehicle body slip angle is estimated and outputted, and the routine returns to above step 150.

Next, estimation results of the attitude angles by using the sensor drift amount estimating method of the present embodiment are described. Note that, in order to confirm the effects of the sensor drift amount estimating method, a positive drift error was applied to the sensor signal of the lateral acceleration, and estimation of the attitude angles using the estimated value of the sensor drift amount was carried out. In this case, estimation results such as shown in FIG. 28A, FIG. 28B were obtained. It was understood that an increase in the roll angle estimated value was suppressed, and, as a result, estimation that gradually neared the true values (no drift) could be realized.

As described above, in accordance with the attitude angle-slip angle estimating device relating to the ninth embodiment, by updating the sensor drift amounts of the longitudinal acceleration, the lateral acceleration, and the yaw angular velocity such that the absolute values of the estimated values of the roll angle and the pitch angle become small, an increase in the absolute values of the estimated values of the roll angle and the pitch angle can be suppressed, and the attitude angles can be estimated more accurately.

Note that the above embodiment describes, as an example, a case in which the respective sensor drift amounts of the longitudinal acceleration, the lateral acceleration, and the yaw angular velocity are updated only when the absolute values of the attitude angle estimated values become small by updating, but the present invention is not limited to the same. At least one of the sensor drift amounts of the longitudinal acceleration, the lateral acceleration, and the yaw angular velocity may be updated only when the absolute values of the attitude angle estimated values become small by updating, and the other sensor drift amounts may be updated unconditionally.

Next, a tenth embodiment is described. Note that portions that are structured similarly to the first embodiment are denoted by the same reference numerals and description thereof is omitted. The present embodiment applies the present invention to a lateral velocity estimating device that estimates the vehicle body lateral velocity.

In the tenth embodiment, the point that the vehicle body lateral velocity is estimated, and the point that the sensor drift amounts of the lateral acceleration sensor and the yaw angular velocity sensor are estimated, are mainly different from the first embodiment.

Figure 29:
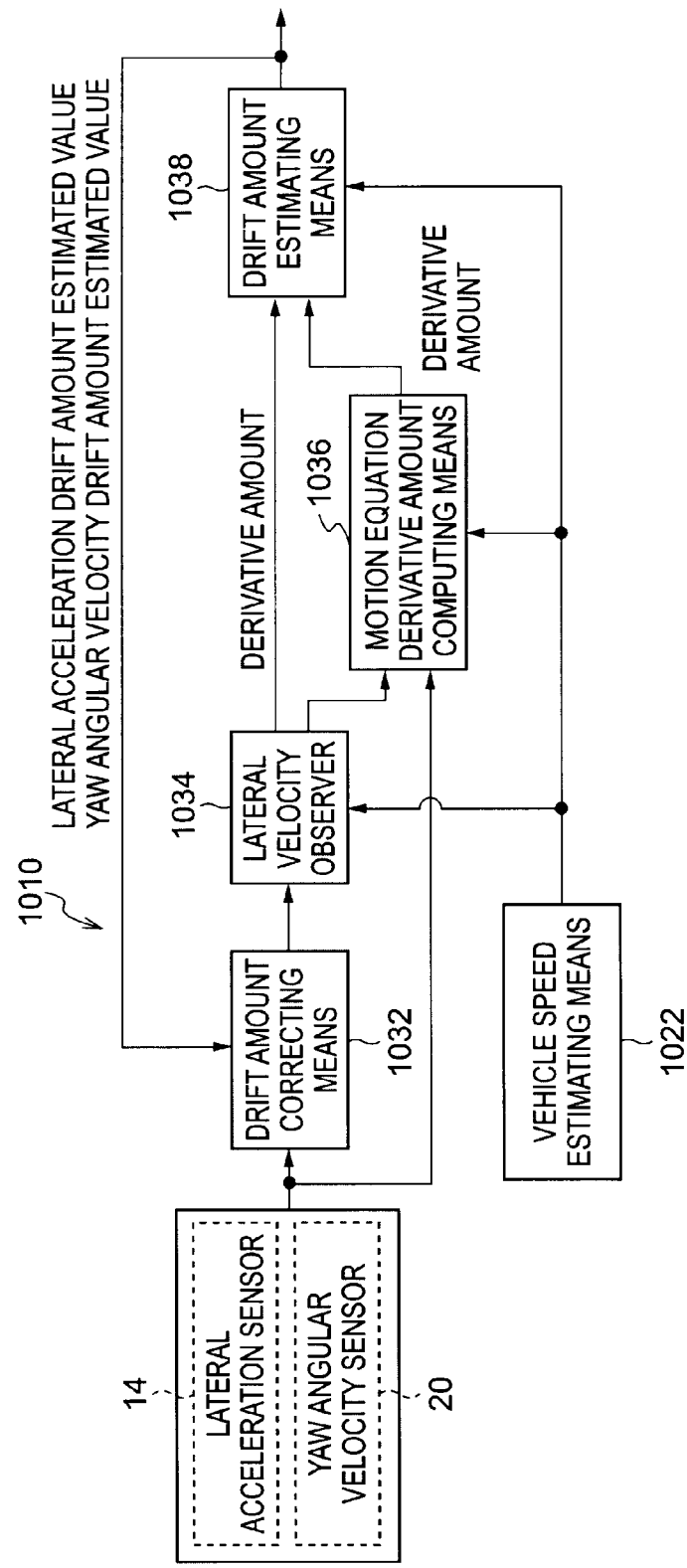
FIG. 29 is a schematic drawing showing the structure of a lateral velocity estimating device relating to a tenth embodiment of the present invention.

As shown in FIG. 29, a lateral velocity estimating device 1010 relating to the tenth embodiment has the lateral acceleration sensor 14, the yaw angular velocity sensor 20, and a vehicle speed estimating means 1022 that estimates the vehicle speed that is the vehicle body velocity in the vehicle longitudinal direction on the basis of the wheel speeds of the respective wheels.

The lateral acceleration sensor 14 and the yaw angular velocity sensor 20 are connected to a drift amount correcting means 1032 that corrects the respective sensor signals from the lateral acceleration sensor 14 and the yaw angular velocity sensor 20, on the basis of the respective sensor drift amounts of the lateral acceleration sensor 14 and the yaw angular velocity sensor 20 that were estimated by a drift amount estimating means 1038 that is described below. The drift amount correcting means 1032 is connected to the drift amount estimating means 1038.

The drift amount correcting means 1032 and the vehicle speed estimating means 1022 are connected to a lateral velocity observer 1034 that estimates the vehicle body lateral velocity. The lateral acceleration sensor 14, the yaw angular velocity sensor 20, the vehicle speed estimating means 1022, and the lateral velocity observer 1034 are connected to an motion equation derivative amount computing means 1036 that computes the derivative amount of the vehicle body lateral velocity obtained from the equations of motion for vehicle motion.

The vehicle speed estimating means 1022, the lateral velocity observer 1034, and the motion equation derivative amount computing means 1036 are connected to the drift amount estimating means 1038 that estimates the respective sensor drift amounts of the lateral acceleration sensor 14 and the yaw angular velocity sensor 20.

The vehicle speed estimating means 1022, the drift amount correcting means 1032, the lateral velocity observer 1034, the motion equation derivative amount computing means 1036, and the drift amount estimating means 1038 can be structured by one or plural computers or by one or plural electronic circuits that realize the functions of the respective means.

The lateral velocity observer 1034 computes the derivative amount of the vehicle body lateral velocity in accordance with an equation that is similar to the equation for determining the vehicle body lateral velocity in above equation (29-5), on the basis of the sensor signal ($G_y - G_{ydr}$) of the lateral acceleration sensor 14 and the sensor signal ($R - R_{dr}$) of the yaw angular velocity sensor 20 that were corrected by the drift amount correcting means 1032, and the vehicle speed $V_{so}$ estimated by the vehicle speed estimating means 1022. The lateral velocity observer 1034 integrates the computed derivative amount of the vehicle body lateral velocity, and computes an estimated value of the vehicle body lateral velocity.

Next, the method of estimating the sensor drift amounts of the lateral acceleration sensor 14 and the yaw angular velocity sensor 20 is described.

Figure 30A:
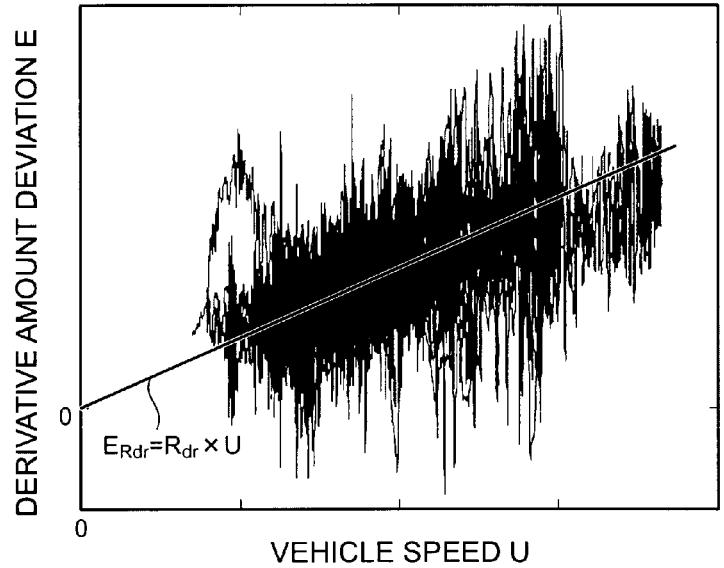
FIG. 30A is a graph showing the relationship between vehicle speed and deviation of a derivative amount of lateral velocity when a drift error is applied to yaw angular velocity.

First, the relationship between deviation E, between the derivative amount of the vehicle body lateral velocity computed by the lateral velocity observer and the derivative amount of the vehicle body lateral velocity computed from the equations of motion, and the vehicle speed U when a zero point drift error was applied to the data of the yaw angular velocity of the time of traveling on a mountainous circuit road, is shown in FIG. 30A. Note that, at the lateral velocity observer, estimation computation is carried out with the zero point drift error of the yaw angular velocity being already known. Further, the deviation E between the derivative amount of the vehicle body lateral velocity of the lateral velocity observer and the derivative amount of the vehicle body lateral velocity of the equations of motion is computed by following equation (128).

[Formula 78]

$$E = dV - dV_m \quad (128)$$

wherein $$dV_m = G_y - R \cdot U - g \cos\theta \sin\phi$$

dV is the derivative amount of the vehicle body lateral velocity computed by the lateral velocity observer 1034 (an internally-computed value of the estimation algorithm), and $dV_m$ is the derivative amount of the vehicle body lateral velocity computed by the equations of motion. $G_y$ is the value detected by the lateral acceleration sensor 14, and R is the value detected by the yaw angular velocity sensor 20. U is the estimated vehicle speed, g is gravitational acceleration, θ is the estimated value of the pitch angle, and ϕ is the estimated value of the roll angle.

The characteristic of deviation $E_{Rdr}$, between the derivative amount of the vehicle body lateral velocity of the lateral velocity observer and the derivative amount of the vehicle body lateral velocity computed by the equations of motion, with respect to the applied drift sensor amount $R_{dr}$ of the yaw angular velocity, is expressed by following equation (129).

[Formula 79]

$$E_{Rdr} = R_{dr} \cdot U \quad (129)$$

In above FIG. 30A, the characteristic expressed by above equation (129) is illustrated by the black solid line. From above FIG. 30A, it can be understood that, although noise is superposed on the value of the deviation E, there becomes a characteristic that runs along above equation (129) that expresses that the deviation E is proportional to the vehicle speed U.

Figure 30B:
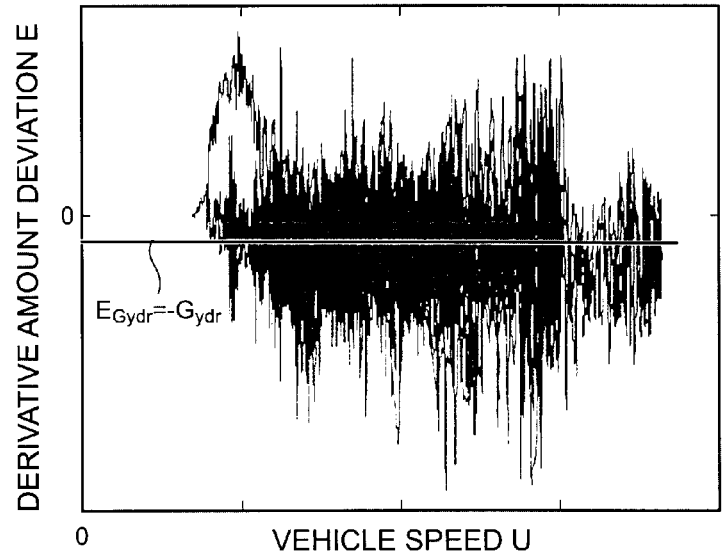
FIG. 30B is a graph showing the relationship between vehicle speed and deviation of a derivative amount of lateral velocity when a drift error is applied to lateral acceleration.

Further, the relationship between the deviation E, between the derivative amount of the vehicle body lateral velocity of the lateral velocity observer and the derivative amount of the vehicle body lateral velocity computed by the equations of motion, and the vehicle speed U when a zero point drift error was applied to the lateral acceleration of the time of traveling on a mountainous circuit road, is shown in FIG. 30B.

The characteristic of deviation $E_{Gydr}$, between the derivative amount of the vehicle body lateral velocity of the lateral velocity observer and the derivative amount of the vehicle body lateral velocity of the equations of motion, with respect to the applied sensor drift amount $G_{ydr}$ of the lateral acceleration, is expressed by following equation (130).

[Formula 80]

$$E_{Gydr} = -G_{ydr} \quad (130)$$

In above FIG. 30B, the characteristic expressed by above equation (130) is illustrated by the black solid line. From above FIG. 30B, it can be understood that, although noise is superposed on the deviation E, there becomes a characteristic that runs along above equation (130) that expresses that the deviation E does not depend on the vehicle speed U.

From the relationship between the vehicle speed U and the deviation E after noise removal, it can be thought that the drift error of the lateral acceleration sensor, whose effects on the deviation E do not depend on the vehicle speed U, and the drift amount of the yaw angular velocity sensor, whose effects on the deviation E are proportional to the vehicle speed U, can be separated by removing the noise component of the deviation E (the intercept of vehicle speed 0 corresponds to $-G_{ydr}$, and the slope corresponds to $R_{dr}$).

Thus, in the present embodiment, the sensor drift amounts are estimated as described hereinafter.

First, assuming that the uniform drift errors $G_{ydr}$, $R_{dr}$ are superposed on the sensor signals $G_y$, R of the lateral acceleration sensor 14 and the yaw angular velocity sensor 20, the equation of motion of the lateral direction is expressed by above equation (33). Further, the derivative amount of the vehicle body lateral velocity obtained from the equations of motion is expressed by above equation (41).

Assuming that the derivative amount of the vehicle body lateral velocity of the left side of above equation (33) coincides with dV that is an internally-computed value of the observer, following equation (131) is obtained.

[Formula 81]

$$dV = dV_m - G_{ydr} + R_{dr} U \quad (131)$$

Further, from above equation (131), it is described as following equation (132).

[Formula 82]

$$D \cdot \begin{bmatrix} G_{ydr}/G_{ydr\,max} \\ R_{dr}/R_{dr\,max} \end{bmatrix} = E \quad (132)$$

wherein $$D = \lfloor -G_{ydr\,max} \quad U \cdot R_{dr\,max} \rfloor \quad (133)$$

$$E = dV - dV_m = dV + R \cdot U + g\cos\theta\sin\phi - G_y \quad (134)$$

Note that $G_{ydrmax}$, $R_{drmax}$ express the upper limit values of the sensor drift amounts of the lateral acceleration sensor 14 and the yaw angular velocity sensor 20, respectively. Here, in order to aim for noise removal, the respective values (sensor values, estimated values) in above equation (132) use average values of a uniform time section.

By solving above equation (132), following equation (135) can be derived, and, in accordance with following equation (135), the drift errors are estimated.

[Formula 83]

$$\begin{bmatrix} G_{ydr} \\ R_{dr} \end{bmatrix} = \begin{bmatrix} G_{ydr\,max} & 0 \\ 0 & R_{dr\,max} \end{bmatrix} D^+ \cdot E \quad (135)$$

Note that $D^+$ is the pseudo inverse matrix of matrix D. Here, in order to aim for stabilization of computation and to suppress an increase in the attitude angle estimated values, with respect to the results of computation of above equation (135), the sensor drift amounts are smoothed as shown in following equation (136), equation (137) by using the preceding values and the attitude angle estimated values.

[Formula 84]

$$\tilde{G}_{ydr}(i+1) = \begin{cases} \lambda \cdot \tilde{G}_{ydr}(i) + (1-\lambda) \cdot G_{ydr} & (\phi \cdot (G_{ydr} - \tilde{G}_{ydr}(i)) > 0) \\ \tilde{G}_{ydr}(i) & (\phi \cdot (G_{ydr} - \tilde{G}_{ydr}(i)) \le 0) \end{cases} \quad (136)$$

$$\tilde{R}_{dr}(i+1) = \begin{cases} \lambda \cdot \tilde{R}_{dr}(i) + (1-\lambda) \cdot R_{dr} & (\phi \cdot (R_{dr} - \tilde{R}_{dr}(i)) < 0) \\ \tilde{R}_{dr}(i) & (\phi \cdot (R_{dr} - \tilde{R}_{dr}(i)) \ge 0) \end{cases} \quad (137)$$

Wherein $G_{ydr}$ tilde, $R_{dr}$ tilde are estimated values of the sensor drift amounts after smoothing, and $\lambda$ is a forgetting factor. Further, it suffices to estimate the estimated value $\phi$ of the roll angle by a method similar to the above first embodiment.

As shown by above equation (136), equation (137), when the learning values of the sensor drift amounts of the lateral acceleration and the yaw angular velocity are updated, the learning values of the sensor drift amounts are updated only when the sensor drift amounts are updated in a direction of lowering the absolute values of the estimated values of the attitude angles.

The motion equation derivative amount computing means 1036 computes the derivative amount of the lateral velocity in accordance with above equation (41) by using the lateral acceleration $G_y$ detected by the lateral acceleration sensor 14, the yaw angular velocity R detected by the yaw angular velocity sensor 20, and the vehicle speed $V_{so}$ estimated by the vehicle speed estimating means 1022. Note that it suffices to estimate the estimated value φ of the roll angle and the estimated value θ of the pitch angle in above equation (41) by a method similar to the above first embodiment.

In accordance with above equation (135), the drift amount estimating means 1038 estimates the sensor drift amount of the lateral acceleration sensor 14, and the sensor drift amount of the yaw angular velocity sensor 20, on the basis of the derivative amount of the lateral velocity computed by the lateral velocity observer 1034, the derivative amount of the lateral velocity computed by the motion equation derivative amount computing means 1036, and the vehicle speed estimated by the vehicle speed estimating means 1022.

Further, at the drift amount estimating means 1038, the sensor drift amount of the lateral acceleration sensor 14, and the sensor drift amount of the yaw angular velocity sensor 20 are updated in accordance with above equation (136) through equation (137) by using the estimated values of the sensor drift amounts obtained by the results of computation of above equation (135).

Figure 31:
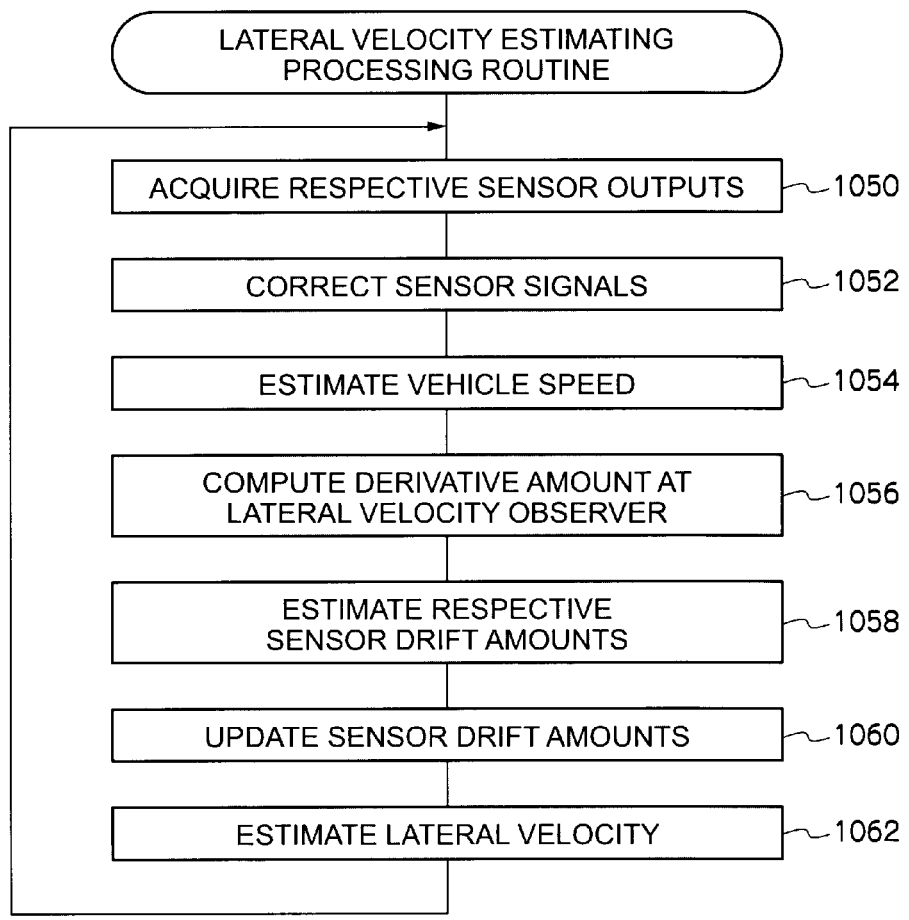
FIG. 31 is a flowchart showing the contents of a lateral velocity estimating processing routine in the lateral velocity estimating device relating to the tenth embodiment of the present invention.

In the above tenth embodiment, information processing by a program, that causes a computer to function as the respective means that are the vehicle speed estimating means 1022, the drift amount correcting means 1032, the lateral velocity observer 1034, the motion equation derivative amount computing means 1036, and the drift amount estimating means 1038, can be realized by the lateral velocity estimating processing routine that is shown in the flowchart of FIG. 31.

In this lateral velocity estimating processing routine, first, in step 1050, sensor signals corresponding to respective detected values are acquired from the lateral acceleration sensor 14, and the yaw angular velocity sensor 20. Then, in step 1052, the sensor signals, that were outputted respectively from the lateral acceleration sensor 14 and the yaw angular velocity sensor 20 and that were acquired in above step 1050, are corrected by using the sensor drift amount of the lateral acceleration sensor 14 and the sensor drift amount of the yaw angular velocity sensor 20 that were obtained one computation cycle before in step 1058 that is described below.

Then, in step 1054, on the basis of the wheel speeds of the respective wheels, the vehicle speed is estimated. In step 1056, the derivative amount of the vehicle body lateral velocity, that was computed in order to estimate the vehicle body lateral velocity, is computed as described above by using the sensor signals, that were respectively outputted from the lateral acceleration sensor 14 and the yaw angular velocity sensor 20 and that were corrected in above step 1052, and the vehicle speed estimated in above step 1054.

Then, in step 1058, the sensor drift amount of the lateral acceleration sensor 14, and the sensor drift amount of the yaw angular velocity sensor 20 are estimated by using the derivative amount of the vehicle body lateral velocity computed in above step 1056, the derivative amount of the vehicle body lateral velocity computed by the equations of motion, and the vehicle speed estimated in above step 1054.

In next step 1060, by using the sensor drift amount of the lateral acceleration sensor 14 and the sensor drift amount of the yaw angular velocity sensor 20 that were estimated in above step 1058, the estimated values of the respective sensor drift amounts are updated only when the absolute values of the attitude angle estimated values become small by updating.

In next step 1062, by integrating the derivative amount of the vehicle body lateral velocity computed in above step 1056, the vehicle body lateral velocity is estimated, and the routine returns to above step 1050.

As described above, in accordance with the lateral velocity estimating device relating to the tenth embodiment, the drift amounts of the sensors that respectively detect the lateral acceleration and the yaw angular velocity can be estimated stably regardless of the state of vehicle motion, by estimating the sensor drift amounts of the sensors that respectively detect the lateral acceleration and the yaw angular velocity, by using the relationship between the derivative amount of the lateral velocity that is computed in order to estimate the vehicle body lateral velocity, and the derivative amount of the lateral velocity that is obtained from the equations of motion for vehicle motion.

Further, the sensor drift amounts of the lateral acceleration sensor and the yaw angular velocity sensor can be estimated accurately by focusing on the point that the contribution of the drift error of the lateral acceleration to the derivative amount of the vehicle body lateral velocity is unrelated to vehicle speed whereas the contribution of the drift error of the yaw angular velocity to the derivative amount of the vehicle body lateral velocity becomes large in proportion to vehicle speed, and by arranging the relationship between the derivative amount of the vehicle body lateral velocity and the drift error per vehicle speed region.

Next, an eleventh embodiment is described. Note that, because the structure of a lateral velocity estimating device of the eleventh embodiment is structured similarly to the tenth embodiment, the same reference numerals are applied and description thereof is omitted.

In the eleventh embodiment, the point that the sensor drift amounts of the lateral acceleration sensor and the yaw angular velocity sensor are estimated on the basis of a weighted relational expression per vehicle speed region, is mainly different from the tenth embodiment.

The principles of estimating the sensor drift amounts in the eleventh embodiment are described.

First, in order to remove noise from the deviation E of the derivative amount of the vehicle body lateral velocity, and to express the relationship between the vehicle speed and the deviation of the derivative amount of the vehicle body lateral velocity, a vehicle speed range is divided per uniform vehicle speed $U_0$, and plural vehicle speed regions are set. Each time the vehicle speed data and the deviation E of the derivative amount of the lateral velocity are obtained, the following processing is carried out by using the vehicle speed data and the deviation E of the derivative amount of the vehicle body lateral velocity.

First, for each vehicle speed region, the average value of the vehicle speed data and the average value of the deviation E of the derivative amount of the vehicle body lateral velocity, of uniform time $T_0$ minutes in which the vehicle speed is included in the vehicle speed region, are set to initial values.

Then, for a vehicle speed region that includes an obtained vehicle speed, when the initial values are set, smoothing computation is carried out in accordance with following equation (138), equation (139) for each sample time τ.

[Formula 85]

$$U_m(i) = \lambda_m \cdot U_m(i-1) + (1-\lambda_m) \cdot U(i) \quad (138)$$

$$E_m(i) = \lambda_m \cdot E_m(i-1) + (1-\lambda_m) \cdot E(i) \quad (139)$$

Wherein $\lambda_m$ is a forgetting factor.

Further, when the vehicle speed changes and the obtained vehicle speed is included in another vehicle speed region, for the vehicle speed regions in which the obtained vehicle speed is not included, the smoothing computation of above equation (138), equation (139) is not carried out.

Figure 32A:
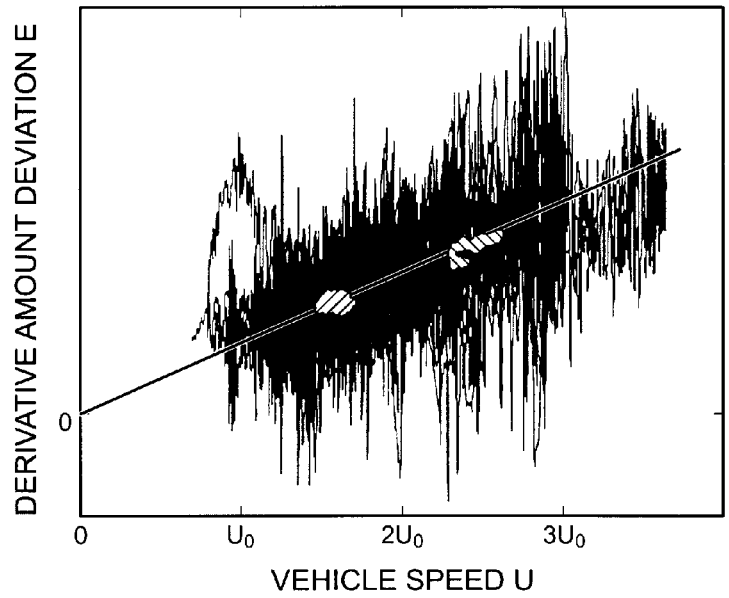
FIG. 32A is a graph showing the relationship between vehicle speed and deviation of a derivative amount of lateral velocity after smoothing computation when a drift error is applied to yaw angular velocity.
Figure 32B:
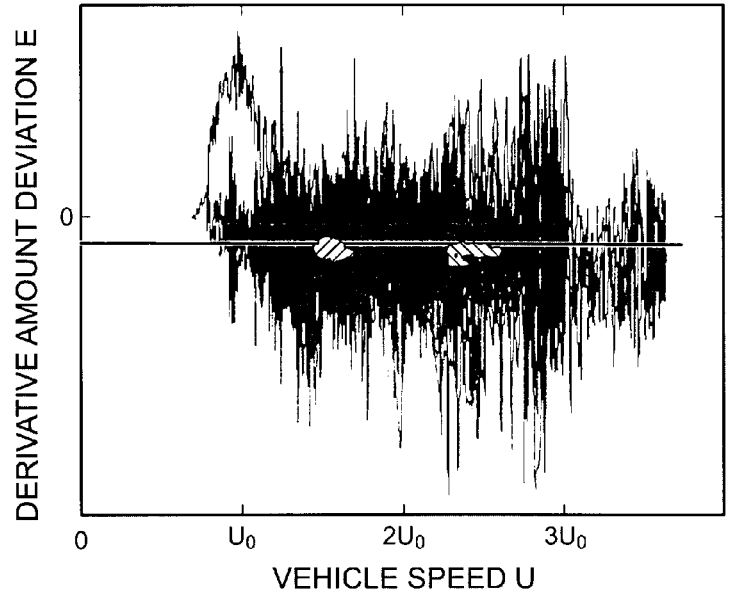
FIG. 32B is a graph showing the relationship between vehicle speed and deviation of a derivative amount of lateral velocity after smoothing computation when a drift error is applied to lateral acceleration.

Here, the results of the above initial value setting and smoothing computation are shown in FIG. 32A, FIG. 32B. In the vehicle speed data and the deviation E of the derivative amount of the lateral velocity that are obtained from the traveling data, because the numbers of data of the vehicle speed region that is less than or equal to $U_0$ and the vehicle speed region that is greater than or equal to $3U_0$ do not satisfy $T_0/\tau$ points (the number of data points of the uniform time $T_0$ minutes), they are not illustrated. Data of the vehicle speed regions other than these are positioned on the characteristic line (the black solid line) of the applied drift value. From the data after the smoothing computation, it can be expected that the sensor drift amounts of the yaw velocity sensor and the lateral acceleration sensor are estimated accurately.

Further, a method of estimating the sensor drift amounts of the lateral acceleration sensor and the yaw angular velocity sensor while reflecting, in the algorithms that carry out the above initial value setting and smoothing computation, the relationship between the vehicle speed and the deviation E of the derivative amount of the vehicle body lateral velocity after smoothing that is described in the above tenth embodiment, is described.

An improvement in accuracy that corresponds to the number of data points can be expected for the relationship between the vehicle speed and the deviation E of the derivative amount of the vehicle body lateral velocity after smoothing. On the other hand, when considering changes over time in the sensor drift amounts, a deterioration in accuracy over time is feared for the relationship between the vehicle speed and the deviation E of the derivative amount of the vehicle body lateral velocity after smoothing. Therefore, first, the weight functions, that are expressed by following equation (140) through equation (143) and that, for each vehicle speed region, increase in accordance with the number of data at which the vehicle speed is included in the vehicle speed region and decrease in accordance with the elapsed time that has elapsed from the obtained vehicle speed coming out of the vehicle speed region, are defined. Note that description is given of a case in which the vehicle speed range of 0 through $4U_0$ is divided into four vehicle speed regions.

[Formula 86]

$$W_1(i) = \begin{cases} W_1(i-1) + 0.01 & (U(i) < U_0) \\ W_1(i-1) - 0.001 & (U(i) \geq U_0) \end{cases} \quad (140)$$

$$W_2(i) = \begin{cases} W_2(i-1) + 0.01 & (U_0 \leq U(i) < 2U_0) \\ W_2(i-1) - 0.001 & (U(i) < U_0, U(i) \geq 2U_0) \end{cases} \quad (141)$$

$$W_3(i) = \begin{cases} W_3(i-1) + 0.01 & (2U_0 \leq U(i) < 3U_0) \\ W_3(i-1) - 0.001 & (U(i) < 2U_0, U(i) \geq 3U_0) \end{cases} \quad (142)$$

$$W_4(i) = \begin{cases} W_4(i-1) + 0.01 & (U(i) \geq 3U_0) \\ W_4(i-1) - 0.001 & (U(i) < 3U_0) \end{cases} \quad (143)$$

Due to the respective weight functions of above equation (140) through equation (143), the greater the number of times that the estimated vehicle speed is included in the corresponding vehicle speed region, the greater the weighting, and, the greater the number of times that the estimated vehicle speed is not included in the corresponding vehicle speed region, the smaller the weighting.

Note that the weight functions computed in above equation (140) through equation (143) are restricted by [0, 1] (restricted to 0 when less than or equal to 0, and restricted to 1 when exceeding 1). Further, the smoothing computations of above equation (138), equation (139) also include states in which the number of data points is few, and can be described by following equation (144) through equation (152).

[Formula 87]

$$\tilde{\lambda}_k \begin{cases} 1 - \dfrac{1}{100 \cdot W_k(i)} & \left(W_k(i) < \dfrac{1}{100(1-\lambda_0)}\right) \\ \lambda_0 & \left(W_k(i) \geq \dfrac{1}{100(1-\lambda_0)}\right) \end{cases} \quad (144)$$

$$U_1(i) = \begin{cases} \lambda_1 \cdot U_1(i-1) + (1-\lambda_1) \cdot U(i) & (U(i) < U_0) \\ U_1(i-1) & (U(i) \geq U_0) \end{cases} \quad (145)$$

$$E_1(i) = \begin{cases} \lambda_1 \cdot E_1(i-1) + (1-\lambda_1) \cdot E(i) & (U(i) < U_0) \\ E_1(i-1) & (U(i) \geq U_0) \end{cases} \quad (146)$$

$$U_2(i) = \begin{cases} \lambda_2 \cdot U_2(i-1) + (1-\lambda_2) \cdot U(i) & (U_0 \leq U(i) < 2U_0) \\ U_2(i-1) & (U(i) < U_0, U(i) \geq 2U_0) \end{cases} \quad (147)$$

$$E_2(i) = \begin{cases} \lambda_2 \cdot E_2(i-1) + (1-\lambda_2) \cdot E(i) & (U_0 \leq U(i) < 2U_0) \\ E_2(i-1) & (U(i) < U_0, U(i) \geq 2U_0) \end{cases} \quad (148)$$

$$U_3(i) = \begin{cases} \lambda_3 \cdot U_3(i-1) + (1-\lambda_3) \cdot U(i) & (2U_0 \leq U(i) < 3U_0) \\ U_3(i-1) & (U(i) < 2U_0, U(i) \geq 3U_0) \end{cases} \quad (149)$$

$$E_3(i) = \begin{cases} \lambda_3 \cdot E_3(i-1) + (1-\lambda_3) \cdot E(i) & (2U_0 \leq U(i) < 3U_0) \\ E_3(i-1) & (U(i) < 2U_0, U(i) \geq 3U_0) \end{cases} \quad (150)$$

$$U_4(i) = \begin{cases} \lambda_4 \cdot U_4(i-1) + (1-\lambda_4) \cdot U(i) & (U(i) \geq 3U_0) \\ U_4(i-1) & (U(i) < 3U_0) \end{cases} \quad (151)$$

$$E_4(i) = \begin{cases} \lambda_4 \cdot E_4(i-1) + (1-\lambda_4) \cdot E(i) & (U(i) \geq 3U_0) \\ E_4(i-1) & (U(i) < 3U_0) \end{cases} \quad (152)$$

Wherein k=1, 2, 3, 4.

Next, the relationship between $U_k(i)$ and $E_k(i)$, that considers the weight functions computed by above equation (140) through (143), is expressed as a matrix as in following equation (153), together with the relationship of equation (132) that was described in the above tenth embodiment. Note that following equation (153) expresses, as a matrix, a relational expression that is weighted per vehicle speed region and that expresses the relationship between the vehicle speed, the sensor drift amounts, and the deviation of the derivative amount of the vehicle body lateral velocity.

[Formula 88]

$$D_{mat} \cdot \begin{bmatrix} G_{ydr}/G_{ydr\,max} \\ R_{dr}/R_{dr\,max} \end{bmatrix} = E_{vec} \quad (153)$$

wherein $$D_{mat} = \begin{bmatrix} -G_{ydr} & R_{dr} \cdot U \\ -\tilde{W}_1 \cdot G_{ydr} & \tilde{W}_1 \cdot R_{dr} \cdot U_1 \\ -\tilde{W}_2 \cdot G_{ydr} & \tilde{W}_2 \cdot R_{dr} \cdot U_2 \\ -\tilde{W}_3 \cdot G_{ydr} & \tilde{W}_3 \cdot R_{dr} \cdot U_3 \\ -\tilde{W}_4 \cdot G_{ydr} & \tilde{W}_4 \cdot R_{dr} \cdot U_4 \end{bmatrix} \quad (154)$$

-continued $$E_{vec} = \begin{bmatrix} E \\ \tilde{W}_1 \cdot E_1 \\ \tilde{W}_2 \cdot E_2 \\ \tilde{W}_3 \cdot E_3 \\ \tilde{W}_4 \cdot E_4 \end{bmatrix} \quad (155)$$

Note that $W_k$ tilde is a weight function that is corrected in order to select data of conditions for which deterioration in accuracy is of concern, such as when the number of data points is insufficient or the like, and is expressed by following equation (156).

[Formula 89]

$$\tilde{W}_k = \begin{cases} 0 & (W_k < 0.5) \\ W_k & (W_k \geq 0.5) \end{cases} \quad (156)$$

By solving above equation (153), following equation (157) can be derived, and the angular sensor drift amount is estimated in accordance with following equation (157).

[Formula 90]

$$\begin{bmatrix} G_{ydr} \\ R_{dr} \end{bmatrix} = \begin{bmatrix} G_{ydr\,max} & 0 \\ 0 & R_{dr\,max} \end{bmatrix} D_{mat}^\dagger \cdot E_{vec} \quad (157)$$

Note that, here, in order to aim for stabilization of computation and to suppress an increase in the attitude angle estimated values, with respect to the computational results of above equation (157), the sensor drift amounts are smoothed in accordance with following equation (158), equation (159) by using the attitude angle estimated values and the values of the preceding time.

[Formula 91]

$$\tilde{G}_{ydr}(i+1) = \begin{cases} \lambda \cdot \tilde{G}_{ydr}(i) + (1-\lambda) \cdot G_{ydr} & (\phi \cdot (G_{ydr} - \tilde{G}_{ydr}(i)) > 0) \\ \tilde{G}_{ydr}(i) & (\phi \cdot (G_{ydr} - \tilde{G}_{ydr}(i)) \leq 0) \end{cases} \quad (158)$$

$$\tilde{R}_{dr}(i+1) = \begin{cases} \lambda \cdot \tilde{R}_{dr}(i) + (1-\lambda) \cdot R_{dr} & (\phi \cdot (R_{dr} - \tilde{R}_{dr}(i)) < 0) \\ \tilde{R}_{dr}(i) & (\phi \cdot (R_{dr} - \tilde{R}_{dr}(i)) \geq 0) \end{cases} \quad (159)$$

Wherein $G_{ydr}$ tilde, $R_{dr}$ tilde are estimated values of sensor drift amounts after smoothing, and $\lambda$ is a forgetting factor. Further, it suffices to estimate the estimated value $\phi$ of the roll angle by a method similar to the above first embodiment.

The drift amount estimating means 1038 computes a weight function for each vehicle speed region, in accordance with above equation (140) through equation (143), on the basis of the vehicle speed estimated by the vehicle speed estimating means 1022.

Further, the drift amount estimating means 1038 computes the deviation between the derivative amount of the vehicle body lateral velocity computed by the lateral velocity observer 1034 and the derivative amount of the vehicle body lateral velocity computed by the motion equation derivative amount computing means 1036. The drift amount estimating means 1038 carries out smoothing computation with respect to each of the deviation of the derivative amount of the vehicle body lateral velocity and the vehicle speed, for each vehicle speed region, in accordance with above equation (144) through equation (152).

Further, the drift amount estimating means 1038 corrects the weight functions of the respective vehicle speed regions as shown in above equation (156), and derives a relational expression that is weighted per vehicle speed region and that expresses the relationship between the deviation of the derivative amount of the vehicle body lateral velocity and the vehicle speed and the sensor drift amounts, as shown in above equation (157). In accordance with the derived above equation (157), the drift amount estimating means 1038 estimates the respective sensor drift amounts of the lateral acceleration sensor 14 and the yaw angular velocity sensor 20.

Figure 33:
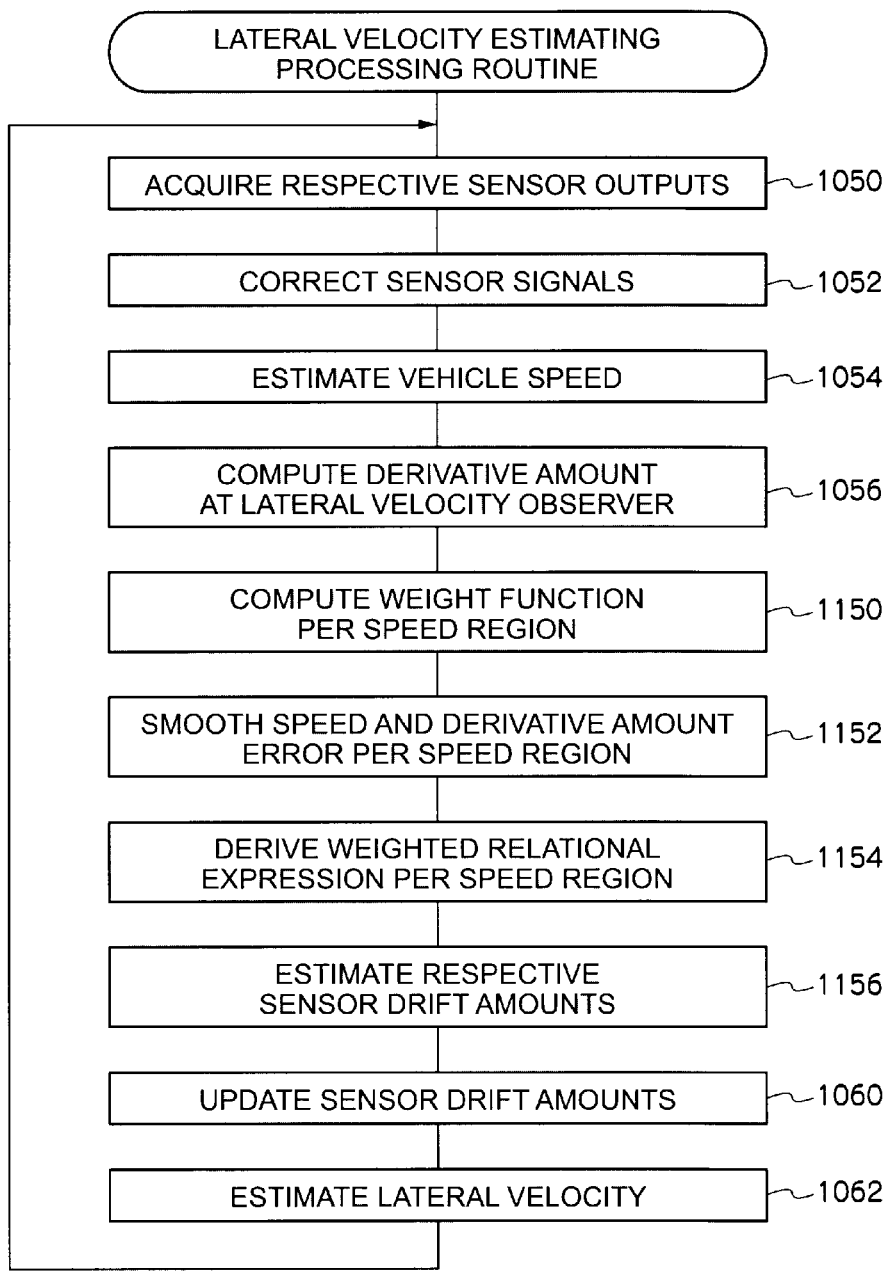
FIG. 33 is a flowchart showing the contents of a lateral velocity estimating processing routine in a lateral velocity estimating device relating to an eleventh embodiment of the present invention.

In the above eleventh embodiment, information processing by a program, that causes a computer to function as the respective means that are the vehicle speed estimating means 1022, the drift amount correcting means 1032, the lateral velocity observer 1034, the motion equation derivative amount computing means 1036, and the drift amount estimating means 1038, can be realized by the lateral velocity estimating processing routine that is shown in the flowchart of FIG. 33.

This lateral velocity estimating processing routine is described hereinafter. Note that processings that are similar to the tenth embodiment are denoted by the same reference numerals, and description thereof is omitted.

First, in step 1050, sensor signals corresponding to respective detected values are acquired from the lateral acceleration sensor 14, and the yaw angular velocity sensor 20. Then, in step 1052, the sensor signals, that were outputted from the lateral acceleration sensor 14 and the yaw angular velocity sensor 20 respectively and that were acquired in above step 1050, are corrected by using the sensor drift amount of the lateral acceleration sensor 14, and the sensor drift amount of the yaw angular velocity sensor 20 that were obtained one computation cycle before in step 1156 that is described below.

Then, in step 1054, on the basis of the wheel speeds of the respective wheels, the vehicle speed is estimated. In step 1056, the derivative amount of the vehicle body lateral velocity, that was computed in order to estimate the vehicle body lateral velocity, is computed by using the sensor signals that were respectively outputted from the lateral acceleration sensor 14 and the yaw angular velocity sensor 20 and that were corrected in above step 1052, and the vehicle speed estimated in above step 1054.

In next step 1150, a weight function is computed per vehicle speed region on the basis of the vehicle speed estimated in above step 1054. In step 1152, the vehicle speed and the deviation of the derivative amount of the vehicle body lateral velocity are respectively smoothed per vehicle speed region.

Then, in step 1154, a relational expression, that is weighted per vehicle speed region, is derived by using the weight function per vehicle speed region computed in above step 1150, and the vehicle speed and the deviation of the derivative amount of the vehicle body lateral velocity per vehicle speed region that were smoothed in above step 1152.

In next step 1156, the sensor drift amount of the lateral acceleration sensor 14, and the sensor drift amount of the yaw angular velocity sensor 20 are estimated in accordance with the relational expression derived in above step 1154.

In next step 1060, by using the sensor drift amount of the lateral acceleration sensor 14 and the sensor drift amount of the yaw angular velocity sensor 20 that were estimated in above step 1058, for the respective sensor drift amounts of the lateral acceleration sensor 14 and the yaw angular velocity sensor 20, the estimated values of the sensor drift amounts are updated only when the absolute values of the attitude angle estimated values become small by updating.

In next step 1062, by integrating the derivative amount of the lateral velocity computed in above step 1056, the lateral velocity is estimated, and the routine returns to above step 1050.

Figure 34A:
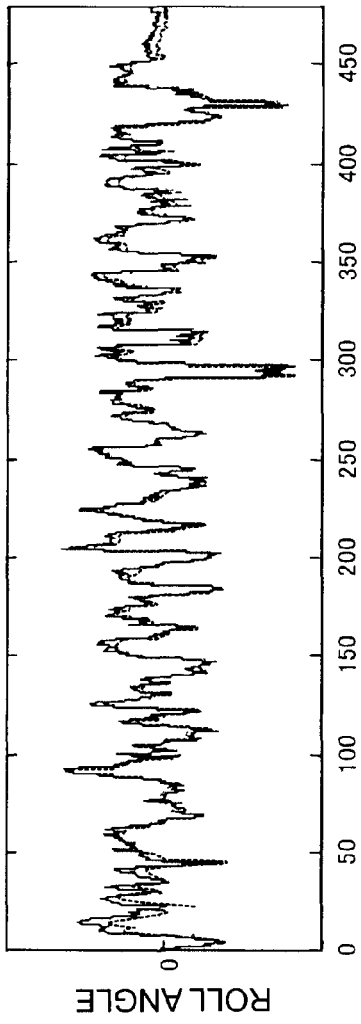
FIG. 34A is a graph showing estimation results of a roll angle when an estimated value of a sensor drift amount is used, in a state in which a drift error is applied to a sensor signal of lateral acceleration.
Figure 34B:
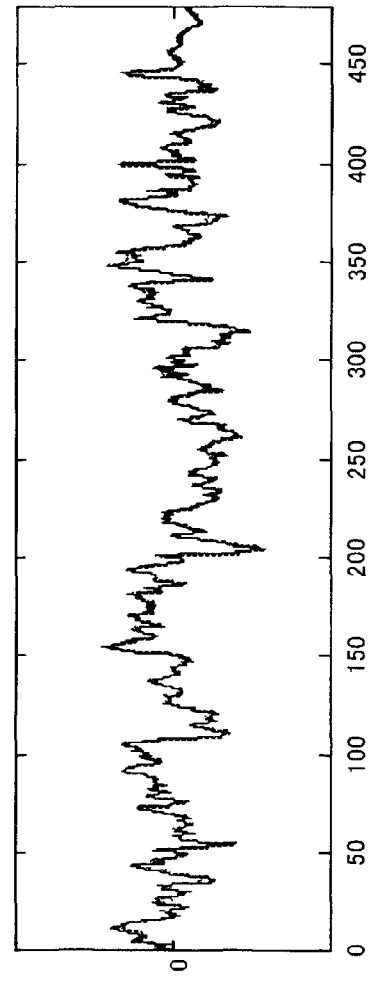
FIG. 34B is a graph showing estimation results of a pitch angle when an estimated value of a sensor drift amount is used, in a state in which a drift error is applied to a sensor signal of lateral acceleration.

Next, estimation results of attitude angles when using the sensor drift amount estimating method of the present embodiment are described. First, when a drift error is applied to the sensor signal of the lateral acceleration sensor, attitude angle estimation results such as shown in FIG. 34A, FIG. 34B are obtained, and, at this time, estimation results of sensor drift amounts such as shown in FIG. 35 are obtained. Here, the technique of the above first embodiment is used with respect to the respective sensor drift amounts of the vertical acceleration sensor, the longitudinal acceleration sensor, and the roll angular velocity sensor. It can be understood that, in accordance with the sensor drift amount estimating method of the present embodiment, the sensor drift amount of the lateral acceleration sensor can be estimated correctly.

Figure 36A:
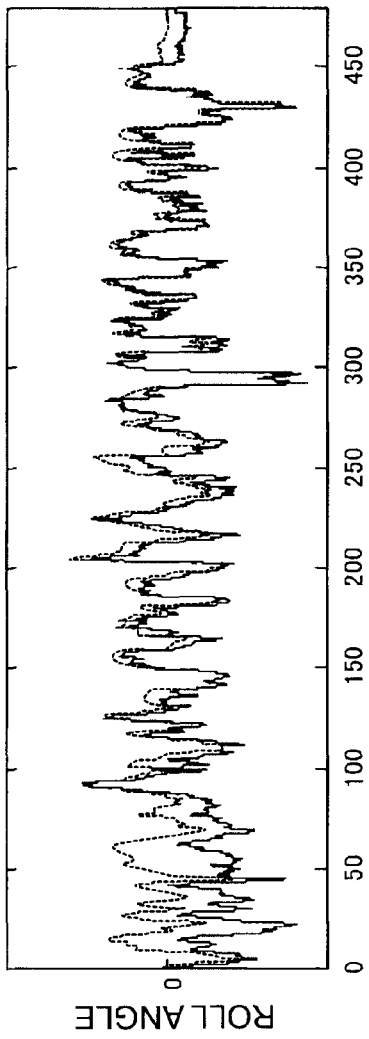
FIG. 36A is a graph showing estimation results of a roll angle when an estimated value of a sensor drift amount is used, in a state in which a drift error is applied to a sensor signal of yaw angular velocity.
Figure 36B:
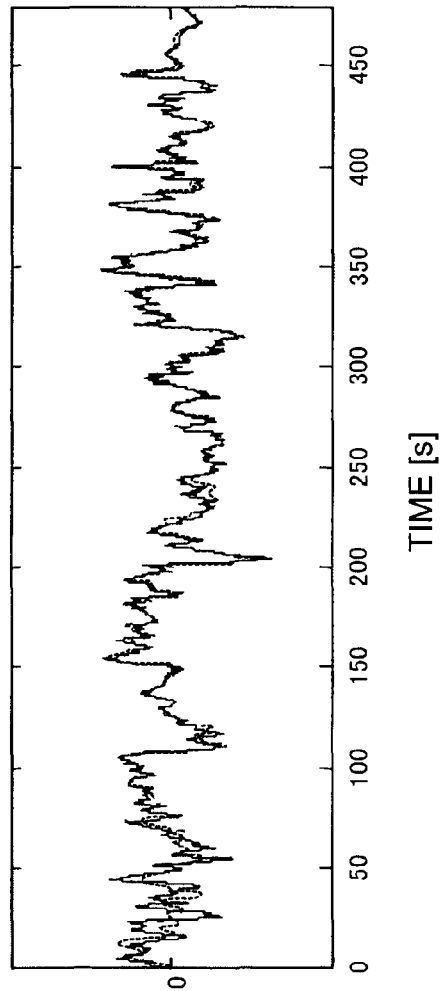
FIG. 36B is a graph showing estimation results of a pitch angle when an estimated value of a sensor drift amount is used, in a state in which a drift error is applied to a sensor signal of yaw angular velocity.
Figure 37:
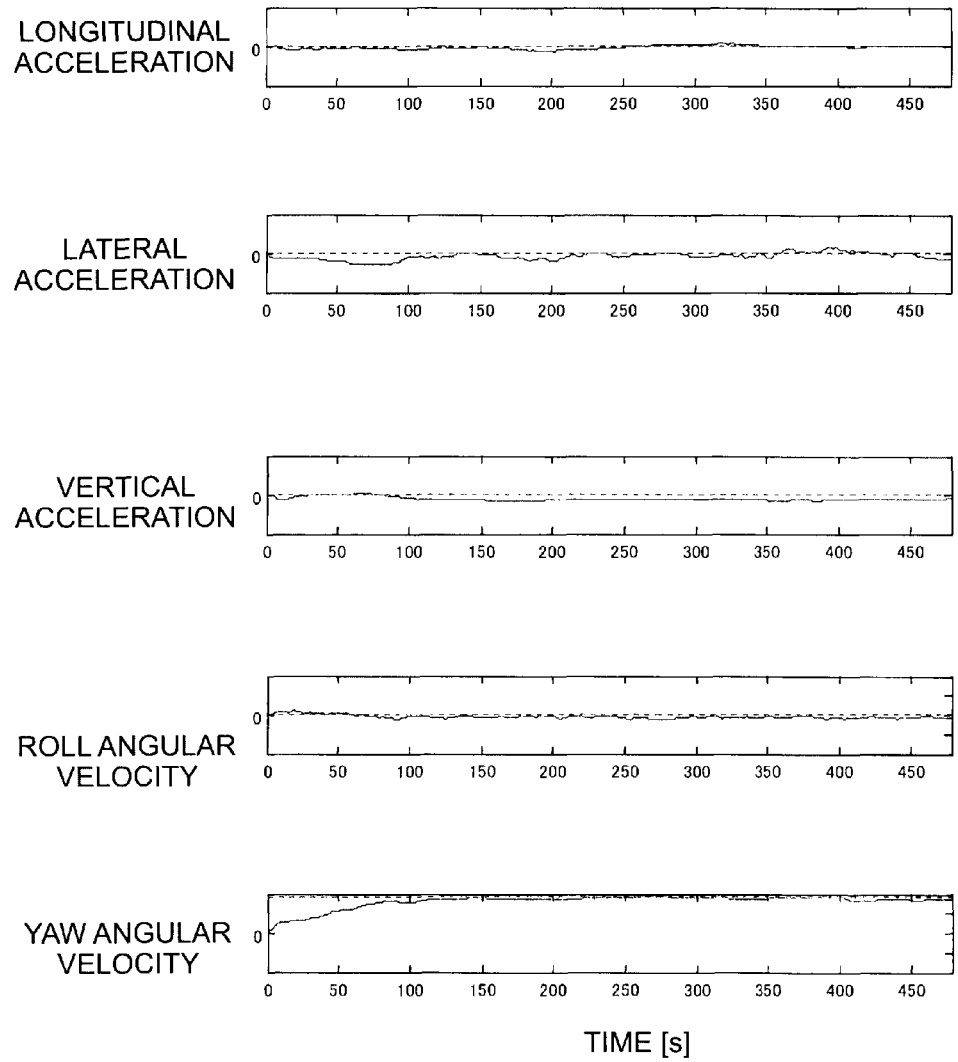
FIG. 37 is a graph showing estimation results of sensor drift amounts of respective sensors in a state in which a drift error is applied to yaw angular velocity.

Further, when a drift error is applied to the sensor signal of the yaw angular velocity sensor, attitude angle estimation results such as shown in FIG. 36A, FIG. 36B are obtained, and, at this time, estimation results of sensor drift amounts such as shown in FIG. 37 are obtained. It can be understood that, when the sensor drift amount estimating method of the present embodiment is used, appropriate estimation can be carried out with respect to the sensor drift amount of the yaw angular velocity sensor as well.

As described above, in accordance with the lateral velocity estimating device relating to the eleventh embodiment, by using a relational expression, that is weighted for each of plural vehicle speed regions and that expresses the relationship between the deviation of the derivative amount of the vehicle body lateral velocity, the vehicle speed, and the sensor drift amount, the sensor drift amounts of the sensors that respectively detect the lateral acceleration and the yaw angular velocity can be estimated accurately.

Further, the estimating accuracy of the sensor drift amounts can be improved by computing a weight function per vehicle speed region in accordance with whether or not an obtained vehicle speed is included.

Note that the above tenth embodiment and eleventh embodiment describe, as examples, cases of using an internally-computed value of the lateral velocity observer as the derivative amount of the lateral velocity, but the present invention is not limited to the same. A value, that is computed by multiplying the vehicle speed by the derivative amount of the slip angle that is computed within a slip angle estimating algorithm, or a value that is computed by multiplying the vehicle speed by a value obtained by differentiating the slip angle estimated value, may be used as the derivative amount of the lateral velocity.

Next, a twelfth embodiment is described. Note that portions that are structured similarly to the first embodiment and the tenth embodiment are denoted by the same reference numerals and description thereof is omitted. The present embodiment applies the present invention to a slip angle estimating device that estimates a vehicle body slip angle.

In the twelfth embodiment, the point that the vehicle body slip angle is estimated is mainly different from the eleventh embodiment.

Figure 38:
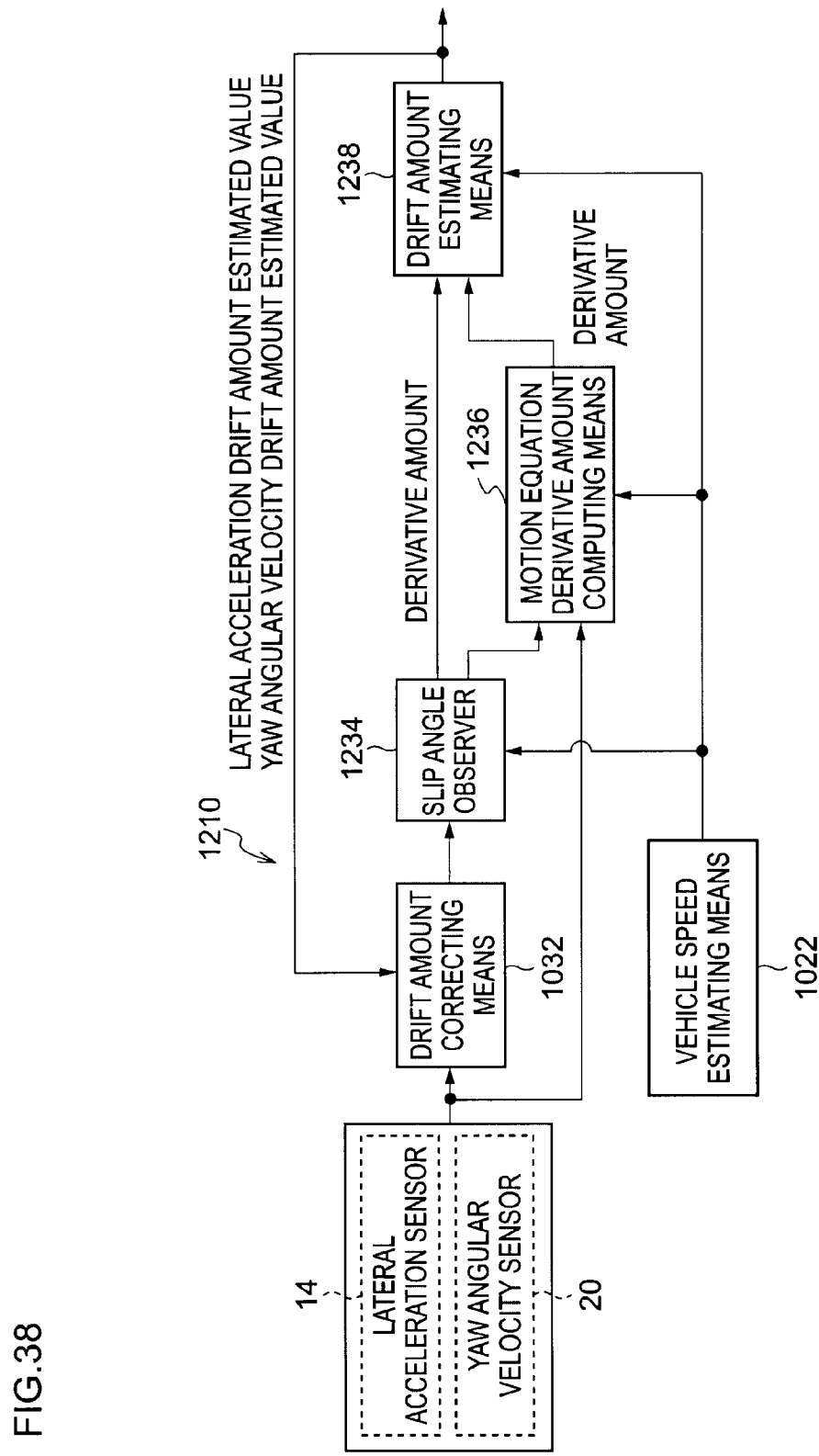
FIG. 38 is a schematic drawing showing the structure of a slip angle estimating device relating to a twelfth embodiment of the present invention.

As shown in FIG. 38, a slip angle estimating device 1210 relating to the twelfth embodiment has the lateral acceleration sensor 14, the yaw angular velocity sensor 20, and the vehicle speed estimating means 1022.

The lateral acceleration sensor 14 and the yaw angular velocity sensor 20 are connected to the drift amount correcting means 1032. The drift amount correcting means 1032 is connected to a drift amount estimating means 1238.

The drift amount correcting means 32 and the vehicle speed estimating means 1022 are connected to a slip angle observer 1234 that estimates the vehicle body slip angle. The lateral acceleration sensor 14, the yaw angular velocity sensor 20, the vehicle speed estimating means 1022, and the slip angle observer 1234 are connected to an motion equation derivative amount computing means 1236 that computes the derivative amount of the vehicle body slip angle obtained from equations of motion for vehicle motion.

The vehicle speed estimating means 1022, the slip angle observer 1234, and the motion equation derivative amount computing means 1236 are connected to the drift amount estimating means 1238 that estimates the respective sensor drift amounts of the lateral acceleration sensor 14 and the yaw angular velocity sensor 20.

The vehicle speed estimating means 1022, the drift amount correcting means 1032, the slip angle observer 1234, the motion equation derivative amount computing means 1236, and the drift amount estimating means 1238 can be structured by one or plural computers or by one or plural electronic circuits that realize the functions of the respective means.

The slip angle observer 1234 computes the derivative amount of the vehicle body lateral velocity in accordance with an equation that is similar to the equation for determining the lateral vehicle body velocity in above equation (29-5), on the basis of the sensor signal $(G_y - G_{ydr})$ of the lateral acceleration sensor 14 and the sensor signal $(R - R_{dr})$ of the yaw angular velocity sensor 20 that were corrected by the drift amount correcting means 1032, and the vehicle speed $V_{so}$ estimated by the vehicle speed estimating means 1022. The slip angle observer 1234 divides the computed derivative amount of the vehicle body lateral velocity by the estimated vehicle speed, and computes the derivative amount of the vehicle body slip angle. The slip angle observer 1234 integrates the computed derivative amount of the vehicle body slip angle, and computes an estimated value of the vehicle body slip angle.

Next, the principles of estimating the sensor drift amounts of the lateral acceleration sensor 14 and the yaw angular velocity sensor 20 are described.

First, the deviation E, between the derivative amount of the vehicle body slip angle of the slip angle observer and the derivative amount of vehicle body slip angle of the equations of motion, is computed by following equation (160).

[Formula 92]

$$E = d\beta - d\beta_m \qquad (160)$$

wherein $$d\beta_m = \frac{dV_m}{U} = \frac{G_y}{U} - R - \frac{g\cos\theta\sin\phi}{U}$$

Further, $d\beta$ is the derivative amount of the vehicle body slip angle computed by the slip angle observer 1234 (an internally-computed value of the slip angle estimation algorithm), and $d\beta_m$ is the derivative amount of the vehicle body slip angle computed by the equations of motion. $G_y$ is the value detected by the lateral acceleration sensor 14, and R is the value detected by the yaw angular velocity sensor 20. U is the estimated vehicle speed, g is gravitational acceleration, θ is the estimated value of the pitch angle, and φ is the estimated value of the roll angle.

The characteristic of deviation $E_{Rdr}$, between the derivative amount of the vehicle body slip angle computed by the slip angle observer and the derivative amount of the vehicle body slip angle computed by the equations of motion, with respect to the applied drift $R_{dr}$ of the yaw angular velocity, is expressed by following equation (161), from above equation (129).

[Formula 93]

$$E_{dr} = R_{dr} \quad (161)$$

Further, the characteristic of the deviation $E_{Gydr}$, between the derivative amount of the vehicle body slip angle computed by the slip angle observer and the derivative amount of the vehicle body slip angle computed by the equations of motion, with respect to the applied drift $G_{ydr}$ of the lateral acceleration, is expressed by following equation (162).

[Formula 94]

$$E_{Gydr} = -\frac{G_{ydr}}{U} \quad (162)$$

Due to above equation (161), equation (162), from the relationship between the vehicle speed U and the deviation E after noise removal, it can be thought that the drift error of the yaw angular velocity sensor, whose effects on the deviation E do not depend on the vehicle speed U, and the drift error of the lateral acceleration sensor, whose effects on the deviation E are inversely proportional to the vehicle speed U, can be separated by removing the noise component of the deviation E.

Thus, in the present embodiment, the sensor drift amounts are estimated as described hereinafter.

First, assuming that the uniform drift errors $G_{ydr}$, $R_{dr}$ are superposed on the sensor signals $G_y$, R of the lateral acceleration sensor 14 and the yaw angular velocity sensor 20, the equation of motion of the lateral direction is expressed by above equation (33). Further, the derivative amount of the lateral velocity obtained from the equations of motion is expressed by above equation (41).

Assuming that the value, that is obtained by dividing the derivative amount of the lateral velocity of the left side of above equation (33) by the vehicle speed, coincides with dβ that is an internally-computed value of the observer, following equation (163) is obtained.

[Formula 95]

$$d\beta = d\beta_m - \frac{G_{ydr}}{U} + R_{dr} \quad (163)$$

Further, from above equation (163), it is described as following equation (164).

[Formula 96]

$$D \cdot \begin{bmatrix} G_{ydr}/G_{ydr\,max} \\ R_{dr}/R_{dr\,max} \end{bmatrix} = E \quad (164)$$

wherein $$D = \begin{bmatrix} -\dfrac{G_{ydr\,max}}{U} & R_{dr\,max} \end{bmatrix} \quad (165)$$

$$E = d\beta - d\beta_m = d\beta + R + \frac{g\cos\theta\sin\phi}{U} - \frac{G_y}{U} \quad (166)$$

Note that $G_{ydrmax}$, $R_{drmax}$ express the upper limit values of the sensor drift amounts of the lateral acceleration sensor 14 and the yaw angular velocity sensor 20, respectively. Here, in order to aim for noise removal, the respective values (sensor values, estimated values) in above equation (164) use average values of a uniform time section.

Further, in the present embodiment, the relationship between the vehicle speed and the deviation E of the derivative amount of the vehicle body slip angle after smoothing, that was described above, is reflected in the algorithms that carry out the initial value setting and smoothing computation that are described below, and the sensor drift amounts of the lateral acceleration sensor and the yaw angular velocity sensor are estimated.

In order to remove noise from the deviation E of the derivative amount of the vehicle body slip angle and to express the relationship between the vehicle speed and the deviation of the derivative amount of the vehicle body slip angle, a vehicle speed range is divided per uniform vehicle speed $U_o$, and plural vehicle speed regions are set. Each time vehicle speed data and the deviation E of the derivative amount of the slip angle are obtained, the following processing is carried out on the vehicle speed data and the deviation E of the derivative amount of the vehicle body slip angle.

First, for each vehicle speed region, the average value of the vehicle speed data and the average value of the deviation E of the derivative amount of the vehicle body slip angle of uniform time $T_0$ minutes, in which the vehicle speed is included in the vehicle speed region, are set to initial values.

Then, for a vehicle speed region that includes an obtained vehicle speed, when the initial values are set, smoothing computation is carried out in accordance with equations that are similar to above equation (138), equation (139) for each sample time τ.

Further, when the vehicle speed changes and the obtained vehicle speed is included in another vehicle speed region, for the vehicle speed regions in which the obtained vehicle speed is not included, the smoothing computation by equations that are similar to above equation (138), equation (139) is not carried out.

Further, the weight functions, that are expressed by above equation (140) through equation (143) and that, for each vehicle speed region, increase in accordance with the number of data in which the vehicle speed is included in the vehicle speed region and decrease in accordance with the elapsed time that has elapsed from the obtained vehicle speed coming out of the vehicle speed region, are defined.

Further, the smoothing computation in accordance with equations that are similar to above equation (138), equation (139) also includes states in which the number of data points is few, and can be described by equations that are similar to above equation (144) through equation (152).

Next, the relationship between $U_k(i)$ and $E_k(i)$, that considers the weight functions computed by above equation (140) through (143), is expressed as a matrix as in following equation (167), together with the relationship of equation (164) that was described above. Note that following equation (167) expresses, as a matrix, a relational expression that is weighted per vehicle speed region and that expresses the relationship between the vehicle speed, the sensor drift amounts, and the deviation of the derivative amount of the vehicle body slip angle.

[Formula 97]

$$D_{mat} \cdot \begin{bmatrix} G_{ydr}/G_{ydr\,max} \\ R_{dr}/R_{dr\,max} \end{bmatrix} = E_{vec} \quad (167)$$

wherein $$D_{mat} = \begin{bmatrix} -\dfrac{G_{ydr}}{U} & R_{dr} \\ -\dfrac{\tilde{W}_1 \cdot G_{ydr}}{U_1} & \tilde{W}_1 \cdot R_{dr} \\ -\dfrac{\tilde{W}_2 \cdot G_{ydr}}{U_2} & \tilde{W}_2 \cdot R_{dr} \\ -\dfrac{\tilde{W}_3 \cdot G_{ydr}}{U_3} & \tilde{W}_3 \cdot R_{dr} \\ -\dfrac{\tilde{W}_4 \cdot G_{ydr}}{U_4} & \tilde{W}_4 \cdot R_{dr} \end{bmatrix} \quad (168)$$

$$E_{vec} = \begin{bmatrix} E \\ \tilde{W}_1 \cdot E_1 \\ \tilde{W}_2 \cdot E_2 \\ \tilde{W}_3 \cdot E_3 \\ \tilde{W}_4 \cdot E_4 \end{bmatrix} \quad (169)$$

Note that $W_k$ tilde is expressed by above equation (156).

By solving above equation (167), following equation (170) can be derived, and the sensor drift amounts are estimated in accordance with following equation (170).

[Formula 98]

$$\begin{bmatrix} G_{ydr} \\ R_{dr} \end{bmatrix} = \begin{bmatrix} G_{ydr\,max} & 0 \\ 0 & R_{dr\,max} \end{bmatrix} D_{mat}^\dagger \cdot E_{vec} \quad (170)$$

Note that, here, in order to aim for stabilization of computation and to suppress an increase in the attitude angle estimated values, with respect to the computational results of above equation (170), smoothing is carried out in accordance with above equation (158), equation (159) by using the attitude angle estimated values and the values of the preceding time. Note that it suffices to estimate the estimated value ϕ of the roll angle by a method similar to the above first embodiment.

The motion equation derivative amount computing means 1236 computes the derivative amount of the vehicle body lateral velocity in accordance with above equation (41) by using the lateral acceleration $G_y$ detected by the lateral acceleration sensor 14, the yaw angular velocity R detected by the yaw angular velocity sensor 20, and the vehicle speed $V_{so}$ estimated by the vehicle speed estimating means 1022, and divides the derivative amount of the vehicle body lateral velocity by the vehicle speed $V_{so}$, and computes the derivative amount of the vehicle body slip angle. Note that it suffices to estimate the estimated value ϕ of the roll angle and the estimated value θ of the pitch angle in above equation (41) by a method similar to the above first embodiment.

The drift amount estimating means 1238 computes a weight function for each vehicle speed region, in accordance with above equation (140) through equation (143), on the basis of the vehicle speed estimated by the vehicle speed estimating means 1022.

Further, the drift amount estimating means 1238 computes the deviation between the derivative amount of the vehicle body slip angle computed by the slip angle observer 1234 and the derivative amount of the vehicle body slip angle computed by the motion equation derivative amount computing means 1236. The drift amount estimating means 1238 carries out smoothing computation with respect to the vehicle speed and the deviation of the derivative amount of the vehicle body slip angle, for each vehicle speed region, in accordance with equations that are similar to above equation (144) through equation (152).

Further, the drift amount estimating means 1238 corrects the weight functions of the respective vehicle speed regions as shown in above equation (156), and derives a relational expression that is weighted per vehicle speed region and that expresses the relationship between the deviation of the derivative amount of the vehicle body slip angle and the vehicle speed and the sensor drift amounts, as shown in above equation (170). In accordance with the derived above equation (170), the drift amount estimating means 1238 estimates the respective sensor drift amounts of the lateral acceleration sensor 14 and the yaw angular velocity sensor 20.

In the above twelfth embodiment, information processing by a program, that causes a computer to function as the respective means that are the vehicle speed estimating means 1022, the drift amount correcting means 1032, the slip angle observer 1234, the motion equation derivative amount computing means 1236, and the drift amount estimating means 1238, can be realized by processes similar to the lateral velocity estimating processing routine that is shown in the flowchart of above FIG. 33.

As described above, in accordance with the slip angle estimating device relating to the twelfth embodiment, the drift amounts of the sensors that respectively detect the lateral acceleration and the yaw angular velocity can be estimated stably regardless of the state of vehicle motion, by estimating the sensor drift amounts of the sensors that respectively detect the lateral acceleration and the yaw angular velocity by using the relationship between the derivative amount of the vehicle body slip angle, that was computed in order to estimate the vehicle body slip angle, and the derivative amount of the vehicle body slip angle, that was obtained from the equations of motion for vehicle motion.

Further, the sensor drift amounts of the sensors that respectively detect the lateral acceleration and the yaw angular velocity can be estimated accurately by using a relational expression that is weighted for each of plural vehicle speed regions and that expresses the relationship between the deviation of the derivative amount of the vehicle body slip angle, the vehicle speed, and the sensor drift amounts.

Further, the sensor drift amounts of the lateral acceleration sensor and the yaw angular velocity sensor can be estimated accurately by focusing on the point that the contribution of the drift error of the yaw angular velocity to the derivative amount of the vehicle body slip angle is unrelated to vehicle speed whereas the contribution of the drift error of the lateral acceleration to the derivative amount of the vehicle body slip angle is inversely proportional to vehicle speed, and by arranging the relationship between the derivative amount of the vehicle body slip angle and the drift error per vehicle speed region.

Note that the above tenth embodiment through twelfth embodiment describe, as examples, cases of estimating the vehicle speed from the respective wheel speeds, but the present invention is not limited to the same, and the vehicle speed may be detected by using a vehicle speed sensor.

Next, a thirteenth embodiment is described. Note that, because the structure of an attitude angle-slip angle estimating device relating to the thirteenth embodiment is a structure similar to the ninth embodiment, the same reference numerals are applied and description thereof is omitted.

In the thirteenth embodiment, the point that the sensor drift amounts are updated by switching the learning speed in a case in which the sensor drift amounts are updated in a direction in which the absolute values of the estimated roll angle and pitch angle become small and in a case in which the sensor drift amounts are updated in a direction in which the absolute values of the estimated roll angle and pitch angle become large, is mainly different from the ninth embodiment.

The principles of estimating the sensor drift amounts are described.

Under the traveling condition that long time period attitude angles are outputted on a cant road or the like, it is desirable that the adaptation time until the outputs of the attitude angle estimated values gradually approach 0 is made to be long. Therefore, the present embodiment focuses on the point that the learning speed of drift estimation can be controlled by setting the forgetting factor in the updating of the drift amounts, and proposes an algorithm of attitude angle adaptation. Specifically, when the estimated values of the sensor drift amounts are changed in a direction of increasing the absolute values of the attitude angles, learning is not discontinued, and a forgetting factor that is set to be large is used.

Namely, the drift amount estimating means 938 computes the estimated value $\tilde{G}_{ydr}(i+1)$ tilde of the drift error of the lateral acceleration from the estimated value $\phi$ of the roll angle by the attitude angle observer 24 and the preceding value $\tilde{G}_{ydr}(i)$ tilde of the drift error learning value and the newly computed value $G_{ydr}$, by replacing above equation (125) with following equation (171).

[Formula 99]

$$\tilde{G}_{ydr}(i+1) = \begin{cases} \lambda_2 \cdot \tilde{G}_{ydr}(i) + (1-\lambda_2) \cdot G_{ydr} & (\phi \cdot (G_{ydr} - \tilde{G}_{ydr}(i)) > 0) \\ \lambda_3 \cdot \tilde{G}_{ydr}(i) + (1-\lambda_3) \cdot G_{ydr} & (\phi \cdot (G_{ydr} - \tilde{G}_{ydr}(i)) \leq 0) \end{cases} \quad (171)$$

Here, $\lambda_2$, $\lambda_3$ are forgetting factors that are introduced in order to smooth the estimated value, and $\lambda_2 < \lambda_3$. As shown in above equation (171), when the estimated value $\phi$ of the roll angle is positive, if the estimated value $G_{ydr}$ of the drift error that is newly computed is larger than the preceding value $\tilde{G}_{ydr}(i)$ tilde, the absolute value of the estimated value of the roll angle can be made to be small by updating the drift error, and therefore, the drift error learning value is updated by using the forgetting factor $\lambda_2$. Further, when the estimated value $\phi$ of the roll angle is negative, if the estimated value $G_{ydr}$ of the drift error that is newly computed is smaller than the preceding value $\tilde{G}_{ydr}(i)$ tilde, the absolute value of the estimated value of the roll angle can be made to be small by updating the drift error, and therefore, the drift error learning value is updated by using the forgetting factor $\lambda_2$. Further, when the estimated value $\phi$ of the roll angle is positive, if the estimated value $G_{ydr}$ of the drift error that is newly computed is smaller than the preceding value $\tilde{G}_{ydr}(i)$ tilde, the absolute value of the estimated value of the roll angle becomes large by updating the drift error, and therefore, the drift error learning value is updated by using the large forgetting factor $\lambda_3$. Further, when the estimated value $\phi$ of the roll angle is negative, if the estimated value $G_{ydr}$ of the drift error that is newly computed is greater than the preceding value $G_{ydr}(i)$ tilde, the absolute value of the estimated value of the roll angle becomes large by updating the drift error, and therefore, the drift error learning value is updated by using the large forgetting factor $\lambda_3$. Note that updating by using the large forgetting factor corresponds to making small the extent of the effect of the estimated value of the drift error that is newly computed in the updating of the drift error.

Further, the drift amount estimating means 938 computes a drift error estimated value $R_{dr}(i+1)$ tilde of the yaw angular velocity from the roll angle estimated value $\phi$ by the attitude angle observer 24 and the preceding value $R_{dr}(i)$ tilde of the drift error learning value and the newly computed value $R_{dr}$, by replacing above equation (126) with following equation (172).

[Formula 100]

$$\tilde{R}_{dr}(i+1) = \begin{cases} \lambda_2 \cdot \tilde{R}_{dr}(i) + (1-\lambda_2) \cdot R_{dr} & (\phi \cdot (R_{dr} - \tilde{R}_{dr}(i)) < 0) \\ \lambda_3 \cdot \tilde{R}_{dr}(i) + (1-\lambda_3) \cdot R_{dr} & (\phi \cdot (R_{dr} - \tilde{R}_{dr}(i)) \geq 0) \end{cases} \quad (172)$$

As shown in above equation (172), when the estimated value $\phi$ of the roll angle is positive, if the estimated value $R_{dr}$ of the drift error that is newly computed is smaller than the preceding value $R_{dr}(i)$ tilde, the absolute value of the estimated value of the roll angle can be made to be small by updating the drift error, and therefore, the drift error learning value is updated by using the forgetting factor $\lambda_2$. Further, when the estimated value $\phi$ of the roll angle is negative, if the estimated value $R_{dr}$ of the drift error that is newly computed is larger than the preceding value $R_{dr}(i)$ tilde, the absolute value of the estimated value of the roll angle can be made to be small by updating the drift error, and therefore, the drift error learning value is updated by using the forgetting factor $\lambda_2$. Further, when the estimated value $\phi$ of the roll angle is positive, if the estimated value $R_{dr}$ of the drift error that is newly computed is larger than the preceding value $R_{dr}(i)$ tilde, the absolute value of the estimated value of the roll angle becomes large by updating the drift error, and therefore, the drift error learning value is updated by using the large forgetting factor $\lambda_3$. Further, when the estimated value $\phi$ of the roll angle is negative, if the estimated value $R_{dr}$ of the drift error that is newly computed is smaller than the preceding value $R_{dr}(i)$ tilde, the absolute value of the estimated value of the roll angle becomes large by updating the drift error, and therefore, the drift error learning value is updated by using the large forgetting factor $\lambda_3$.

Further, the drift amount estimating means 938 computes the drift error estimated value $G_{xdr}(i+1)$ tilde of the longitudinal acceleration from the pitch angle estimated value $\theta$ by the attitude angle observer 24 and the preceding value $G_{xdr}(i)$ tilde of the drift error learning value and the newly computed value $G_{xdr}$, by replacing above equation (127) with following equation (173).

[Formula 101]

$$\tilde{G}_{xdr}(i+1) = \begin{cases} \lambda_2 \cdot \tilde{G}_{xdr}(i) + (1-\lambda_2) \cdot G_{xdr} & (\theta \cdot (G_{xdr} - \tilde{G}_{xdr}(i)) < 0) \\ \lambda_3 \cdot \tilde{G}_{xdr}(i) + (1-\lambda_3) \cdot G_{xdr} & (\theta \cdot (G_{xdr} - \tilde{G}_{xdr}(i)) \geq 0) \end{cases} \quad (173)$$

As shown in above equation (173), when the estimated value $\theta$ of the pitch angle is positive, if the estimated value $G_{xdr}$ of the drift error that is newly computed is smaller than the preceding value $G_{xdr}(i)$ tilde, the absolute value of the estimated value of the pitch angle can be made to be small by updating the drift error, and therefore, the drift error learning value is updated by using the forgetting factor $\lambda_2$. Further, when the estimated value $\theta$ of the pitch angle is negative, if the estimated value $G_{xdr}$ of the drift error that is newly computed is larger than the preceding value $G_{xdr}(i)$ tilde, the absolute value of the estimated value of the pitch angle can be made to be small by updating the drift error, and therefore, the drift error learning value is updated by using the forgetting factor $\lambda_3$. Further, when the estimated value $\theta$ of the pitch angle is positive, if the estimated value $G_{xdr}$ of the drift error that is newly computed is larger than the preceding value $G_{xdr}(i)$ tilde, the absolute value of the estimated value of the pitch angle becomes large by updating the drift error, and therefore, the drift error learning value is updated by using the large forgetting factor $\lambda_3$. Further, when the estimated value $\theta$ of the pitch angle is negative, if the estimated value $G_{xdr}$ of the drift error that is newly computed is smaller than the preceding value $G_{xdr}(i)$ tilde, the absolute value of the estimated value of the pitch angle becomes small by updating the drift error, and therefore, the drift error learning value is updated by using the large forgetting factor $\lambda_3$.

The drift amount estimating means 938 updates the sensor drift amount of the longitudinal acceleration sensor 12, the sensor drift amount of the lateral acceleration sensor 14, and the sensor drift amount of the yaw angular velocity sensor 20, in accordance with above equation (125) through equation (127), by using the estimated values of the sensor drift amounts obtained by the results of computation of above equation (73).

Note that, because the other structures and operations of the attitude angle-slip angle estimating device relating to the thirteenth embodiment are similar to the ninth embodiment, description thereof is omitted.

Figure 39A:
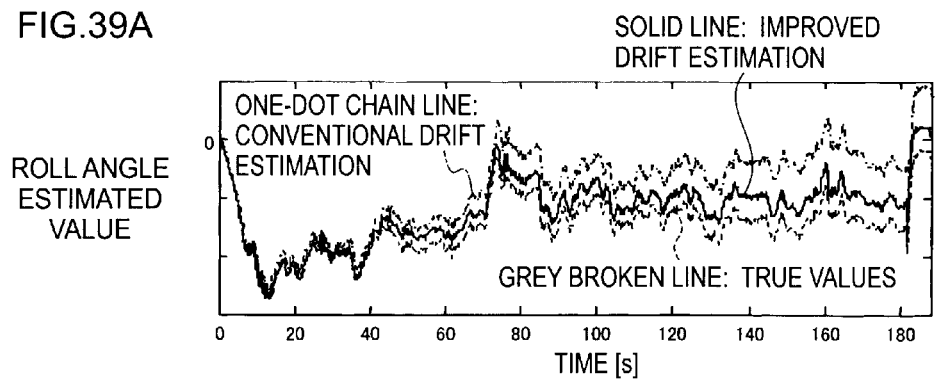
FIG. 39A is a graph showing estimation results of a roll angle when an estimated value of a sensor drift amount is used, when traveling on a cant road in a state in which a drift error is not applied.
Figure 39B:
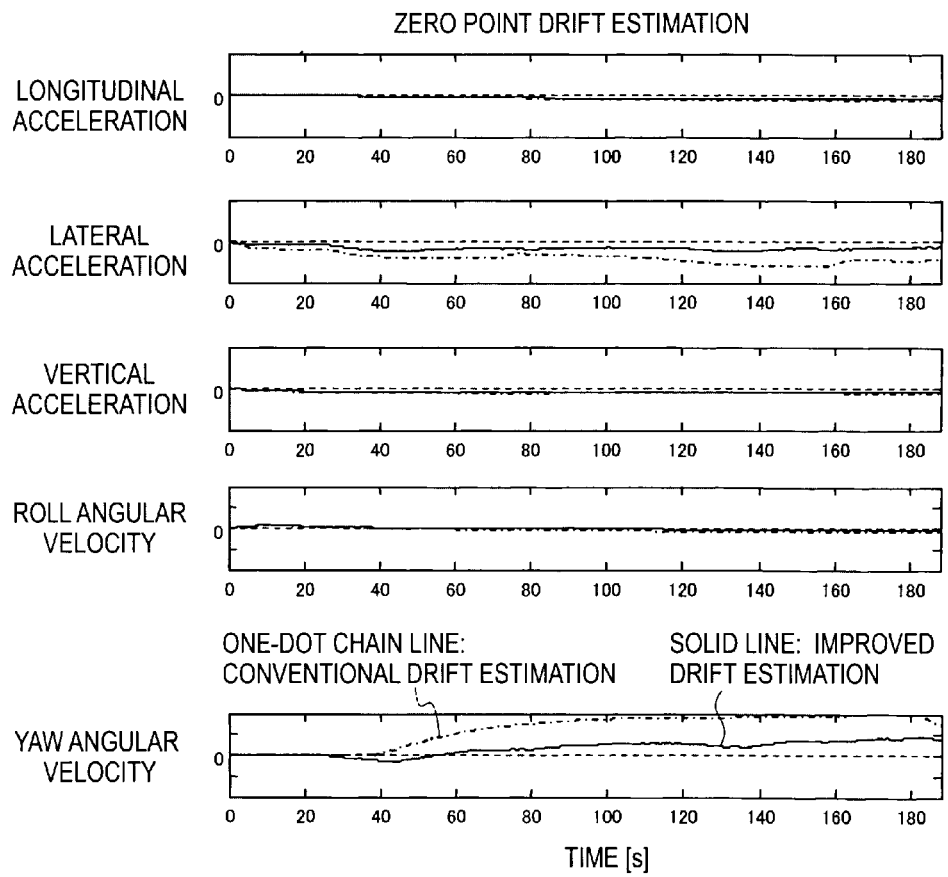
FIG. 39B is a graph showing estimation results of sensor drift amounts of respective sensors, when traveling on a cant road in a state in which a drift error is not applied.

Next, estimation results of sensor drift amounts and estimation results of attitude angles, using the sensor drift amount estimating method of the present embodiment, are described. Note that, in order to confirm the effects of the sensor drift amount estimating method, the roll angle and sensor drift amounts at the time of traveling on a cant road in a state in which drift errors were not applied, were estimated. In this case, estimation results such as shown in FIG. 39A, FIG. 39B were obtained. It could be understood that both the estimated value of the roll angle and the sensor drift amounts become near to true values, and adaptation in order to stabilize attitude angle output works gently.

Figure 40A:
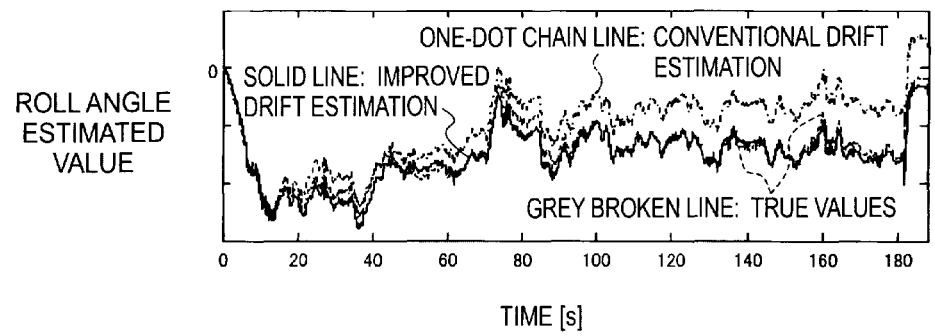
FIG. 40A is a graph showing estimation results of a roll angle when an estimated value of a sensor drift amount is used, when traveling on a cant road in a state in which a positive drift error is applied to yaw angular velocity.
Figure 40B:
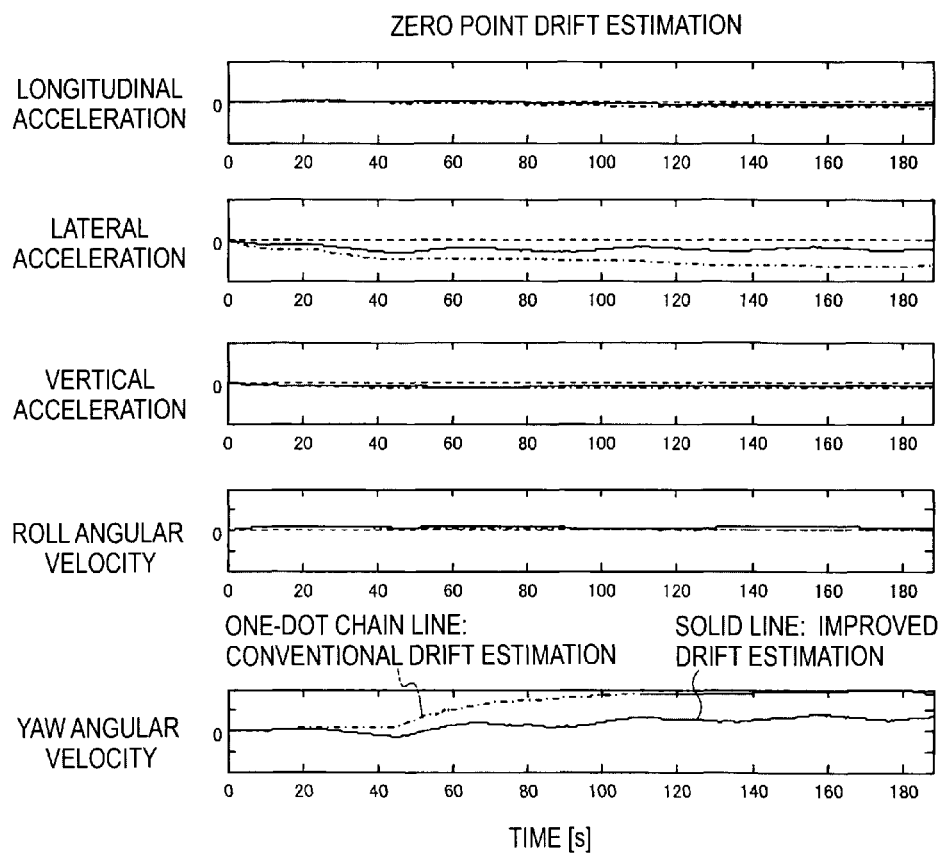
FIG. 40B is a graph showing estimation results of sensor drift amounts of respective sensors, when traveling on a cant road in a state in which a positive drift error is applied to yaw angular velocity.

Further, the roll angle and sensor drift amounts when traveling on a cant road in a state in which a drift error of 4 deg/s was applied to the yaw angular velocity, were estimated. In this case, estimation results such as shown in FIG. 40A, FIG. 40B were obtained. Roll angle estimated values that were near to the true values were obtained. On the other hand, the estimated values of the sensor drift amount of the yaw angular velocity were small as compared with the true values, and instead, the estimated values of the sensor drift amount of the lateral acceleration were outputted in the negative direction. This is thought to be because, from only the data of the vehicle speed regions of the experiment conditions, the drift estimation of the yaw angular velocity and the lateral acceleration is not distributed precisely, and is outputted mainly to the lateral acceleration.

As described above, in accordance with the attitude angle-slip angle estimating device relating to the thirteenth embodiment, by switching the forgetting factor in the updating of the sensor drift amounts in a case in which the absolute values of the estimated values of the roll angle and the pitch angle become small and in a case in which they become large due to updating of the sensor drift amounts, an increase in the absolute values of the estimated values of the roll angle and the pitch angle is suppressed, and the learning speeds of the sensor drift amounts can be adjusted, and the attitude angles can be estimated more accurately.

Note that the above embodiment describes, as an example, a case in which the forgetting factor in the updating of the sensor drift amounts is switched for the respective sensor drift amounts of the longitudinal acceleration, the lateral acceleration and the yaw angular velocity, but the present invention is not limited to the same. The sensor drift amount of at least one of the longitudinal acceleration, the lateral acceleration and the yaw angular velocity may be updated by switching the forgetting factor in the updating, and the other sensor drift amounts may be updated without switching the forgetting factor.

Usage Potential in the Industry

By application to a vehicle motion control device of a vehicle, stable automatic working can be realized.

DESCRIPTION OF THE REFERENCE NUMERALS 10, 410, 510, 910 attitude angle-slip angle estimating device
12 longitudinal acceleration sensor
14 lateral acceleration sensor
16 vertical acceleration sensor
18 roll angular velocity sensor
20 yaw angular velocity sensor
22, 32, 222, 522, 1032 drift amount correcting means
24, 224, 424, 524, 624, 824 attitude angle observer
26, 36, 226, 336, 526, 826, 1036, 1236 motion equation derivative amount computing means
28, 38, 338, 528, 938, 1038, 1238 drift amount estimating means
34, 234, 434, 1234 slip angle observer
210, 610, 810 attitude angle estimating device
310, 710, 1210 slip angle estimating device
425, 435, 525 learning speed compensation amount computing means
520 pitch angular velocity sensor
1010 lateral velocity estimating device
1022 vehicle speed estimating means
1034 lateral velocity observer

The invention claimed is:
1. A sensor drift amount estimating device comprising:
attitude angle estimating means for, on the basis of a sensor signal corresponding to a detected value of a motion state amount of vehicle motion, computing a time differential amount of an attitude angle with respect to a vertical axis of a vehicle body, and integrating the computed time differential amount of the attitude angle, and estimating the attitude angle;
computing means for, on the basis of the sensor signal and the attitude angle estimated by the attitude angle estimating means, computing a time differential amount of the attitude angle obtained from equations of motion for vehicle motion;
drift amount estimating means for estimating a sensor drift amount of the sensor signal by using a relationship that
(A) a time differential amount of the attitude angle that is computed by the attitude angle estimating means, and
(B) the time differential amount of the attitude angle computed by the computing means based on the sensor signal which is corrected on the basis of the sensor drift amount, are equal; and correcting means for correcting the sensor signal on the basis of the sensor drift amount estimated by the drift amount estimating means, wherein the attitude angle estimating means estimates the attitude angle on the basis of the sensor signal corrected by the correcting means.

2. A sensor drift amount estimating device comprising:

vehicle speed estimating means for, on the basis of a sensor signal corresponding to a detected value of a motion state amount of vehicle motion, computing a time differential amount of vehicle speed, and integrating the time differential amount of the vehicle speed, and estimating the vehicle speed;

computing means for, on the basis of the sensor signal and the vehicle speed estimated by the vehicle speed estimating means, computing a time differential amount of the vehicle speed obtained from equations of motion for vehicle motion;

drift amount estimating means for estimating a sensor drift amount of the sensor signal by using a relationship that (A) a time differential amount of the vehicle speed that is computed by the vehicle speed estimating means, and (B) the time differential amount of the vehicle speed computed by the computing means based on the sensor signal which is corrected on the basis of the sensor drift amount, are equal; and correcting means for correcting the sensor signal on the basis of the sensor drift amount estimated by the drift amount estimating means, wherein the vehicle speed estimating means estimates the vehicle speed on the basis of the sensor signal corrected by the correcting means, and estimates a slip angle on the basis of the estimated vehicle speed.

3. A sensor drift amount estimating device comprising:

attitude angle estimating means for, on the basis of sensor signals corresponding to respective detected values of vertical acceleration, longitudinal acceleration, lateral acceleration, roll angular velocity, and yaw angular velocity of vehicle motion, computing respective time differential amounts of a roll angle and a pitch angle with respect to a vertical axis of a vehicle body, and integrating the respective computed time differential amounts of the roll angle and the pitch angle, and estimating the roll angle and the pitch angle;

computing means for, on the basis of the sensor signals and the roll angle and the pitch angle estimated by the attitude angle estimating means, computing respective time differential amounts of the roll angle and the pitch angle obtained from equations of motion for vehicle motion;

drift amount estimating means for estimating respective sensor drift amounts of a sensor signal corresponding to a detected value of the vertical acceleration and a sensor signal corresponding to a detected value of the roll angular velocity, by using a relationship that (A) respective time differential amounts of the roll angle and the pitch angle that are computed by the attitude angle estimating means, and (B) the respective time differential amounts of the roll angle and the pitch angle computed by the computing means based on the sensor signals which are corrected on the basis of the respective sensor drift amounts, are equal; and correcting means for, on the basis of the sensor drift amounts estimated by the drift amount estimating means, respectively correcting the sensor signal corresponding to the detected value of the vertical acceleration and the sensor signal corresponding to the detected value of the roll angular velocity, wherein the attitude angle estimating means estimates the roll angle and the pitch angle on the basis of the sensor signals corresponding to the respective detected values of the longitudinal acceleration, the lateral acceleration, and the yaw angular velocity, and the sensor signals corresponding to the respective detected values of the vertical acceleration and the roll angular velocity corrected by the correcting means.

4. A sensor drift amount estimating device comprising:

vehicle speed estimating means for, on the basis of sensor signals corresponding to respective detected values of longitudinal acceleration, lateral acceleration, and yaw angular velocity of vehicle motion, computing respective time differential amounts of longitudinal velocity and lateral velocity, and integrating the respective time differential amounts of the longitudinal velocity and the lateral velocity, and estimating the longitudinal velocity and the lateral velocity;

computing means for, on the basis of the sensor signals and the longitudinal velocity and the lateral velocity estimated by the vehicle speed estimating means, computing respective time differential amounts of the longitudinal velocity and the lateral velocity obtained from equations of motion for vehicle motion;

drift amount estimating means for estimating sensor drift amounts of the sensor signals corresponding to the respective detected values of the longitudinal acceleration, the lateral acceleration, and the yaw angular velocity by using a relationship that (A) respective time differential amounts of the longitudinal velocity and the lateral velocity that are computed by the vehicle speed estimating means, and (B) the respective time differential amounts of the longitudinal velocity and the lateral velocity computed by the computing means based on the sensor signals which are corrected on the basis of the sensor drift amounts, are equal; and correcting means for, on the basis of the sensor drift amounts estimated by the drift amount estimating means, correcting the sensor signals corresponding to the respective detected values of the longitudinal acceleration, the lateral acceleration, and the yaw angular velocity, wherein the vehicle speed estimating means estimates the longitudinal velocity and the lateral velocity on the basis of the sensor signals corrected by the correcting means, and estimates a slip angle on the basis of the estimated longitudinal velocity and lateral velocity.

5. A sensor drift amount estimating device comprising:

attitude angle estimating means for, on the basis of sensor signals corresponding to respective detected values of longitudinal acceleration, lateral acceleration, vertical acceleration, roll angular velocity, and yaw angular velocity of vehicle motion, computing respective time differential amounts of a roll angle and a pitch angle with respect to a vertical axis of a vehicle body, and integrating the respective computed time differential amounts of the roll angle and the pitch angle, and estimating the roll angle and the pitch angle;

vehicle speed estimating means for, on the basis of sensor signals corresponding to respective detected values, computing respective time differential amounts of longitudinal velocity and lateral velocity, and integrating the respective time differential amounts of the longitudinal velocity and the lateral velocity, and estimating the longitudinal velocity and the lateral velocity;

computing means for, on the basis of the sensor signals and the roll angle and the pitch angle estimated by the attitude angle estimating means, computing respective time differential amounts of the roll angle and the pitch angle obtained from equations of motion for vehicle motion, and, on the basis of the sensor signals and the longitudinal velocity and the lateral velocity estimated by the vehicle speed estimating means, computing respective time differential amounts of the longitudinal velocity and the lateral velocity obtained from equations of motion for vehicle motion;

drift amount estimating means for estimating respective sensor drift amounts of the sensor signal corresponding to the detected value of the vertical acceleration and the sensor signal corresponding to the detected value of the roll angular velocity by using a relationship that (A) respective time differential amounts of the roll angle and the pitch angle that are computed by the attitude angle estimating means, and (B) the respective time differential amounts of the roll angle and the pitch angle computed by the computing means based on the sensor signals which are corrected on the basis of the respective sensor drift amounts, are equal, and for estimating sensor drift amounts of the sensor signals corresponding to the respective detected values of the longitudinal acceleration, the lateral acceleration, and the yaw angular velocity by using a relationship that (C) respective time differential amounts of the longitudinal velocity and the lateral velocity that are computed by the vehicle speed estimating means, and (D) the respective time differential amounts of the longitudinal velocity and the lateral velocity computed by the computing means based on the sensor signals which are corrected on the basis of the sensor drift amounts, are equal; and correcting means for, on the basis of the sensor drift amounts estimated by the drift amount estimating means, correcting sensor signals corresponding to respective detected values, wherein the attitude angle estimating means estimates the roll angle and the pitch angle on the basis of the sensor signals corresponding to the respective detected values corrected by the correcting means, and the vehicle speed estimating means estimates the longitudinal velocity and the lateral velocity on the basis of the sensor signals corresponding to the respective detected values corrected by the correcting means, and estimates a slip angle on the basis of the estimated longitudinal velocity and lateral velocity.

6. The sensor drift amount estimating device of claim 3, wherein the attitude angle estimating means computes the respective time differential amounts of the roll angle and the pitch angle that were corrected on the basis of a changed amount of the sensor drift amount estimated by the drift amount estimating means and a sensor drift amount estimated in the past for each of the sensor signal corresponding to the detected value of the roll angular velocity and the sensor signal corresponding to the detected value of the vertical acceleration, and integrates the respective computed time differential amounts of the roll angle and the pitch angle, and estimates the roll angle and the pitch angle.

7. The sensor drift amount estimating device of claim 4, wherein the vehicle speed estimating means computes the respective time differential amounts of the longitudinal velocity and the lateral velocity that were corrected on the basis of a changed amount of the sensor drift amount estimated by the drift amount estimating means and a sensor drift amount estimated in the past for each of the sensor signal corresponding to the detected value of the longitudinal acceleration and the sensor signal corresponding to the detected value of the lateral acceleration, and integrates the respective computed time differential amounts of the longitudinal velocity and the lateral velocity, and estimates the longitudinal velocity and the lateral velocity.

8. A sensor drift amount estimating device comprising:

attitude angle estimating means for, on the basis of sensor signals corresponding to respective detected values of vertical acceleration, longitudinal acceleration, lateral acceleration, roll angular velocity, pitch angular velocity, and yaw angular velocity of vehicle motion, computing respective time differential amounts of a roll angle and a pitch angle with respect to a vertical axis of a vehicle body, and integrating the respective computed time differential amounts of the roll angle and the pitch angle, and estimating the roll angle and the pitch angle;

computing means for, on the basis of the sensor signals and the roll angle and the pitch angle estimated by the attitude angle estimating means, computing respective time differential amounts of the roll angle and the pitch angle obtained from equations of motion for vehicle motion;

drift amount estimating means for estimating respective sensor drift amounts of the sensor signal corresponding to the detected value of the pitch angular velocity and the sensor signal corresponding to the detected value of the roll angular velocity, by using a relationship that (A) respective time differential amounts of the roll angle and the pitch angle that are computed by the attitude angle estimating means, and (B) the respective time differential amounts of the roll angle and the pitch angle computed by the computing means based on the sensor signals which are corrected on the basis of the respective sensor drift amounts, are equal; and correcting means for, on the basis of the sensor drift amounts estimated by the drift amount estimating means, respectively correcting the sensor signal corresponding to the detected value of the pitch angular velocity and the sensor signal corresponding to the detected value of the roll angular velocity, wherein the attitude angle estimating means estimates the roll angle and the pitch angle on the basis of the sensor signals corresponding to the respective detected values of the vertical acceleration, the longitudinal acceleration, the lateral acceleration, and the yaw angular velocity, and the sensor signals corresponding to the respective detected values of the pitch angular velocity and the roll angular velocity corrected by the correcting means.

9. A sensor drift amount estimating device comprising:

attitude angle estimating means for, on the basis of sensor signals corresponding to respective detected values of longitudinal acceleration, lateral acceleration, vertical acceleration, roll angular velocity, pitch angular velocity, and yaw angular velocity of vehicle motion, computing respective time differential amounts of a roll angle and a pitch angle with respect to a vertical axis of a vehicle body, and integrating the respective computed time differential amounts of the roll angle and the pitch angle, and estimating the roll angle and the pitch angle;

vehicle speed estimating means for, on the basis of sensor signals corresponding to respective detected values, computing respective time differential amounts of longitudinal velocity and lateral velocity, and integrating the respective time differential amounts of the longitudinal velocity and the lateral velocity, and estimating the longitudinal velocity and the lateral velocity;

computing means for, on the basis of the sensor signals and the roll angle and the pitch angle estimated by the attitude angle estimating means, computing respective time differential amounts of the roll angle and the pitch angle obtained from equations of motion for vehicle motion, and, on the basis of the sensor signals and the longitudinal velocity and the lateral velocity estimated by the vehicle speed estimating means, computing respective time differential amounts of the longitudinal velocity and the lateral velocity obtained from equations of motion for vehicle motion;

drift amount estimating means for estimating respective sensor drift amounts of the sensor signal corresponding to the detected value of the pitch angular velocity and the sensor signal corresponding to the detected value of the roll angular velocity by using a relationship that (A) respective time differential amounts of the roll angle and the pitch angle that are computed by the attitude angle estimating means, and (B) the respective time differential amounts of the roll angle and the pitch angle computed by the computing means based on the sensor signals which are corrected on the basis of the respective sensor drift amounts, are equal, and for estimating sensor drift amounts of the sensor signals corresponding to the respective detected values of the longitudinal acceleration, the lateral acceleration, and the yaw angular velocity by using a relationship that (C) respective time differential amounts of the longitudinal velocity and the lateral velocity that are computed by the vehicle speed estimating means, and (D) the respective time differential amounts of the longitudinal velocity and the lateral velocity computed by the computing means based on the sensor signals which are corrected on the basis of the sensor drift amounts, are equal; and correcting means for, on the basis of the sensor drift amounts estimated by the drift amount estimating means, correcting sensor signals corresponding to respective detected values, wherein the attitude angle estimating means estimates the roll angle and the pitch angle on the basis of the sensor signals corresponding to the respective detected values corrected by the correcting means, and the vehicle speed estimating means estimates the longitudinal velocity and the lateral velocity on the basis of the sensor signals corresponding to the respective detected values corrected by the correcting means, and estimates a slip angle on the basis of the estimated longitudinal velocity and lateral velocity.

10. The sensor drift amount estimating device of claim 8, wherein the attitude angle estimating means computes the respective time differential amounts of the roll angle and the pitch angle that were corrected on the basis of a changed amount of the sensor drift amount estimated by the drift amount estimating means and a sensor drift amount estimated in the past for each of the sensor signal corresponding to the detected value of the roll angular velocity and the sensor signal corresponding to the detected value of the pitch angular velocity, and integrates the respective computed time differential amounts of the roll angle and the pitch angle, and estimates the roll angle and the pitch angle.

11. The sensor drift amount estimating device of claim 9, wherein the vehicle speed estimating means computes the respective time differential amounts of the longitudinal velocity and the lateral velocity that were corrected on the basis of a changed amount of the sensor drift amount estimated by the drift amount estimating means and a sensor drift amount estimated in the past for each of the sensor signal corresponding to the detected value of the longitudinal acceleration and the sensor signal corresponding to the detected value of the lateral acceleration, and integrates the respective computed time differential amounts of the longitudinal velocity and the lateral velocity, and estimates the longitudinal velocity and the lateral velocity.

12. The sensor drift amount estimating device of claim 5, wherein the drift amount estimating means estimates sensor drift amounts of the sensor signals corresponding to the respective detected values of the longitudinal acceleration, the lateral acceleration and the yaw angular velocity, and, on the basis of the estimated sensor drift amounts and the sensor drift amounts that were estimated a preceding time, updates the sensor drift amounts.

13. The sensor drift amount estimating device of claim 12, wherein the drift amount estimating means updates the sensor drift amount of the sensor signal corresponding to the lateral acceleration on the basis of the estimated sensor drift amount of the sensor signal corresponding to the lateral acceleration and the sensor drift amount, estimated the preceding time, of the sensor signal corresponding to the lateral acceleration, only when an absolute value of the roll angle estimated by the attitude angle estimating means becomes small, by updating the sensor drift amount by using the estimated sensor drift amount of the sensor signal corresponding to the lateral acceleration.

14. The sensor drift amount estimating device of claim 12, wherein the drift amount estimating means updates the sensor drift amount of the sensor signal corresponding to the yaw angular velocity on the basis of the estimated sensor drift amount of the sensor signal corresponding to the yaw angular velocity and the sensor drift amount, estimated the preceding time, of the sensor signal corresponding to the yaw angular velocity, only when an absolute value of the roll angle estimated by the attitude angle estimating means becomes small, by updating the sensor drift amount by using the estimated sensor drift amount of the sensor signal corresponding to the yaw angular velocity.

15. The sensor drift amount estimating device of claim 12, wherein the drift amount estimating means updates the sensor drift amount of the sensor signal corresponding to the longitudinal acceleration on the basis of the estimated sensor drift amount of the sensor signal corresponding to the longitudinal acceleration and the sensor drift amount, estimated the preceding time, of the sensor signal corresponding to the longitudinal acceleration, only when an absolute value of the pitch angle estimated by the attitude angle estimating means becomes small, by updating the sensor drift amount by using the estimated sensor drift amount of the sensor signal corresponding to the longitudinal acceleration.

16. The sensor drift amount estimating device of claim 12, wherein the drift amount estimating means updates the sensor drift amount of the sensor signal corresponding to the lateral acceleration on the basis of the estimated sensor drift amount of the sensor signal corresponding to the lateral acceleration and the sensor drift amount, estimated the preceding time, of the sensor signal corresponding to the lateral acceleration, when an absolute value of the roll angle estimated by the attitude angle estimating means becomes small, by updating the sensor drift amount by using the estimated sensor drift amount of the sensor signal corresponding to the lateral acceleration, and when an absolute value of the roll angle estimated by the attitude angle estimating means becomes large, by updating the sensor drift amount by using the estimated sensor drift amount of the sensor signal corresponding to the lateral acceleration, the drift amount estimating means makes an extent of effect of the estimated sensor drift amount of the sensor signal corresponding to the lateral acceleration, in the updating of the sensor drift amount, small as compared with a case in which the absolute value of the roll angle becomes small by updating, and updates the sensor drift amount of the sensor signal corresponding to the lateral acceleration.

17. The sensor drift amount estimating device of claim 12, wherein the drift amount estimating means updates the sensor drift amount of the sensor signal corresponding to the yaw angular velocity on the basis of the estimated sensor drift amount of the sensor signal corresponding to the yaw angular velocity and the sensor drift amount, estimated the preceding time, of the sensor signal corresponding to the yaw angular velocity, when an absolute value of the roll angle estimated by the attitude angle estimating means becomes small, by updating the sensor drift amount by using the estimated sensor drift amount of the sensor signal corresponding to the yaw angular velocity, and when an absolute value of the roll angle estimated by the attitude angle estimating means becomes large, by updating the sensor drift amount by using the estimated sensor drift amount of the sensor signal corresponding to the yaw angular velocity, the drift amount estimating means makes an extent of effect of the estimated sensor drift amount of the sensor signal corresponding to the yaw angular velocity, in the updating of the sensor drift amount, small as compared with a case in which the absolute value of the roll angle becomes small by updating, and updates the sensor drift amount of the sensor signal corresponding to the yaw angular velocity.

18. The sensor drift amount estimating device of claim 12, wherein the drift amount estimating means updates the sensor drift amount of the sensor signal corresponding to the longitudinal acceleration on the basis of the estimated sensor drift amount of the sensor signal corresponding to the longitudinal acceleration and the sensor drift amount, estimated the preceding time, of the sensor signal corresponding to the longitudinal acceleration, when an absolute value of the pitch angle estimated by the attitude angle estimating means becomes small, by updating the sensor drift amount by using the estimated sensor drift amount of the sensor signal corresponding to the longitudinal acceleration, and when an absolute value of the pitch angle estimated by the attitude angle estimating means becomes large, by updating the sensor drift amount by using the estimated sensor drift amount of the sensor signal corresponding to the longitudinal acceleration, the drift amount estimating means makes an extent of effect of the estimated sensor drift amount of the sensor signal corresponding to the longitudinal acceleration, in the updating of the sensor drift amount, small as compared with a case in which the absolute value of the pitch angle becomes small by updating, and updates the sensor drift amount of the sensor signal corresponding to the longitudinal acceleration.

19. A sensor drift amount estimating device comprising:

lateral velocity estimating means for, on the basis of sensor signals corresponding to respective detected values of lateral acceleration and yaw angular velocity of vehicle motion, and either a sensor signal corresponding to a detected value of vehicle speed or an estimated value by a vehicle speed estimating means that estimates the vehicle speed, computing a time differential amount of lateral velocity, and integrating the time differential amount of the lateral velocity, and estimating the lateral velocity;

computing means for, on the basis of the sensor signals corresponding to the respective detected values of the lateral acceleration and the yaw angular velocity, and either the sensor signal corresponding to the detected value of the vehicle speed or the estimated value, computing a time differential amount of the lateral velocity obtained from equations of motion for vehicle motion;

drift amount estimating means for estimating sensor drift amounts of the sensor signals corresponding to the respective detected values of the lateral acceleration and the yaw angular velocity, by using a relationship that (A) a time differential amount of the lateral velocity computed by the lateral velocity estimating means, and (B) the time differential amount of the lateral velocity computed by the computing means based on the sensor signals which are corrected on the basis of the sensor drift amounts, are equal; and correcting means for correcting the sensor signals corresponding to the respective detected values of the lateral acceleration and the yaw angular velocity, on the basis of the sensor drift amounts estimated by the drift amount estimating means, wherein the lateral velocity estimating means estimates the lateral velocity on the basis of the sensor signals corrected by the correcting means.

20. The sensor drift amount estimating device of claim 19, wherein the drift amount estimating means derives, for each of a plurality of vehicle speed regions obtained by dividing a predetermined vehicle speed range, a relational expression that is weighted and that expresses a relationship between a deviation between the time differential amount of the lateral velocity computed by the lateral velocity estimating means and the time differential amount of the lateral velocity computed by the computing means, and the vehicle speed, and the sensor drift amounts, and, on the basis of the derived relational expression of each of the plurality of vehicle speed regions, estimates the sensor drift amounts of the sensor signals corresponding to the respective detected values of the lateral acceleration and the yaw angular velocity.

21. A sensor drift amount estimating device comprising:

slip angle estimating means for, on the basis of sensor signals corresponding to respective detected values of lateral acceleration and yaw angular velocity of vehicle motion, and either a sensor signal corresponding to a detected value of vehicle speed or an estimated value by a vehicle speed estimating means that estimates the vehicle speed, computing a time differential amount of a slip angle, and integrating the time differential amount of the slip angle, and estimating the slip angle;

computing means for, on the basis of the sensor signals corresponding to the respective detected values of the lateral acceleration and the yaw angular velocity, and either the sensor signal corresponding to the detected value of the vehicle speed or the estimated value, computing a time differential amount of the slip angle obtained from equations of motion for vehicle motion;

drift amount estimating means for estimating sensor drift amounts of the sensor signals corresponding to the respective detected values of the lateral acceleration and the yaw angular velocity by using a relationship that (A)

a time differential amount of the slip angle computed by the slip angle estimating means, and (B) the time differential amount of the slip angle computed by the computing means based on the sensor signals which are corrected on the basis of the sensor drift amounts, are equal; and correcting means for correcting the sensor signals corresponding to the respective detected values of the lateral acceleration and the yaw angular velocity, on the basis of the sensor drift amounts estimated by the drift amount estimating means, wherein the slip angle estimating means estimates the slip angle on the basis of the sensor signals corrected by the correcting means.

22. The sensor drift amount estimating device of claim 21, wherein the drift amount estimating means derives, for each of a plurality of vehicle speed regions obtained by dividing a predetermined vehicle speed range, a relational expression that is weighted and that expresses a relationship between a deviation between the time differential amount of the slip angle computed by the slip angle estimating means and the time differential amount of the slip angle computed by the computing means, and the vehicle speed, and the sensor drift amounts, and, on the basis of the derived relational expression of each of the plurality of vehicle speed regions, estimates the sensor drift amounts of the sensor signals corresponding to the respective detected values of the lateral acceleration and the yaw angular velocity.

23. The sensor drift amount estimating device of claim 20, wherein, the greater a number of times that either the detected value or the estimated value of the vehicle speed is included in a corresponding vehicle speed region, the greater a weighting of the relational expression is made to be, and, the greater a number of times that either the detected value or the estimated value of the vehicle speed is not included in a corresponding vehicle speed region, the smaller the weighting of the relational expression is made to be.

* * * * *